United States Patent
Kwak et al.

(10) Patent No.: US 9,417,784 B2
(45) Date of Patent: *Aug. 16, 2016

(54) MULTI DISPLAY APPARATUS AND METHOD OF CONTROLLING DISPLAY OPERATION

(71) Applicant: Samsung Electronics Co., Ltd, Suwon-si, Gyeonggi-do (KR)

(72) Inventors: Ji-yeon Kwak, Seoul (KR); Hyun-jin Kim, Seoul (KR); Jae-yeol Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 159 days.

This patent is subject to a terminal disclaimer.

(21) Appl. No.: 14/050,832

(22) Filed: Oct. 10, 2013

(65) Prior Publication Data

US 2014/0101577 A1 Apr. 10, 2014

(30) Foreign Application Priority Data

Oct. 10, 2012 (KR) .................. 10-2012-0112645

(51) Int. Cl.
*G06F 13/00* (2006.01)
*G06F 15/00* (2006.01)
*G06F 3/0488* (2013.01)
(Continued)

(52) U.S. Cl.
CPC ............ *G06F 3/0488* (2013.01); *G06F 1/1618* (2013.01); *G06F 1/1647* (2013.01); *G06F 3/1431* (2013.01); *G09G 2340/045* (2013.01); *G09G 2340/145* (2013.01)

(58) Field of Classification Search
CPC .................................. G06F 3/01; G06F 3/1431
USPC ............ 715/761–763, 778, 851–853, 761–76
See application file for complete search history.

(56) References Cited

U.S. PATENT DOCUMENTS

| 5,862,251 A | 1/1999 | Al-Karmi et al. |
| 6,545,669 B1 | 4/2003 | Kinawi et al. |

(Continued)

FOREIGN PATENT DOCUMENTS

| EP | 2244166 | 10/2010 |
| EP | 2347317 | 7/2011 |

(Continued)

OTHER PUBLICATIONS

Extended European Search Report issued in Application No. 13188159.1 on Jan. 21, 2014.

(Continued)

*Primary Examiner* — Kevin Nguyen
(74) *Attorney, Agent, or Firm* — Staas & Halsey LLP

(57) ABSTRACT

A multi display apparatus and an associated multi display controlling method include a first body having a first display, a second body comprising a second display, a hinge which connects and rotatably supports the first body and the second body, a storage unit configured to store one or more contents, and a controller configured to display a first screen on the first display and displays a second screen corresponding to implemented contents on the second display when one of the contents is implemented, in which the controller modifies the displayed contents on the second screen according to a user manipulation, when the user manipulation is performed on the first screen.

24 Claims, 46 Drawing Sheets

(51) Int. Cl.
*G06F 3/14* (2006.01)
*G06F 1/16* (2006.01)

(56) References Cited

U.S. PATENT DOCUMENTS

| | | |
|---|---|---|
| 6,750,858 B1 | 6/2004 | Rosenstein |
| 6,819,939 B2 | 11/2004 | Masamura |
| 7,006,134 B1 | 2/2006 | Arai et al. |
| 7,120,317 B1 | 10/2006 | Wu et al. |
| 8,049,737 B2 | 11/2011 | Cho et al. |
| 2003/0179422 A1 | 9/2003 | Liu |
| 2003/0224832 A1 | 12/2003 | King et al. |
| 2004/0020941 A1 | 2/2004 | Engesser et al. |
| 2004/0150671 A1 | 8/2004 | Kamiwada et al. |
| 2005/0015731 A1 | 1/2005 | Mak et al. |
| 2006/0062466 A1 | 3/2006 | Zou et al. |
| 2006/0161870 A1 | 7/2006 | Hotelling et al. |
| 2007/0242056 A1 | 10/2007 | Engelhardt et al. |
| 2008/0126955 A1 | 5/2008 | Takatoshi |
| 2008/0148184 A1 | 6/2008 | Davis |
| 2008/0244468 A1 | 10/2008 | Nishihara et al. |
| 2010/0060664 A1 | 3/2010 | Kilpatrick, II et al. |
| 2010/0064244 A1 | 3/2010 | Kilpatrick, II et al. |
| 2010/0073306 A1 | 3/2010 | Hickerson |
| 2010/0079355 A1 | 4/2010 | Kilpatrick, II et al. |
| 2010/0085382 A1 | 4/2010 | Lundqvist et al. |
| 2010/0103099 A1 | 4/2010 | Lee |
| 2010/0156913 A1 | 6/2010 | Ortega et al. |
| 2010/0182265 A1 | 7/2010 | Kim et al. |
| 2010/0188353 A1 | 7/2010 | Yoon et al. |
| 2010/0245256 A1 | 9/2010 | Estrada et al. |
| 2010/0255862 A1 | 10/2010 | Mitsunaga et al. |
| 2010/0275159 A1 | 10/2010 | Matsubara et al. |
| 2011/0102314 A1 | 5/2011 | Roux |
| 2011/0107226 A1 | 5/2011 | Heo |
| 2011/0187646 A1 | 8/2011 | Mahmoud |
| 2011/0191704 A1 | 8/2011 | Hinckley et al. |
| 2011/0209102 A1 | 8/2011 | Hinckley et al. |
| 2011/0216064 A1 | 9/2011 | Dahl et al. |
| 2011/0291988 A1 | 12/2011 | Bamji et al. |
| 2011/0310031 A1 | 12/2011 | Harris et al. |
| 2012/0015694 A1 | 1/2012 | Han |
| 2012/0042246 A1 | 2/2012 | Schwesinger et al. |
| 2012/0064947 A1 | 3/2012 | Yi et al. |
| 2012/0081271 A1* | 4/2012 | Gimpl et al. ................. 345/1.3 |
| 2012/0084710 A1 | 4/2012 | Sirpal et al. |
| 2012/0144323 A1* | 6/2012 | Sirpal et al. ................. 715/761 |
| 2012/0218227 A1* | 8/2012 | Ohashi ......................... 345/175 |
| 2013/0093670 A1* | 4/2013 | Iwai ............................. 345/156 |

FOREIGN PATENT DOCUMENTS

| | | |
|---|---|---|
| JP | 09504884 | 5/1997 |
| JP | 2796768 | 7/1998 |
| JP | 2001-021972 | 1/2001 |
| JP | 2002-281135 | 9/2002 |
| JP | 2004-259297 | 9/2004 |
| JP | 2006-030379 | 2/2006 |
| JP | 2008033686 | 2/2008 |
| JP | 2008-102947 | 5/2008 |
| JP | 2008-262544 | 10/2008 |
| JP | 2011-039942 | 2/2011 |
| JP | 2011221229 | 11/2011 |
| KR | 1020040035019 | 4/2004 |
| KR | 10-0448038 | 9/2004 |
| KR | 1020040091272 | 10/2004 |
| KR | 1020040104777 | 12/2004 |
| KR | 1020050068127 | 7/2005 |
| KR | 1020050078690 | 8/2005 |
| KR | 1020050109190 | 11/2005 |
| KR | 10-0606797 | 8/2006 |
| KR | 1020060092621 | 8/2006 |
| KR | 100653965 | 11/2006 |
| KR | 20070014586 | 2/2007 |
| KR | 1020070022612 | 2/2007 |
| KR | 1020070051249 | 5/2007 |
| KR | 100803504 | 2/2008 |
| KR | 1020080113832 | 12/2008 |
| KR | 1020090065040 | 6/2009 |
| KR | 20090102815 | 9/2009 |
| KR | 1020090092641 | 9/2009 |
| KR | 1020100053597 | 5/2010 |
| KR | 10-0960577 | 6/2010 |
| KR | 1020100086639 | 8/2010 |
| KR | 1020100105005 | 9/2010 |
| KR | 1020100115547 | 10/2010 |
| KR | 1020100121880 | 11/2010 |
| KR | 1020100132772 | 12/2010 |
| KR | 20110053265 | 5/2011 |
| KR | 20110053269 | 5/2011 |
| KR | 20110055718 | 5/2011 |
| KR | 1020110049492 | 5/2011 |
| KR | 20110066165 | 6/2011 |
| KR | 20110069803 | 6/2011 |
| KR | 1020110063410 | 6/2011 |
| KR | 1020110116699 | 10/2011 |
| KR | 10-1094769 | 12/2011 |
| KR | 20110139697 | 12/2011 |
| KR | 20120026674 | 1/2012 |
| KR | 1020120001944 | 1/2012 |
| KR | 1020120026395 | 3/2012 |
| KR | 1020120038692 | 4/2012 |
| WO | 2006086508 | 8/2006 |
| WO | 2012044545 | 4/2012 |

OTHER PUBLICATIONS

US 7,092,574, 8/2006, Suzuki et al. (withdrawn).

* cited by examiner

FIG. 17
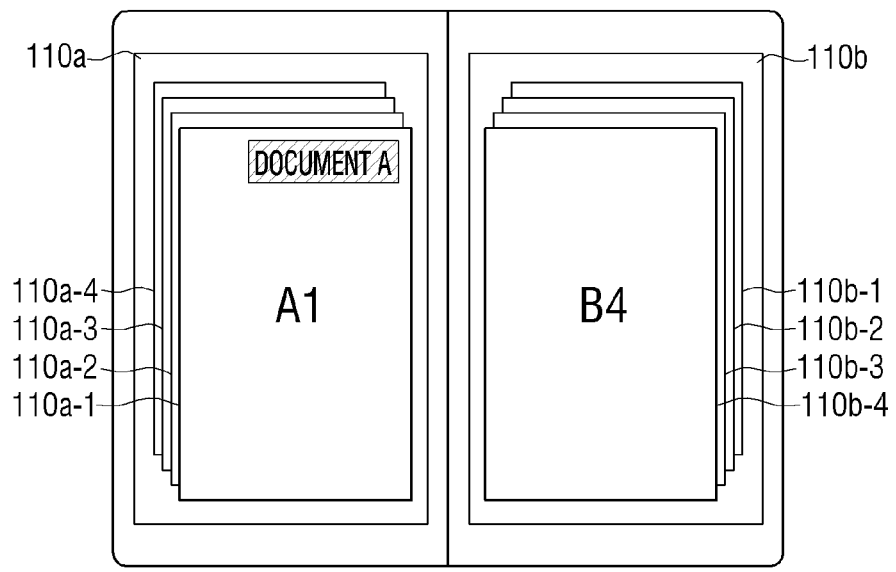
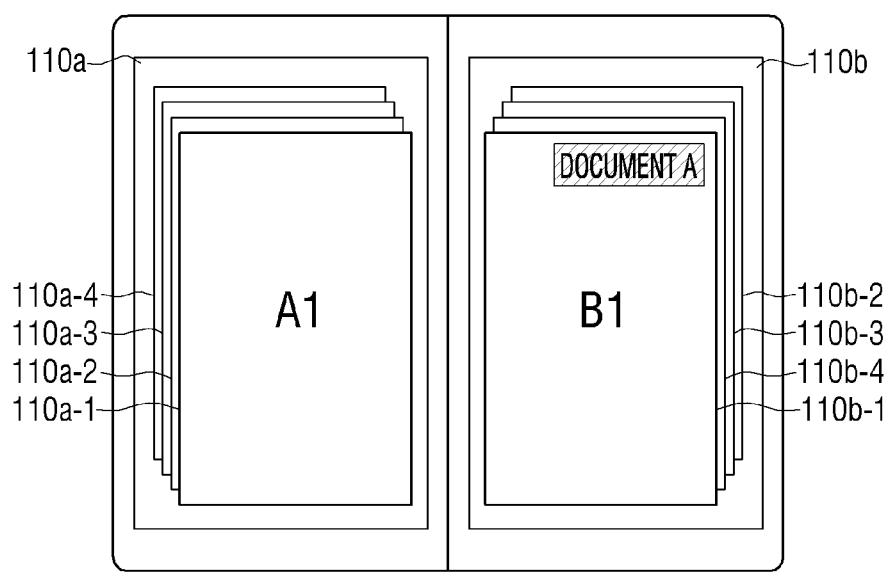

FIG. 18
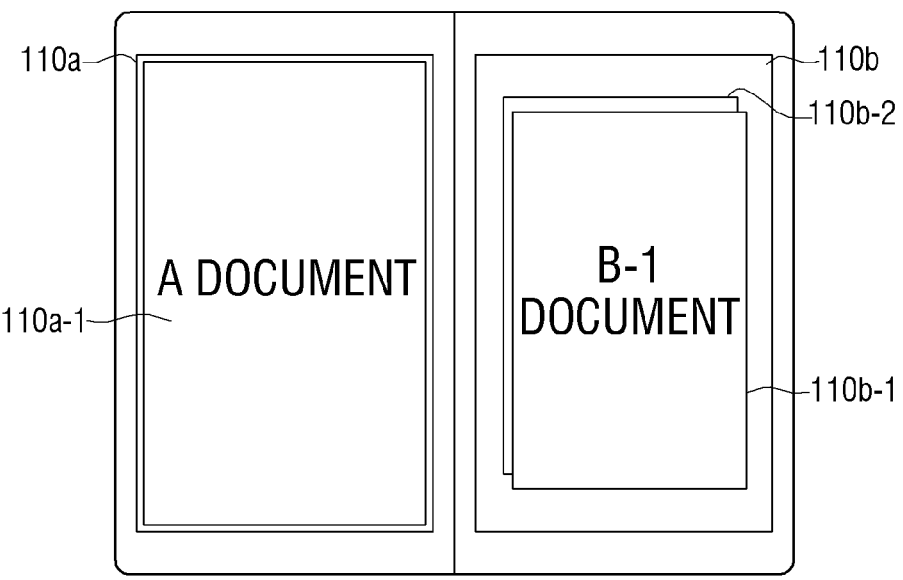
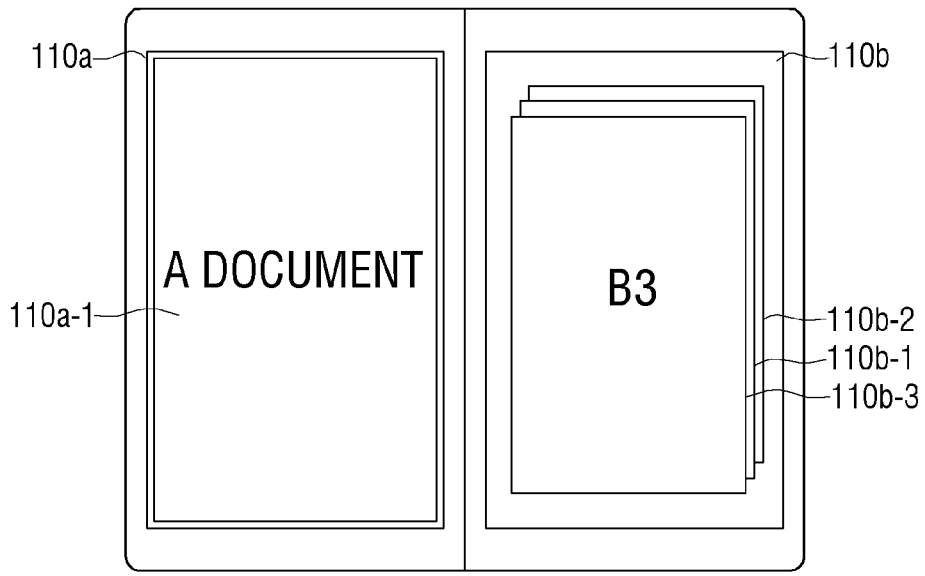

MULTI DISPLAY APPARATUS AND METHOD OF CONTROLLING DISPLAY OPERATION

CROSS-REFERENCE TO RELATED APPLICATIONS

This application claims priority under 35 U.S.C. §119(a) from Korean Patent Application No. 10-2012-0112645, filed on Oct. 10, 2012 in the Korean Intellectual Property Office, the disclosure of which is incorporated herein by reference in its entirety.

BACKGROUND OF THE INVENTION

1. Field of the Invention

Devices and methods consistent with what is disclosed herein relate to a multi display apparatus and a method of controlling the display, and more specifically, to a multi display apparatus which modifies screens according to relevancy between a plurality of display screens, and a display controlling method thereof.

2. Description of the Related Art

Mobile electronic devices such as smart phones that have recently come into use mount a singular display. As the performance of recent mobile electronic devices is enhanced, a user can perform multi-tasking, performing multiple jobs at the same time.

However, because the display size of a mobile electronic device has a limited dimensional area, it may have difficulty performing jobs while simultaneously opening a plurality of windows regarding the multi-tasking jobs. To solve the difficulty, a multi display apparatus including a plurality of displays is developed.

Because such a multi display apparatus includes more than two display screens, user convenience when multi-tasking is performed can be enhanced. However, because the multi display apparatus has a different construction from that of the related single display apparatus, a control method used in a single display apparatus is difficult to use in the multi display apparatus without modification.

Specifically, when applications having different features from each other are implemented through a plurality of display screens, one screen may obtain contents from sources, and another screen may copy or move the sources of the obtained contents. When layouts of the two screens are different, sizes or descriptions of the moved contents may be distorted. Content sizes or descriptions being distorted leads to user inconvenience, requiring the user to rearrange the positions or sizes of the moved contents. Thus, user environment may not be efficient for such multi display applications.

Further, when relevant screens are displayed on the plurality of display screens, a method of operating the multi display apparatus so that one screen can be easily modified by user manipulation performed on another screen is desired.

SUMMARY OF THE INVENTION

A technical objective of the present general inventive concept is to provide a multi display apparatus which displays contents according to relevancy between a plurality of display screens, and a display controlling method thereof.

Additional features and utilities of the present general inventive concept will be set forth in part in the description which follows and, in part, will be obvious from the description, or may be learned by practice of the general inventive concept.

Exemplary embodiments of the present general inventive concept provide a multi display apparatus including a first body including a first display, a second body including a second display, a hinge configured to connect and rotatably support the first body and the second body, a storage unit configured to store one or more contents, and a controller configured to display a first screen on the first display and display a second screen corresponding to implemented contents on the second display when one of the stored contents is implemented, and to modify the displayed contents on the second screen according to a user manipulation when the user manipulation is performed on the first screen.

When a plurality of the stored contents is implemented, the controller may consecutively overlap and display a plurality of first screens respectively corresponding to the plurality of implemented contents on the first display, and consecutively overlap and display a plurality of second screens respectively corresponding to the plurality of first screens on the second display. When one first screen is selected from among the plurality of first screens, the controller may display the selected first screen on the first display on an uppermost position among the plurality of first screens, and display a second screen corresponding to the selected first screen on the second display on an uppermost position among the plurality of second screens.

When a plurality of the stored contents is implemented, the controller may consecutively overlap and display a plurality of first screens respectively corresponding to the plurality of contents in each on the first display, and consecutively overlap and a plurality of second screens respectively corresponding to the plurality of first screens on the second display. When objects displayed on one first screen among the plurality of first screens are selected, the selected objects may be displayed on a second screen corresponding to the first screen.

The controller may display on the second screen one or more objects corresponding to objects displayed on the first screen, the objects being displayed on the second screen within a specific area displayed by a user manipulation on the second screen.

When contents that are used by a plurality of users are implemented, the controller may display on the first display a first screen which is created with contents corresponding to a first user among the plurality of users, and displays on the second display a second screen which is created with contents corresponding to a second user among the plurality of users.

The contents that are used by the plurality of users may include one or more of medical contents, educational contents, class material contents, and meeting contents.

Exemplary embodiments of the present general inventive concept also provide a multi display apparatus includes a first body including a first display, a second body including a second display, a hinge configured to connect and rotatably support the first body and the second body, a storage unit configured to store one or more contents, and a controller configured to display a first screen on the first display and display a second screen corresponding to implemented contents on the second display when one of the stored contents is implemented, and to determine and display objects on the second screen based on preset layout information regarding the second screen when the objects are selected within the first screen and moved to the second screen. The layout information may include one or more display positions on the second screen corresponding to each of one or more types of the objects.

The layout information may further include information about one or more of position, shape, color, special effect, and size of marking areas matched with the one or more types of the objects.

When a plurality of objects are selected within the first screen and simultaneously moved to the second screen, the controller displays each of the plurality of objects on the second screen according to the layout information corresponding to each of the plurality of objects.

Exemplary embodiments of the present general inventive concept also provide a display controlling method of a multi display apparatus which includes a first body including a first display, a second body including a second display, a hinge configured to connect and rotatably support the first body and the second body, a storage unit configured to store one or more contents, and a controller, the display controlling method including displaying on the first display a first screen when one of the stored contents is implemented, displaying on the second display a second screen corresponding to the implemented contents, and modifying the displayed contents on the second screen according to a user manipulation when the user manipulation is performed on the first screen.

When a plurality of the stored contents is implemented, the displaying on the first display may include consecutively overlapping and displaying a plurality of first screens corresponding to the plurality of implemented contents respectively, the displaying on the second display may include consecutively overlapping and displaying a plurality of second screens corresponding to the plurality of first screens respectively, and when one first screen is selected from among the plurality of first screens, the selected first screen is displayed on the first display on an uppermost position among the plurality of first screens, and a second screen corresponding to the selected first screen is displayed on the second display on an uppermost position among the plurality of the second screens.

When a plurality of the stored contents is implemented, the displaying on the first display may include consecutively overlapping and displaying a plurality of first screens respectively corresponding to the plurality of implemented contents on the first display, and the displaying on the second display may include consecutively overlapping and displaying a plurality of second screens respectively corresponding to the plurality of first screens on the second display. When one or more objects are selected within one first screen among the plurality of first screens, the selected objects are displayed on a second screen corresponding to the first screen.

The user manipulation performed on the first screen may select one or more objects displayed on the first screen, and move the selected one or more objects to the second display.

Meanwhile, when contents that are used by a plurality of users are implemented, the displaying on the first display may include displaying a first screen which is created with contents corresponding to a first user among the plurality of users, and the displaying on the second display may include displaying a second screen which is created with contents corresponding to a second user among the plurality of users.

In this case, the contents that are used by the plurality of users may include one or more of medical contents, educational contents, class material contents, and meeting contents.

Exemplary embodiments of the present general inventive concept also provide a display controlling method of a multi display apparatus which includes a first body including a first display, a second body including a second display, a hinge configured to connect and rotatably support the first body and the second body, a storage unit configured to store one or more contents, and a controller, the display controlling method including displaying on the first display a first screen when one of the contents is implemented, displaying on the second display a second screen corresponding to the implemented contents, selecting one or more objects included in the first screen, moving the selected objects to the second screen, and determining and displaying the moved objects on the second screen based on preset layout information, the layout information including one or more display positions on the second screen corresponding to each of one or more types of the objects.

In this case, the layout information may further include information regarding one or more of position, shape, color, special effect, and size of marking areas matched with the one or more types of the objects.

Exemplary embodiments of the present general inventive concept also provide a multi display apparatus including a first body including a first display, a second body including a second display, a hinge configured to connect and rotatably support the first body and the second body, and a controller configured to display on the first display a first screen including a plurality of editing screens having different layouts from each other, and display on the second display a second screen including a plurality of contents that can be inserted into a selected editing screen when one editing screen is selected from among the plurality of displayed editing screens.

While the selected editing screen is displayed on the first display and the second screen is displayed on the second screen, when one or more contents is selected within the second screen, the controller may move and display the selected contents to the editing screen displayed on the first display.

The plurality of editing screens may include editing screens including layouts according to which one or more displaying features of contents displayed thereon are determined according to each of one or more types of the contents, the displaying features including at least one of display position, shape, color, special effect, and size.

When a user manipulation to move the contents selected on the second screen to the editing screen displayed on the first display is input, the controller may display the selected contents according to displaying features corresponding to the types of the selected contents, among the layouts included in the editing screen.

Exemplary embodiments of the present general inventive concept also provide a display controlling method of a multi display apparatus which includes a first body including a first display, a second body including a second display, and a hinge connecting and rotatably supporting the first body and the second body, a display controlling method may include displaying on the first display a first screen which may include a plurality of editing screens having different layouts from each other, displaying a selected editing screen on the first display when one editing screen is selected from among the plurality of editing screens, displaying on the second display a second screen which includes a plurality of contents that can be inserted into the selected editing screen, and moving selected contents to the selected editing screen and displaying the selected contents on the selected editing screen when one or more contents is selected on the second screen.

The plurality of editing screens may include editing screens including layouts according to which one or more displaying features of contents displayed thereon are determined according to each of one or more types of the contents, the displaying features including at least one of display position, shape, color, special effect and size.

The contents selected on the second screen may be displayed on a position corresponding to the type of the selected contents within the layouts included in the selected editing screen.

Exemplary embodiments of the present general inventive concept also provide a multi display apparatus including a first body including a first display, a second body including a second display, a hinge configured to connect and rotatably support the first body and the second body, and a controller configured to display on the first display a first screen including preset layouts in which a plurality of contents are arranged on the first display, and displays on the second display a second screen including the plurality of contents, the contents included on the second screen being variable according to a user manipulation.

The preset layouts may be layouts according to which at least one of position, shape, color, special effect and size of marking areas is defined according to respective types of the plurality of contents.

When a user manipulation to move the contents is input, the controller may implement at least one of a web page, a multi document, a picture, and a video which includes the new contents.

When a user manipulation to move the contents displayed on the second screen is input, the controller may automatically arrange the contents according to types of the moved contents based on the preset layouts.

Exemplary embodiments of the present general inventive concept also provide a display controlling method of a multi display apparatus which includes a first body including a first display arranged therein, a second body including a second display arranged therein, a hinge configured to connect and rotatably support the first body and the second body, and a controller, the display controlling method including displaying on the first display a first screen including predefined layouts according to which a plurality of contents are arranged, displaying on the second display a second screen including the plurality of contents, the contents included on the second screen being variable according to a user manipulation.

The predefined layouts may be layouts according to which at least one of position, shape, color, special effect and size of marking areas are defined according to respective types of the plurality of contents.

The controlling method may further include implementing at least one of a web page, a multi document, a picture, and a video which includes the new contents, when the user manipulation is input.

When a user manipulation to move the contents displayed on the second screen is input, the moved contents may be automatically arranged based on the predefined layouts.

A non-transitory computer-readable recording medium may contain computer-readable codes as a program to execute the display controlling method.

Exemplary embodiments of the present general inventive concept also provide a multi display apparatus including a plurality of displays, a storage unit configured to store one or more contents, and a controller configured to implement one or more of the stored contents, to display one or more screens corresponding to the implemented contents on at least one of the plurality of displays, and to move objects from a first of the plurality of displays to a second of the plurality of displays according to a user manipulation on the first display, the moved objects being positioned on the second of the plurality of displays according to a predefined layout, the layout defining the location of objects according to one or more type of the objects.

The types of the objects may include at least one of text, images, video, audio, lists, and memos.

The multi display apparatus may further include a sensor to detect a location of each of the plurality of displays relative to the other displays.

The multi display apparatus may further include a third of the plurality of displays, the controller displaying objects on the third display different from the first display, and moving the objects displayed on the third display to the second display according to a user manipulation on the third display, the moved objects being positioned on the second display according to the predefined layout.

The multi display apparatus may further include a third of the plurality of displays, the controller displaying objects on the third display identical to those of the first display, and moving the objects displayed on the third display to the second display according to a user manipulation on the third display, the moved objects being positioned on the second display according to the predefined layout.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 17 is a diagram illustrating searching screens mapped with each other in the multi display apparatus according to another exemplary embodiment of the present general inventive concept;

FIG. 18 is a diagram illustrating adding new screen to the screens mapped with each other;

DETAILED DESCRIPTION OF THE EMBODIMENTS

Figure 1:
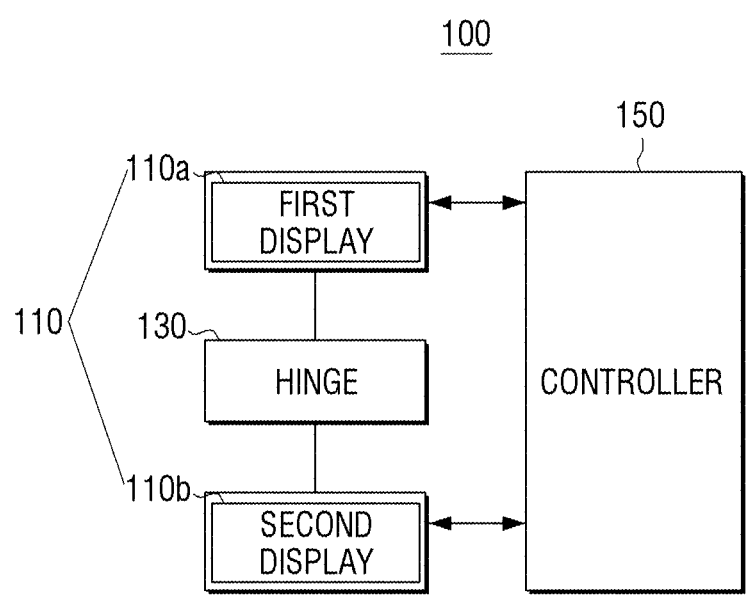
FIG. 1 is a block diagram of a multi display apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the following description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the present general inventive concept with unnecessary detail.

A 'multi display apparatus' as used herein refers to an apparatus which mounts a plurality of displays and displays sorts of screens through the plurality of displays. Specifically, the multi display apparatus may be implemented as various types of devices such as for example a tablet personal computer (PC), a portable multimedia player (PMP), a personal digital assistant (PDA), a smart phone, a cellular phone, a digital frame, and a game machine.

FIG. 1 is a schematic block diagram of a multi display apparatus 100 according to an exemplary embodiment of the present general inventive concept.

Referring to FIG. 1, the multi display apparatus 100 according to an exemplary embodiment of the present general inventive concept may include a first display 110a included in a first body, a second display 110b included in a second body, a hinge 130 that connects the first body and the second body, a controller 150 and a storage unit 170.

The first and second displays 110a, 110b may be implemented as touch screens that can sense user touches. Specifically, the first and second displays 110a, 110b may be constituted by stacking a sensor 185 (illustrated in FIG. 28) and a panel (not illustrated) on each other. The sensor 185 may include a touch sensor 185-1 (illustrated in FIG. 28) that can sense user touches and a near field sensor 185-5 (illustrated in FIG. 28) that can sense approaching user touches. The panel may be implemented as an LCD panel.

The first display 110*a* and second display 110*b* may display various screens such as a background screen including various icons, a web browsing screen, an application implementing screen, a screen to play contents such as video and pictures, and a user interface screen according to the control of the controller 150.

The hinge 130 physically joins the first display 110*a* and the second display 110*b*. To be specific, the multi display apparatus 100 may be divided into two bodies, as illustrated for example in FIG. 3. The first display 110*a* may be mounted on a first body 2 as one part and the second display 110*b* may be mounted on a second body 4 as another part.

The hinge 130 physically joins the first and second bodies to connect with each other, and performs a role of a shaft so that the first and second bodies can rotate relative to one another while being connected by the hinge 130. The hinge 130 may be implemented as an integrated type in which the hinge 130 respectively connects to the first body 2 and second body 4. Further, the hinge 130 may be implemented to connect each of the first body 2 and second body 4 on center areas or edge areas between the first body 2 and second body 4. The hinge 130 may connect the first body 2 and second body 4 in this integrated manner when being implemented with flexible material so that the first body 2 and second body 4 can be folded such that the first display 110*a* and second display 110*b* face towards or away from each other, or expanded such that the first display 110*a* and second display 110*b* are parallel to each other.

More specific exterior constitution of the first body 2, the second body 4, and the hinge 130 will be explained with reference to the drawings in a later part of the specification. The following assumes that the hinge 130 directly connects the first display 110*a* and the second display 110*b* for convenient explanation.

The hinge 130 or the multi display apparatus 100 may additionally include a hinge sensor 185-4 (illustrated in FIG. 28) that can sense a curving degree between the first display 110*a* and the second display 110*b*. The hinge sensor 185-4 can sense an angle between the first body 2 and the second body 4 step by step.

The first display 110*a* and second display 110*b* may rotate based on the hinge 130. Therefore, the first display 110*a* and second display 110*b* may be closed to contact each other, or may be opened to contact their back sides.

Further, according to constitution, the hinge 130 may be opened to spread by 180°. Operations may perform in various operation modes according to curving shape of the first and second displays 110*a*, 110*b* based on the hinge 130.

The controller 150 may perform various operations by controlling the first display 110*a* and second display 110*b* according to a user selection.

When the multi display apparatus 100 turns on and boots up, the controller 150 controls displaying a plurality of contents and application program icons on a background screen based on start program information and previously established setting information stored in the storage unit 170. Thus, on the background screen, various types of icons, including icons to implement various applications, may be displayed.

A user may select at least one of the icons by using various inputting methods such as touching a screen, a motion gesture, a voice command, and button manipulation. The following will explain based on user manipulation of touching a display screen for convenient explanation. In this case, user manipulation indicates that a user pushes the display screen for a certain time or slides on the display screen while pushing. User manipulation may be performed with a user object (not illustrated), which may include fingers. However, the user object may also include a pen, a pencil, and a conductive pointer.

When the icon selected by a user is implemented, the controller 150 displays first screen on the first display 110*a* and second screen on the second display 110*b*. The first and second screens may correspond with each other. For example, when a user performs a user manipulation on the first screen, the controller 150 may sense the user manipulation, and may modify the second screen according to the user manipulation. The first and second screens may include screens created by implementing applications. For example, when an electronic book program is implemented and electronic book contents to be read are selected, the first or second screen may be an electronic book screen which may include the electronic book contents on a page basis. Alternatively, when a multimedia playing program is implemented and multimedia contents to be played are selected, the first or second screen may correspond to a contents playing screen. Furthermore, the first and second screens may be created by implementing various programs such as a document writing program, an electronic mail program, a messenger program, a game program, or a web browser program.

The controller 150 displays various screens on the first and second displays 110*a*, 110*b* by using programs and contents stored in the storage unit 170. The controller 150 may modify features such as display position, layout, displaying description, shape, and display time according to user manipulation on each screen, user position, or environmental changes surrounded with the multi display apparatus 100.

The following will explain operation of the multi display apparatus 100 according to various exemplary embodiments of the present general inventive concept that modify a screen.

According to a first exemplary embodiment of various embodiments of the present general inventive concept, the controller 150 automatically displays a second screen mapped with the first screen on the second display 110*b* when first screen is displayed on the first display 110*a*.

To be specific, when a user selects icon displayed on the first or second display 110*a*, 110*b*, the controller 150 displays the first screen on the first display 110*a* by implementing a corresponding program to the selected icon. The controller 150 displays the second screen related with the first screen displayed on the first display 110*a* on the second display 110*b*.

"Relevancy" between the first screen and the second screen indicates that source data are uniform regarding the two screens, or that changes in one screen affect the other screen if changes occur while source data are different.

Consider the case of uniform source data. When a specific application is implemented in the multi display apparatus 100, contents for a first user (user 1) are displayed on the first screen and contents for a second user (user 2) are displayed on the second screen. In this case, the first screen and the second screen share the uniform source data while contents descriptions displayed on the screens are different according to different users.

When a user implements several programs or selects several contents, the first screen may be created in plural numbers and displayed. In this case, the controller 150 creates a plurality of second screens respectively corresponding to a plurality of first screens and displays the plurality of second screens on the second display 110b.

For example, the first screen may be implemented in plural numbers regarding various course textbooks such as math, native language and English, and the second screen may be implemented in plural numbers regarding notebooks per course textbook such as math, native language and English.

In this case, the controller 150 may control the displaying of the plurality of first screens on the first display 110a such that they overlap, and similarly control the display of the plurality of second screens on the second display 110b. A user can watch the uppermost screen with his or her eyes. A user may select a screen that he wants to watch by switching between the plurality of first screens with a user input. The user input may include touch or a button manipulation, such as touching, flicking, or dragging screens displayed on the first display 110a. When one of the plurality of first screens is selected, a second screen corresponding to the first screen is automatically selected from among the plurality of second screens and displayed on the second display 110b. For example, when a math textbook screen is displayed on the first display 110a, a math notebook screen may be automatically displayed on the second display 110b.

Further, while the first and second screens are respectively displayed on the first display 110a and the second display 110b, when contents included in one screen of the first and second screens is edited, such as being modified, moved, or changed, the controller 150 synchronizes the first and second screens with each other by sensing the editing in one of the first and second screens and reflecting the edits in the other of the first and second screens.

Further, when a specific application is implemented in the multi display apparatus 100, original contents may be displayed on the first screen and the copied contents may be displayed on the second screen. For example, when an educational application is implemented, the original contents may indicate descriptions of textbooks, and the copied contents indicate descriptions of notebooks when a user writes. In this case, the copied contents share the uniform source data and may include parts of the original contents descriptions. Contents included in the original contents may be a screen that can be moved and edited, and the contents may be included in the copied screen by performing a copy-and-paste operation with the contents included in the original contents. A user may change, modify, and move the previously included contents.

The following will explain the case that source data of the first and second screens are different to each other.

The first screen displayed on the first display 110a may be a screen which a multi document editing application implements, and the second screen displayed on the second display 110b may be source data screen which may include various contents. For example, documents to be edited may be displayed on the first display screen and a specific web page may be displayed on the second display screen.

The first screen may be a prewritten multi document, or a multi document including preset layouts only. "Multi document" indicates a multimedia document which may include text, images, video, voices, pictures, lists, sorts of icons, and pop-ups. Such a multi document may be edited by a user, and the edited multi document may be stored in the storage unit 170 in various formats. Preset layouts indicate arrangements which size, position, shape and format are defined according to types of contents. Thus, according to various types of multi documents, preset layouts may be arranged or edited.

The second screen may be a web page which may include source contents constituting the first screen such as various pictures, text, video, and images. The second screen may be a prewritten multi document other than web page. Further, the second screen may be pictures stored in the storage unit 170 of the multi display apparatus 100 or albums such as video.

According to various exemplary embodiments of the present general inventive concept, the controller 150 may modify and move size, position, shape, and figure of various contents according to preset layouts of the first and second screens when various contents displayed on the first and second screens are moved to the first and second screens. Considering that the size of the contents may be modified, when a size of the original contents is 640×320 resolution and the corresponding area where corresponding contents moves is 320×240 resolution, the size of the original contents is reduced according to the resolution of the corresponding area. A method of reducing size is not merely reducing the size physically, but also reducing the resolution by reducing the physical size of the corresponding original contents.

Therefore, the controller 150 forms the first screen by reading the prewritten multi document file from the storage unit 170 and displays the formed first screen on the first display 110a.

When the controller 150 determines that there is a second screen mapped with the first screen, it reads source data to constitute the second screen from the storage unit 170. The controller 150 creates the second screen by using the read source data and displays the created second screen on the second display 110b.

When there is no second screen mapped with the first screen, the controller 150 may read and display another multi document as the second screen, or may display another application implementing screen additionally performed by a user as the second screen.

Herein, various applications separately performed by a user may be various multimedia applications such as for example a web browser, an image editing application, and a document editing application. A document editing application indicates an application which can create complete multi documents by displaying a screen including a preset layout, and copying and pasting contents from original contents, including various contents such as a web browser.

The controller 150 may implement the first and second screens each as a singular document or as a plurality of documents having a plurality of pages overlapped therein. The plurality of documents displayed on the first and second screens may additionally include metadata that can be used to search or arrange the documents. The controller 150 automatically searches screens displayed on the second screen when screens displayed on the first screen are searched by using the metadata and considering relevancy between the plurality of documents. "Relevancy" between the first and second screens indicates relatedness by the metadata.

While the first and second screens created by overlapping the plurality of multi documents are displayed on the first display 110a and the second display 110b, when a specific page among the plural pages is selected by a user, the controller 150 displays the first screen by putting the corresponding selected page as uppermost among the plurality of pages.

Further, the controller 150 displays a page corresponding to the page selected in the first screen among the plurality of multi documents constituting the second screen as uppermost. Thus, when there is relevancy between the first and second screens, and the page of the first screen moves, the controller 150 moves a corresponding page on the second screen.

The controller 150 may simultaneously modify the second screen according to a user manipulation on the first screen. In other words, when descriptions of the first screen are modified or added, the controller 150 simultaneously reflects the modified or added description on the second screen.

For example, when a user inputs a user manipulation to write a memo on the first screen, the controller 150 senses the inputted memo on the first display 110a, allocates identifying information to the corresponding memo, and modifies the memo to a proper, specific format. The controller 150 adds the modified memo in the specific format to the second screen displayed on the second display 110b and displays the second screen with the modified memo. Further, the controller 150 modifies source data of the second screen used to create the second screen displayed on the second display 110b and stores the modified source data in the storage unit 170.

Further, when a user inputs a user manipulation which selects parts of contents displayed on the first screen, the controller 150 senses the selected parts of the contents on the first display 110a, allocates identifying information to the corresponding parts of contents, and modifies the parts to a proper, specific format. The controller 150 adds the modified parts in the specific format to the second screen displayed on the second display 110b and displays the second screen with the modified memo. Further, the controller 150 modifies source data of the second screen used to create the second screen displayed on the second display 110b and stores the modified source data in the storage unit 170.

The method of sensing user manipulation with the controller 150 utilizes pixel information of the first display 110a and the second display 110b. When the touch sensors 185-1 (illustrated in FIG. 28) mounted on the displays 110a, 110b sense that parts of contents are displayed by a user, the controller 150 identifies a marking area by using pixel information from start position that user marking starts to an end position where the user marking ends on the first display 110a and the second display 110b. The controller 150 extracts contents information included in the identified marking area.

Specifically, when a user touches the first screen while the first screen is displayed on the first display 110a, the controller 150 senses user touches by using the touch sensor 185-1 mounted on the first display 110a. Therefore, X coordinate and Y coordinate values of the touched area are calculated.

Since the specification may include the multi display 110, X coordinate and Y coordinate on the first display 110a and the second display 110b use a singular uniform coordinate axis. Thus, X1 coordinate and Y1 coordinate touched on the first display 110a and X2 coordinate and Y2 coordinate touched on the second display 110b may be calculated differently from each other even when same points are touched on each of the display screens.

For example, if a standard pixel is defined as having an X and Y value of 0, 0, and an X1 coordinate of first touched area on the first display 110a is a point which moves from the standard pixel by 10 pixels toward a right direction, and if a Y1 coordinate is a point which moves from the standard pixel by 20 pixels toward a lower direction, the coordinate value of the first touched area is (10, 20). If a user touches the same point as the point touched on the first display 110a on the second display 110b, the X2 coordinate value of corresponding second touched area may be for example 610 pixels, which is the X1 coordinate of the first touched area added with 600 pixels, and the Y2 coordinate value is a point which moves from the standard pixel by 20 pixel toward the lower direction uniformly with the Y1 coordinate. Thus, coordinate values of the second touched area is (610, 20).

Further, when selecting is performed based on a certain area, the selected screen area may be displayed on the second screen. In this case, when the first screen is renewed, the second screen may be renewed together with the first screen.

According to another exemplary embodiment of the present general inventive concept, the controller 150 displays templates which include preset layouts as a first screen on the first display 110a and a source page which may include source contents to create the templates of the first screen as a second screen on the second display 110b.

In the templates displayed as the first screen, layouts of pictures, images, text, and icons, e.g., size, position, shape and arrangement form are previously established. However, the templates are not fully filled with images, pictures, text, and icons; a user may freely move and copy various contents according to the preset layouts.

Herein, the second screen may include various contents such as pictures, images, text, and icons. For example, the second screen may be a specific web site or a specific web page. Corresponding web sites or web pages may include various text, images, and pictures.

When a user performs manipulation to select various contents displayed on the second screen and to move the selected contents to the first screen, the controller 150 analyzes the contents to be moved, and automatically adjusts the size and position of the moved contents according to the preset layouts on the first screen.

Thus, when user manipulation to select a first image and a first text included in the second screen and move the selected contents to the first screen is input by a user, the controller 150 senses the user manipulation and extracts the first image and the first text based on the sensed user manipulation. The controller 150 analyzes size, position and features of the extracted first image and first text. The controller 150 analyzes the preset layouts on the first screen and confirms positions at which the first image and text may be arranged. The controller 150 modifies size, shape and format of the first image and first text according to preset sizes of the confirmed position.

The storage unit 170 stores sorts of source data which form the screens processed by the controller 150 as described above. The storage unit 170 may further store sorts of programs and data used in operation of the multi display apparatus 100.

Figure 2:
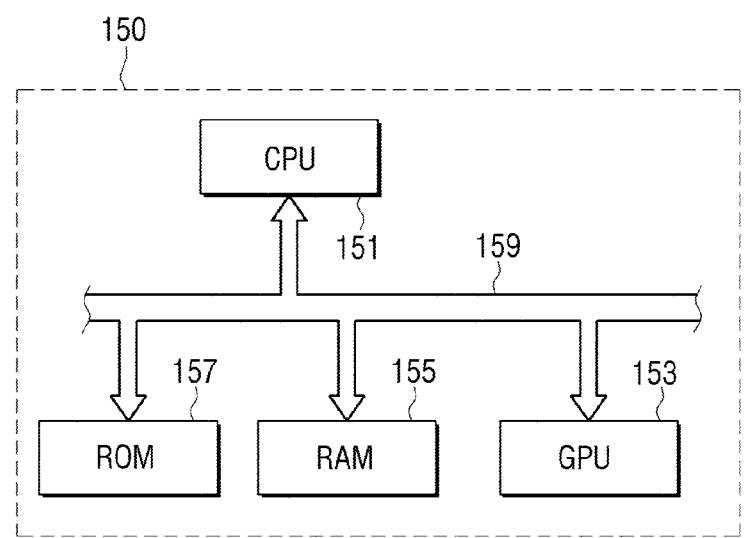
FIG. 2 is a detailed block diagram of a controller illustrated in FIG. 1.

FIG. 2 is a block diagram illustrating a detailed constitution of the controller 150 in the multi display apparatus 100 according to various exemplary embodiments of the present general inventive concept. Referring to FIG. 2, the controller 150 of the multi display apparatus 100 may include a Central Processing Unit (CPU) 151, a Graphics Processing Unit (GPU) 153, a Random Access Memory (RAM) 155, a Read Only Memory (ROM) 157 and a system bus 159. The following will briefly explain operation of the controller 150.

The CPU 151 controls the units included in the multi display apparatus 100 (illustrated for example in FIG. 28) as well as the internal units included in the controller 150 (illustrated for example in FIG. 2). Specifically explained, the CPU 151 controls functions regarding sorts of blocking units while communicating with each unit included in the controller 150 through the system bus 159, and controls units included in the multi display apparatus 100 by collecting the controlling results and transmitting controlling signals to the units connected to the controller 150 based on the controlling results.

For example, the CPU 151 performs booting by using booting information previously stored in the ROM 157. The CPU 151 reads data stored in the storage unit 170 to the RAM 155 and delivers data that needs to be graphic-processed among the data stored in the RAM 155 to the GPU 153. The CPU 151 displays image on the multi display 110 by receiving the data graphic-processed by the GPU 153 and delivering the data to an LCD controller (not illustrated) connected with the system bus 159.

The CPU 151 temporarily stores the image data processed by the GPU 153 in a virtual frame buffer (not illustrated) allocated on predetermined area of the RAM 155. The CPU 151 allocates virtual frame buffer area to support maximum resolution (e.g., 1024×600) of the multi display 110. When a first display 110a and a second display 110b are mounted, the CPU 151 allocates virtual frame buffer area as 1024×1200.

The CPU 151 performs digital signal processing by inputting data temporarily stored on the virtual frame buffer to the GPU 153.

The GPU 153 performs graphic processing on the inputted data under controlling of the CPU 151. Specifically, the GPU 153 may create a screen which may include various objects such as icons, images and text by using a calculator (not illustrated) and a renderer (not illustrated). The calculator calculates feature values such as coordinate values, shapes, sizes and colors which each object will be displayed according to the layouts of the screen. The renderer creates screen in various layouts which may include objects based on the calculated feature values in the calculator. The screen created in the renderer may be delivered to the first display 110a and the second display 110b through the system bus 159 and displayed within the marking area, or may be stored in the storage unit 170.

The CPU 151 may control the displaying of the data graphic-processed by the GPU 153 through one or more the first display 110a and the second display 110b, or storing the data in the storage unit 170. Further, the CPU 151 may input the processed data to a display controller (not illustrated).

The GPU 153 may further include a decoder (not illustrated), a renderer (not illustrated), and a scaler (not illustrated). Thereby, the GPU 153 decodes stored contents, constitutes a frame by rendering the decoded contents data, and scales size of the constituted frame to the display size according to controlling of the display controller. If the screen is displayed on one or more the first display 110a and the second display 110b, The GPU 153 scales the screen according to the size of each display. If screen is displayed on both of the two displays, the GPU 153 scales the screen according to the total size of the two displays. The GPU 153 provides and displays the processed frame on the display.

The ROM 157 stores sets of commands to boot the system. When a command to turn on is input and electrical power is provided, the CPU 151 copies a stored OS 420 (illustrated in FIG. 29) in the storage unit 170 to the RAM 155 according to the stored command in the ROM 157, and boots the system by implementing the OS 420. When booting completes, the CPU 151 copies sorts of application programs stored in the storage unit 170 to the RAM 155 and performs sorts of operations by implementing the copied application programs in the RAM 155. In summary, the CPU 151 may perform various functions according to implementation of the application programs stored in the storage unit 170.

Figure 3:
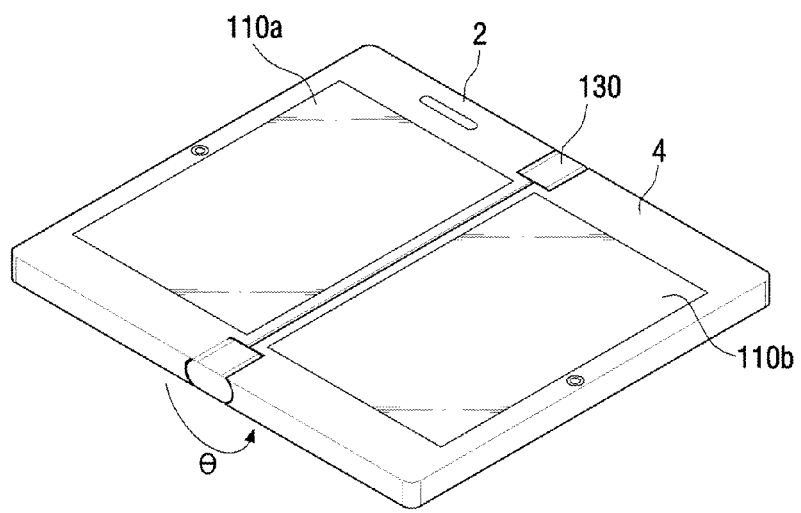
FIG. 3 is a perspective view illustrating the multi display apparatus which operates in a first screen mode according to an exemplary embodiment of the present general inventive concept.

FIG. 3 is a perspective view illustrating the multi display apparatus 100 operating in a first screen mode according to an exemplary embodiment of the present general inventive concept.

Referring to FIG. 3, a first body 2 and a second body 4 connect with the hinge 130. Angle (θ) between the first display 110a included in the first body 2 and the second display 110b included in the second body 4 can be from 0° to 360°. FIG. 3 illustrates that θ is 180° so that the first display 100a and the second display 110b can directed towards the same direction.

Different screens may be displayed in each of the first display 110a and the second display 110b. The first screen and the second screen displayed by the first display 110a and the second display 110b are controlled by the controller 150. The following will specifically describe a method of controlling the multi display 110 driven in the multi display apparatus 100 illustrated in FIG. 3.

Figure 4:
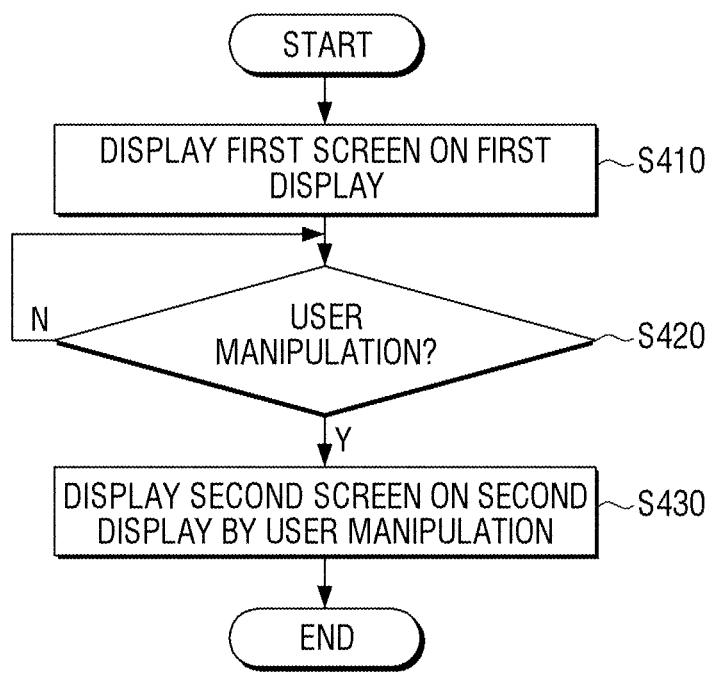
FIG. 4 is a flowchart illustrating a display controlling method of the multi display apparatus of FIG. 3.

FIG. 4 is a flowchart illustrating a method of controlling the multi display 110 of the multi display apparatus 100.

Referring to FIG. 4, the multi display apparatus 100 displays the first screen on the first display 110a at operation S410, and displays the second screen on the second display 110b at S420. The multi display apparatus 100 determines whether there is user manipulation on one of the displayed screens among the screens of the first display 110a and the second display 110b at operation S420. For example, when user manipulation on the first screen is sensed at operation S420-Y, the multi display apparatus 100 modifies not only the first screen but also the second screen according to the user manipulation, and displays at operation S430. Alternatively, if there is no user manipulation (operation S420-N), the multi display apparatus 100 waits for there to be a user manipulation.

Herein, the first and second screens are screens which may include one or more contents. User manipulation on the screens may include an editing operation such as modifying, inputting and moving contents on the first screen, and a searching operation to search a plurality of pages displayed on the first screen.

Editing contents is an operation to modify descriptions of contents included in the first and second screens. Contents inputting is operation to add new contents on the first and second screens. Moving contents is an operation to copy contents included in the first and second screens and paste the copied contents to the other screen.

The following will specifically describe synchronization between screens according to user manipulation according to an exemplary embodiment of the present general inventive concept by referring to another drawing.

First, the multi display apparatus 100 displaying the first and second screens according to various exemplary embodiments of the present general inventive concept will be briefly explained.

Figure 5:
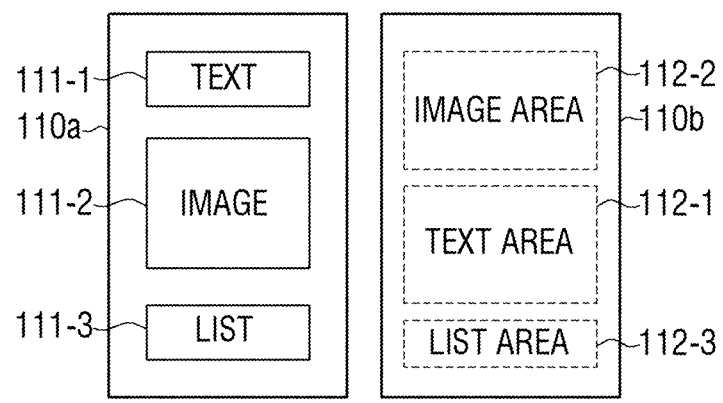
FIG. 5 is a diagram illustrating layouts of contents displayed on the multi display apparatus according to an exemplary embodiment of the present general inventive concept.

FIG. 5 illustrates an example of screen layouts displayed in the multi display apparatus 100 according to an exemplary embodiment of the present general inventive concept.

Referring to FIG. 5, the first screen which first text 111-1, first image 111-2, and first list 111-3 are included is displayed on the first display 110a. The second screen which first image area 112-2, first text area 112-1, and first list area 112-3 are consecutively arranged according to preset layouts is displayed on the second display 110b.

The first display 110a displays the first screen including first text 111-1, first image 111-2, and first list 111-3.

On the first screen, contents such as first text 111-1, first image 111-2, and list 111-3 are divided with each other. On the second screen, first image area 112-2, first text area 112-1, and first list area 112-3 are areas where various types of contents may be arranged.

The first screen may be a web page screen which may include various contents, including images, pictures, video, text, figures, and charts. When a web browser is implemented by a screen user, the first display 110a may display various web page screens.

Further, the first screen may display multi documents which include one or more prestored images, pictures, video and text.

On the second screen displayed on the second display 110*b*, contents having an image file format may be arranged in the first image area 112-2, contents having a text file format may be arranged in the first text area 112-1, and contents having a list file format may be arranged in the first list area 112-3. Thus, the second screen may be multi document editing screen which can support various layouts according to an editing purpose of a user.

If the first screen displays multi documents, the second screen may display multi documents linked with the first screen. The multi documents constituting the first screen and the multi documents constituting the second screen may be linked by metadata.

For example, if the multi documents displayed as the first screen are multi documents from which specific internet articles are taken, the multi documents displayed as the second screen are multi documents which can be newly written by a user. Herein, the newly written multi documents include layouts preset by a user.

Because the first screen is linked with the second screen, when contents are edited on the first screen, same editing may be reflected on the second screen. On the contrary, when new contents are added on the second screen, corresponding new contents may be added on the first screen.

Thus, because the first screen and the second screen are interlocked by controlling of the controller 150, when an editing event, such as modifying, occurs on any one of the screens, the editing event is reflected on the other screen.

The following will explain moving and copying contents from the first screen to the second screen.

Figure 6:
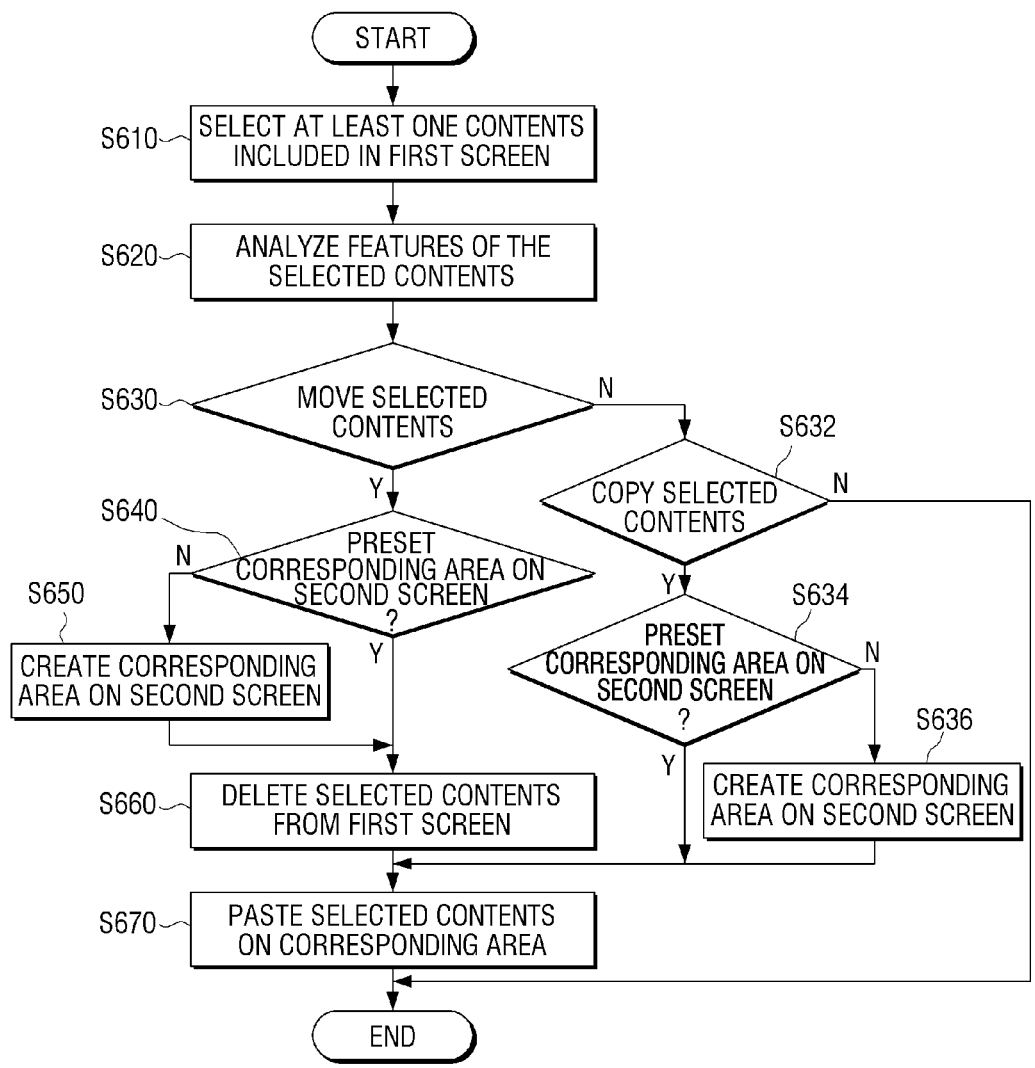
FIG. 6 is a flowchart illustrating a display controlling method of the multi display apparatus according to an exemplary embodiment of the present general inventive concept.

FIG. 6 is a flowchart illustrating moving contents among the display controlling methods of the multi display apparatus 100 according to another exemplary embodiment of the present general inventive concept.

Referring to FIG. 6, while the first screen is displayed on the first display 110*a* of the multi display apparatus 100, when a user selects at least one contents included in the first screen at operation S610, the multi display apparatus 100 senses the selection of contents and analyzes features of the selected contents at operation S620. Contents may be one or more images, video, text, graphs, lists and figures. These contents features can be determined by analyzing data features of source files. A user may move to the second screen contents after selecting the contents. The multi display apparatus 100 determines whether to move the selected contents by confirming changes of the touched coordinates at operation S630. User manipulation may be implemented with touch inputs, such as flicking or touching & dragging.

When contents displayed on the first screen are moved to the second screen by user manipulation (operation S630-Y), the multi display apparatus 100 determines whether there are preset areas where corresponding contents can be arranged on the second screen at operation S640. For example, when the moved contents is an image and it is determined that there is not an image area that the image can be arranged on (operation S640-N), an area where the image area can be arranged is automatically generated on the second screen at operation S650. Alternatively, a user may passively generate an image area on the second screen. Further, the controller 150 may display informing message that an image area cannot be arranged on the second screen. In this case, a user may modify the second screen to a new second screen including different layouts, including one or more areas where the selected contents can be arranged.

When the image area where an image can be arranged is created on the second screen at operation S650 or is determined to exist on the second screen at operation S640-Y, the selected contents on the first screen is deleted at operation S660. At operation S670, the selected contents are pasted on the corresponding area of the second screen.

If the selected contents are not moved (operation S630-N), it is determined whether the selected contents is copied at operation S632. If it is determined that the contents are not copied (operation S632-N), the process ends. When the contents are copied at operation S632-Y, whether there is a preset corresponding area on the second screen is determined at operation S634. When there is preset corresponding area at operation S634-Y, the selected contents is pasted on the corresponding area at operation S670. If there is no preset corresponding area at operation S634-N, the corresponding area is generated on the second screen at operation S636, and subsequently the selected contents are pasted at operation S670.

The following will describe moving contents between the first and second screens displayed on the first display 110*a* and the second display 110*b* of the multi display apparatus 100 by referring to illustrative drawings.

Figure 7:
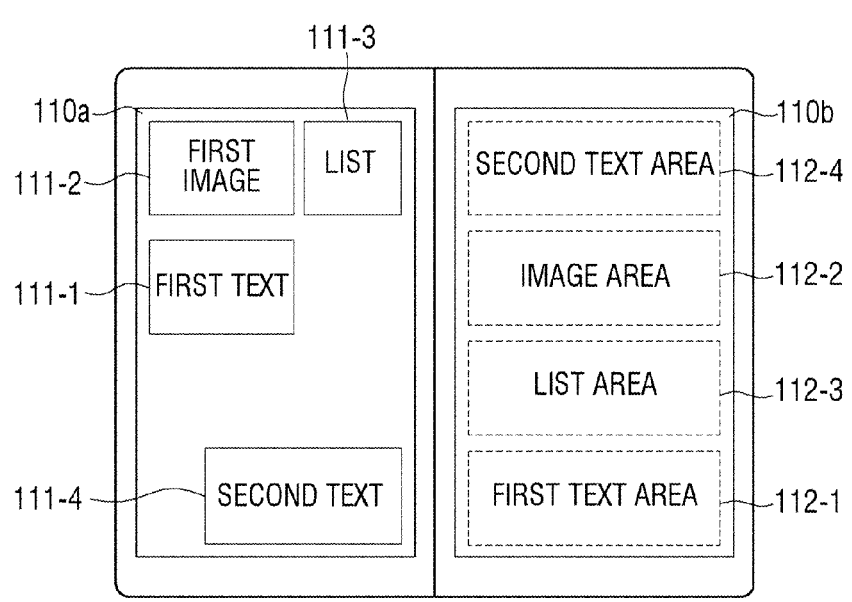
FIG. 7 is a diagram illustrating layouts of contents displayed on the multi display apparatus which the display controlling method of FIG. 6 is applied.

FIG. 7 is a diagram exemplarily illustrating layouts of screens displayed on the display of the multi display apparatus 100 which the display controlling method of FIG. 6 is applied.

Referring to FIG. 7, the first display 110*a* displays the first screen including the first text 111-1, the first image 111-2, the first list 111-3 and the second text 111-4. The second display 110*b* displays the second screen including preset corresponding areas 112-1, 112-2, 112-3, and 112-4, on which various contents can be arranged.

The screen of the first display 110*a* in FIG. 7 may be a specific web site after a web browser is implemented. Further, it may be a previously created multi document, a picture menu including a plurality of pictures, a video menu including a plurality of videos, and an implementing screen of the document editing application.

On the second display 110*b* in FIG. 7, the screen may be a blank multi document including preset layouts. "Blank multi document" indicates a multi document which may include corresponding areas that various types of contents can be arranged, while the corresponding areas are not necessarily all filled with contents.

When a user moves various contents displayed on the first screen to the second screen by a user manipulation, the second screen arranges the moved contents on the corresponding areas by automatically adjusting sizes, positions, shapes, and formats of the contents. One or more contents may be moved from the first screen to the second screen.

First, moving contents from the first screen to the second screen will be specifically explained.

Figure 8:
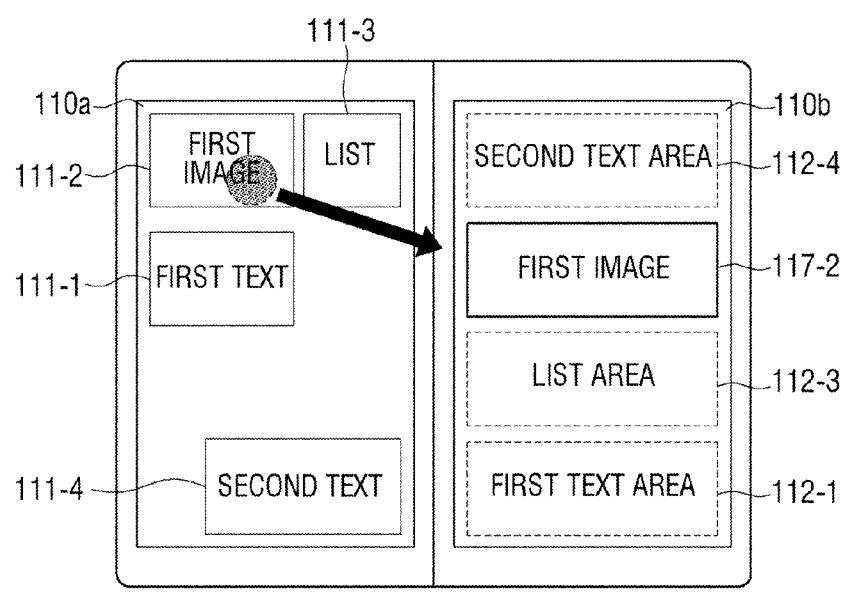
FIGS. 8 and 9 are diagrams illustrating moving contents on the display screen illustrated in FIG. 7.

FIG. 8 is a diagram illustrating display screens to explain moving contents on the display screens of FIG. 7.

Referring to FIG. 8, user manipulation to select and move the first image 111-2 in the first screen displayed on the first display 110*a* to the second display 110*b* direction is input, as indicated by the dot and arrow. Because the first image 111-2 is an image file format, analyzing features of the contents is performed accordingly. According to the analysis results, whether there is a corresponding area that the image contents can be arranged on the second screen is determined.

As illustrated in FIG. 8, when the first image area 112-2 is generated or determined to already exist on the second screen, the multi display apparatus 100 may copy the first image 111-2 and display the image on the corresponding area 112-2 of the second screen, or cut the first image 111-2 from the first screen and paste the first image to the corresponding area 112-2. In the case of copying, the original first image 111-2 remains on the first screen after being displayed in the corresponding area 112-2 on the second screen. In the case of cutting and pasting, the original first image 111-2 is deleted from the first screen and displayed on the corresponding area 112-2 of the second screen. In either case, first image area 112-2 is filled, thereby generating the corresponding first image 117-2 on the second display 110b. According to the exemplary embodiment, when a user touches contents of the first screen and performs an appropriate user manipulation, such as for example a flick or a drag operation in the direction of the second screen, pasting on the defined area of the second screen may be automatically performed.

When contents move from the first screen to the second screen, the multi display apparatus 100 may adjust a size and shape of corresponding contents according to a size and shape of the area to which the contents will be moved. Referring to the screen of FIG. 8, since the corresponding area 112-2 is larger than the first image 111-2, the size of the first image 111-2 on the first screen is expanded while moving to the corresponding area 112-2 of the second screen.

According to an exemplary embodiment of the present general inventive concept, sizes, positions, formats and shapes of the contents to be moved are automatically modified without separate user manipulation and pasted on the corresponding areas. Thus, editing multi documents can be performed easily.

According to an exemplary embodiment of the present general inventive concept, contents may be moved/copied as illustrated in FIG. 8. According to another exemplary embodiment of the present general inventive concept, a plurality of different contents can be moved/copied simultaneously.

Figure 9:
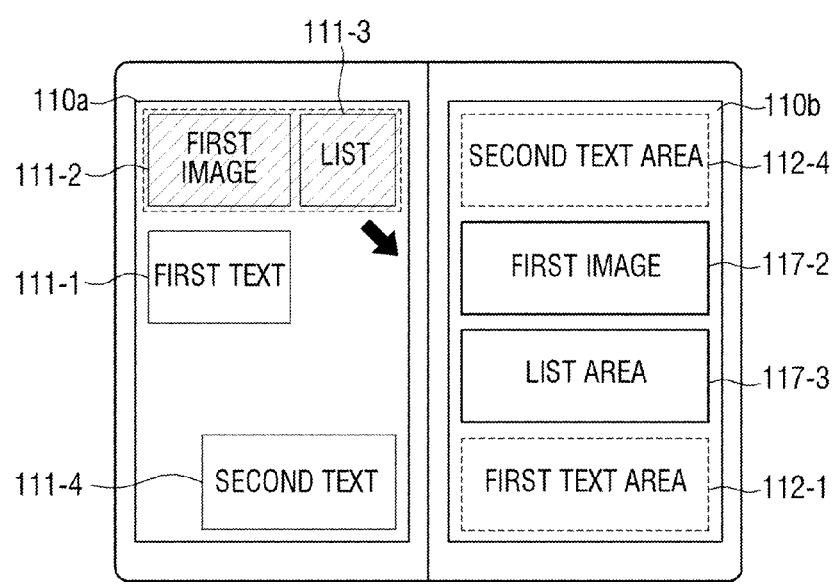

FIG. 9 is a diagram illustrating exemplary display screens to explain moving a plurality of contents on the display screens of FIG. 7.

Referring to FIG. 9, a user manipulation is input to select the first image 111-2 and the first list 111-3 in the first screen displayed on the first display 110a, and to move the selected contents in the direction of the second display, as illustrated by the cross-hatched area and the arrow. Features of the selected first image 111-2 and the first list 111-3 are analyzed according to the user manipulation. The first image 111-2 is analyzed as an image file format, and the first list 111-3 is analyzed as a list file format. When the analysis of the contents features is completed, whether there is an area that the first image 111-2 can be arranged on the second screen is determined. When the first image area 112-2 is generated, or is determined to already exist on the second screen, the first image 111-2 is copied from the first screen, moved to the corresponding area 112-2 of the second screen, and pasted by user manipulation.

Likewise, the first list 111-3 is analyzed as a list file format. When the analysis of the contents features is completed, whether there is area 112-3 that the first list 111-3 can be arranged on the second screen is determined. When the first list area 112-3 is generated, or is determined to already exist on the second screen, the first list 111-3 is copied from the first screen, moved to the corresponding area 112-3 of the second screen, and pasted by user manipulation.

As illustrated in FIG. 9, sizes of the first image 111-2 and the first list 111-2 are smaller than the corresponding areas 112-2 and 112-3 on the second screen. Accordingly, similarly to FIG. 8, the sizes of the first image 111-2 and the first list 111-3 on the first screen are expanded while moving to the second screen. Further, features regarding the plurality of contents are analyzed and corresponding contents can be automatically arranged on the corresponding areas based on the analyzing results.

Therefore, according to the present general inventive concept, a plurality of contents on one screen can be moved to another screen with one touch manipulation of a user, corresponding contents can be arranged in proper positions on the other screen without separate manipulation, and sizes, formats, and shapes of the contents can be automatically adjusted.

According to the various exemplary embodiments of the present general inventive concept, if new contents are added on the first screen, or previous contents on the first screen are modified, these modifications of the first screen are automatically reflected in the second screen. Thus, the first screen and the second screen can be synchronized with each other.

Figure 10:
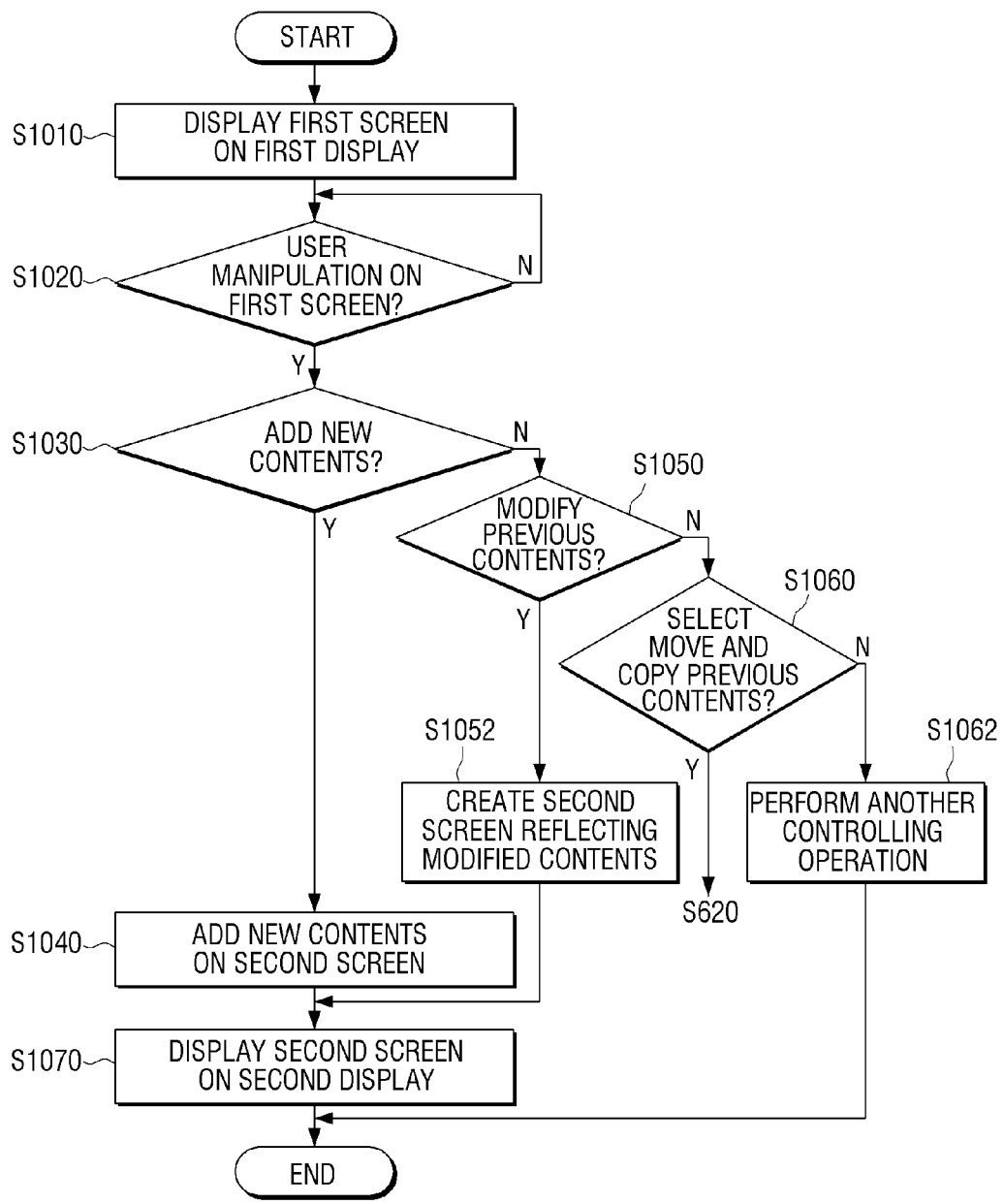
FIG. 10 is a flowchart illustrating a display controlling method of the multi display apparatus according to another exemplary embodiment of the present general inventive concept.

FIG. 10 is a flowchart illustrating copying contents among the display controlling methods of the multi display apparatus 100 according to another exemplary embodiment of the present general inventive concept.

Referring to FIG. 10, the multi display apparatus 100 displays the first screen on the first display 110a at operation S1010. At this process, the first screen is an implementing screen which specific application implements, and includes one or more contents, which may include various contents such as images, text, pictures, video and voices.

When user manipulation on the first screen is performed by a user, the multi display apparatus 100 senses whether there is user manipulation at operation S1020. If there is not a user manipulation (operation S1020-N), the multi display apparatus waits until there is such a user manipulation. When a user manipulation is sensed on the first display 110a at S1020-Y, the user manipulation is analyzed and it is determined whether to add new contents according to the analyzed results at operation S1030. If new contents are added at operation S1030-Y, the added contents on the first screen are also added to the second screen at operation S1040. The second screen including the added new contents is displayed on the second display 110b at operation S1070. Adding new contents will be further described below by referring to FIG. 11.

Figure 11:
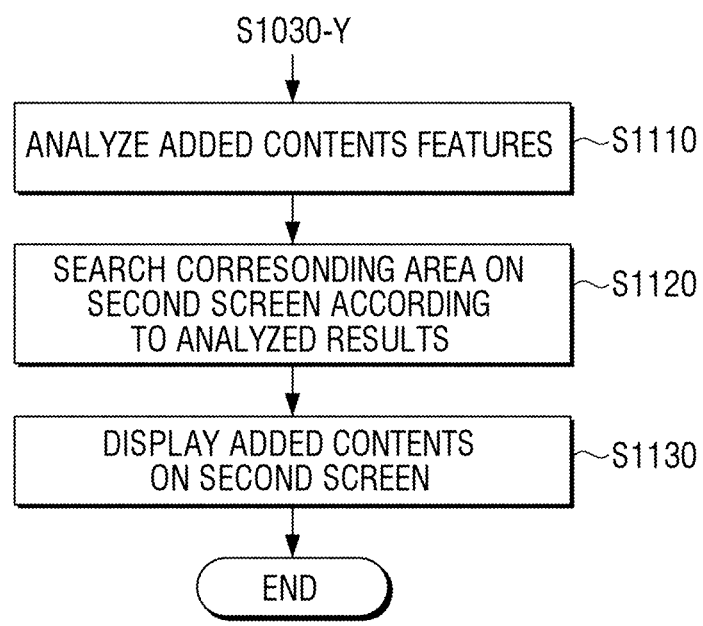
FIG. 11 is a flowchart illustrating adding new contents.

FIG. 11 is a flowchart illustrating adding new contents among the contents copying method illustrated in FIG. 10. Referring to FIG. 11, when new contents are determined to be added at operation S1030-Y, features of the added contents are analyzed at operation S1110. Contents features indicate various types of contents such as images, pictures, text, video and lists. Such contents features are obtained by analyzing source data of corresponding contents.

According to the analysis results, a corresponding area on the second screen is searched for at operation S1120. When there is corresponding area, the contents are added to the corresponding area. When there is no corresponding area, a new area is generated and the contents are added to the generated new area.

The second screen including the added contents is displayed on the second display 110b at operation S1130.

When new contents are added to the first screen by a user, the added contents may be automatically reflected on the second screen. This will be specifically described by referring to illustrative drawings.

Figure 12:
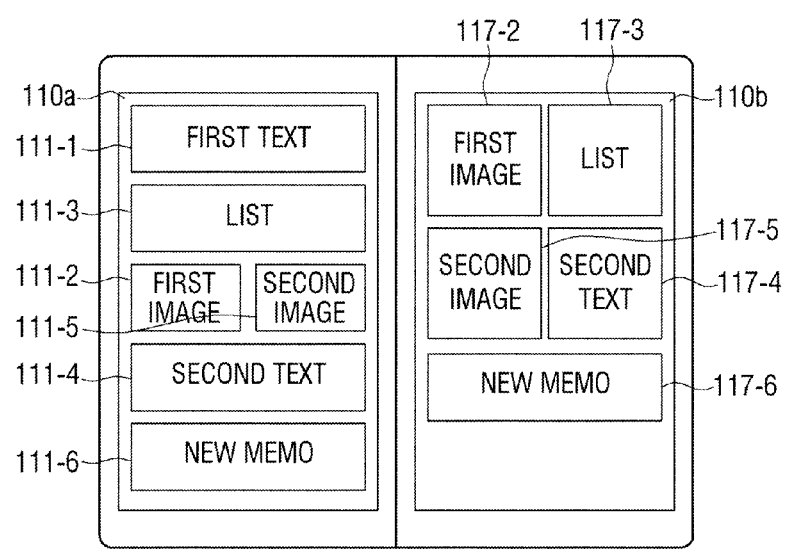
FIG. 12 is a diagram illustrating exemplary display screens to explain adding new contents.

FIG. 12 is a diagram illustrating exemplary display screens to explain adding new contents according to the method illustrated in FIGS. 10 and 11.

Referring to FIG. 12, the first display 110a displays the first screen which may include for example the first text 111-1, the first image 111-2, the first list 111-3, the second text 111-4, and a second image 111-5.

The second display 110*b* displays the second screen which may include a first list 117-3 corresponding to the first list 111-3 displayed on the first display 110*a*, a first image 117-2 corresponding to first image 111-2 displayed on the first display 110*a*, a second text 117-4 corresponding to the second text 111-4 displayed on the first display 110*a*, and a second image 117-5 corresponding to second image 111-5 displayed on the first display 110*a*.

When a user adds a new memo to the first screen by touching the first display 110*a* and writing a new memo, new memo 111-6 is created and displayed on the first screen. Simultaneously, another new memo 117-6 corresponding to the new memo 111-6 is created and additionally displayed on the second display 110*b*.

Returning to FIG. 10, if new contents are not added at operation S1030-N, whether to modify previous contents is determined at operation S1050. If previous contents are determined to be modified at operation S1050-Y, descriptions of the previous contents included in the first screen are modified and the second screen reflecting the modified contents is created at operation S1052.

Figure 13:
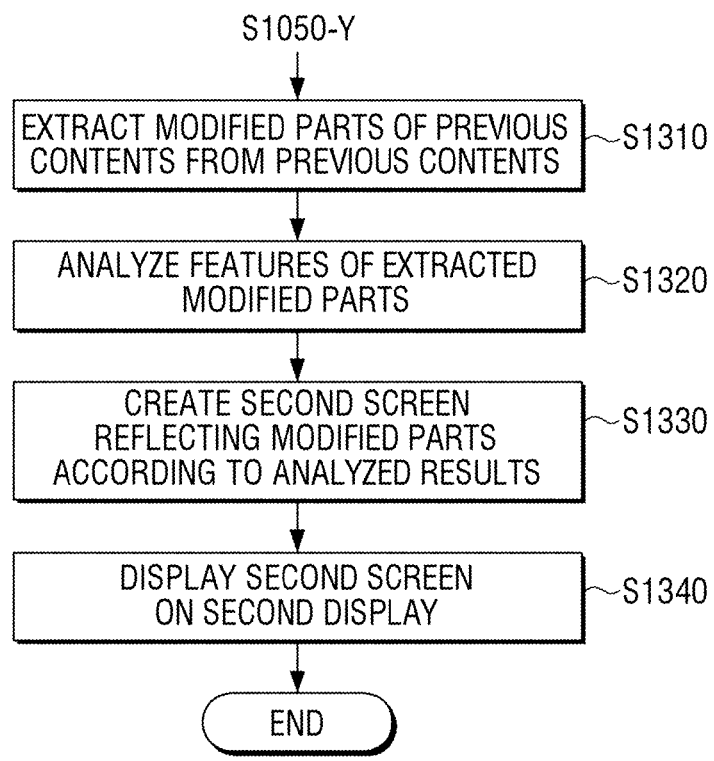
FIG. 13 is a flowchart illustrating modifying previous contents.

Specific explanations regarding the method of modifying parts in previous contents and synchronizing the modification will follow by referring to FIG. 13.

FIG. 13 is a flowchart illustrating modifying previous contents among the method of copying contents illustrated in FIG. 10.

Referring to FIG. 13, when user manipulation is determined to modify previous contents (operation S1050-Y in FIG. 10), the modified parts of the previous contents are extracted from the previous contents at operation S1310. At operation S1320, analyzing features of the extracted modified parts is performed. For example, if the modification to the previous contents displayed on the first screen are text inputted by a user, corresponding inputted text is analyzed as an image file, the corresponding image file is included to be overlapped with the area to which user manipulation is inputted, and the first screen reflecting the modification is created.

Further, according to the analyzing results, new second screen is created by copying the image file regarding corresponding inputted text and pasting to corresponding area on the second screen at operation S1330.

At operation S1340, the second screen reflecting the modified contents is displayed on the second display 110*b*.

When descriptions of previous contents are modified by a user on the first screen, the modified contents may be automatically reflected on the second screen. This will be specifically described by referring to illustrative drawings.

Figure 14:
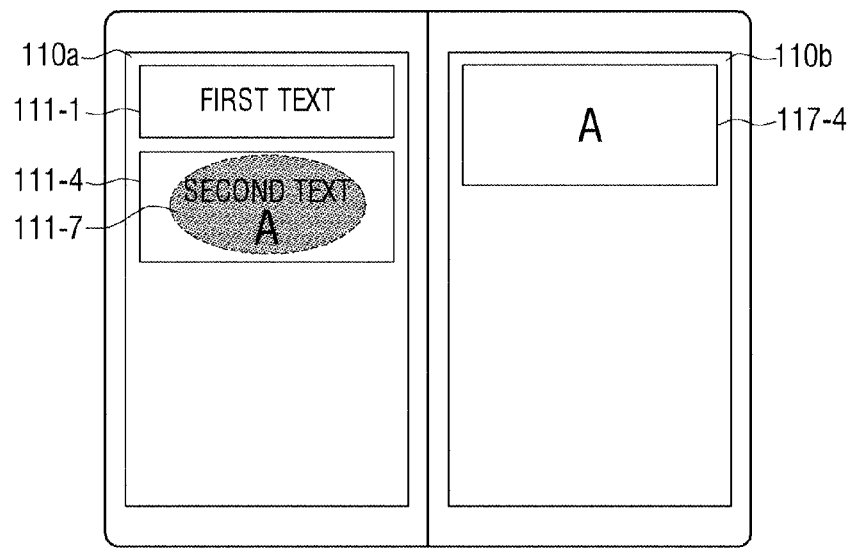
FIG. 14 is a diagram illustrating exemplary display screens to explain copying parts of contents among the methods of modifying previous contents.

FIG. 14 is a diagram illustrating exemplary display screens to explain copying parts of contents among the methods of modifying the previous contents illustrated in FIGS. 10 and 13.

Referring to FIG. 14, the first display 110*a* displays the first screen which may include the first text 111-1 and the second text 111-4. When user manipulation to scrap parts of the second text 111-4 is inputted by a user, the parts of the second text 111-4 included in corresponding area 111-7 are extracted.

The extracted contents are copied and displayed on the screen of the second display 110*b* in the second text 117-4 corresponding to second text 111-4.

Figure 15:
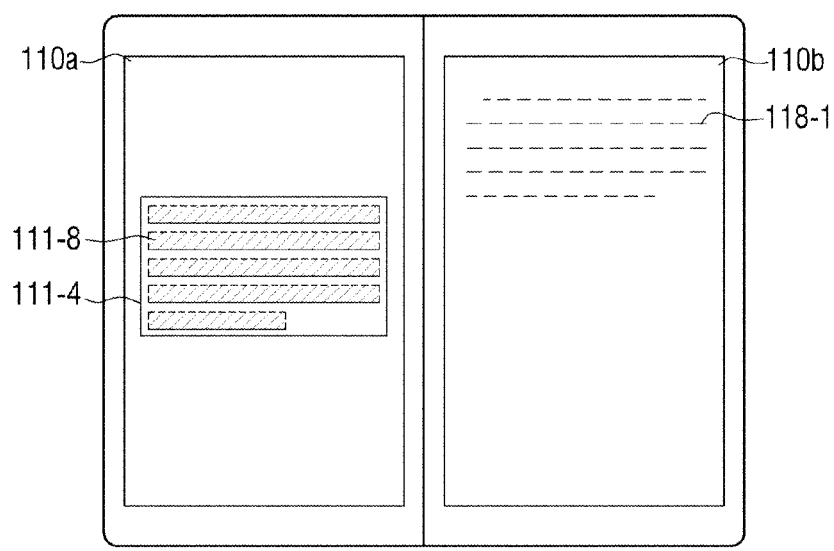
FIG. 15 is a diagram illustrating exemplary display screens to explain copying parts of contents among the methods of modifying previous contents according to another exemplary embodiment of the present general inventive concept.

FIG. 15 is a diagram illustrating exemplary display screens to explain another method of copying parts in contents.

Referring to FIG. 15, the first display 110*a* displays the first screen including the second text 112-4. When user manipulation to display parts of the second text 111-4 and select marking area 111-8 is inputted by a user, contents included in corresponding marking area 111-8 is extracted.

The extracted contents is copied and pasted to the second display 110*b* as text format 118-1.

Returning to FIG. 10, when previous contents are not determined to be modified at operation S1050-N, whether to select, move and copy the previous contents is determined at operation S1060. When the previous contents is determined to be selected, moved, and copied at operation S1060-Y, the method of selecting, moving, and copying contents illustrated in FIG. 6 is performed.

If the previous contents are not determined to be moved and copied at operation S1060-N, another controlling operation is performed according to corresponding user manipulation at operation S1062. For example, when user manipulation is moving a page, moving the page is performed. When user manipulation is implementing other applications, other applications are implemented according to the corresponding manipulation.

According to the various exemplary embodiments of the present general inventive concept, the first screen and the second screen are synchronized with each other. When user manipulation is inputted on one screen, it may be reflected on the other screen.

The above explains that copying, adding and modifying are automatically reflected on the second screen when contents is copied, added, and modified on the first screen.

The following will explain exemplary embodiments of searching each page when the first and second screens are displayed as a plurality of pages according to one of various exemplary embodiments of the present general inventive concept.

Figure 16:
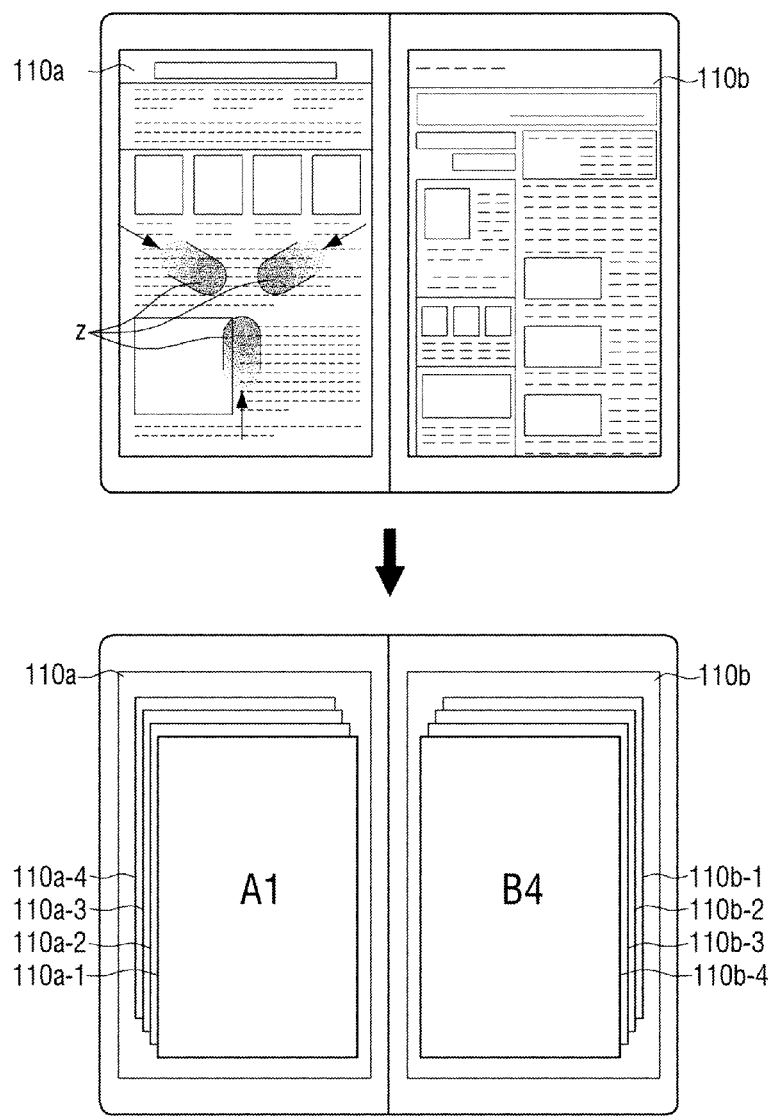
FIG. 16 is a diagram illustrating a situation in which a plurality of display screens are overlapped and displayed in the multi display apparatus according to another exemplary embodiment of the present general inventive concept.

FIG. 16 illustrates display screens to explain displaying to overlap a plurality of display screens to search the display screens according to another exemplary embodiment of the present general inventive concept.

Referring to FIG. 16, the first display 110*a* displays the first screen. The second display 110*b* displays the second screen. The first and second screens may be multi documents that are linked with each other. Further, descriptions of the first and second screens may be modified, and modification to the description of one screen may be automatically reflected on the other screen.

"Multi document" indicates multi contents which comprehensively may include images, video, icons, text, figures and lists. For example, a web page displayed in a web browser is one type of multi document. Further, a document that a user voluntarily writes by including images and text is another type of multi document.

As illustrated in FIG. 16, while one multi document is displayed on the first display 110*a* and second display 110*b* as full screen size, when a user performs predefined gestures (Z) on the first display 110*a*, a plurality of multi documents 110*a*-1~110*a*-4, 110*b*-1~110*b*-4 may be displayed in an overlapped format.

As illustrated in FIG. 16, when a multi document displayed on uppermost position of the first display 110*a* among the plurality of documents is A1, the multi documents may be overlapped in series according to ascending order on the first display 110*a*. In other words, four multi documents, 110*a*-1, 110*a*-2, 110*a*-3, and 110*a*-4, corresponding respectively to A1 through A4, are layered and displayed.

Meanwhile, when a multi document displayed on uppermost position of the second display 110*b* is B4, the multi documents may be overlapped in series according to descending order on the second display 110*b*. In other words, four multi documents, 110*b*-4, 110*b*-3, 110*b*-2, and 110*b*-1, corresponding respectively to B4 through B1, are layered and displayed.

A user may put a requested document in the uppermost position by selectively modifying the overlapping documents.

Thereby, the multi documents displayed on the first display 110*a* and the second display 110*b* may be respectively searched. When selecting and searching one of the multi documents on the first display 110*a* and the second display 110*b*, another multi document may be automatically searched, and the searched multi document may be displayed. Further specific explanation will follow by referring to other drawings.

FIG. 17 illustrates display screens to explain searching the screens with each other according to another exemplary embodiment of the present general inventive concept.

Referring to view (1) of FIG. 17, when a user selects icon ("Document A") included in some area of the multi document 110*a*-1 (A1) displayed on uppermost position of the first display 110*a*, the multi document 110*b*-1 (B1) displayed on uppermost position of the second display 110*b* is modified accordingly.

Referring to view (2) of FIG. 17, by selecting the icon on the first display 110*a*, document 110*b*-1 mapped with document 110*a*-1 is searched among the multi documents 110*b*-1 to 110*b*-4 displayed on the second display 110*b*, and the searched document is displayed on uppermost position. Alternatively, based on the multi documents displayed on the second display 110*b*, the multi documents displayed on the first display 110*a* may be arranged or searched.

Furthermore, the multi document which mapped with the document 110*a*-1 and 110*b*-2 respectively displayed on the first screen and displayed on the second screen may be plural, or other multi documents mapped with the first screen may be added or deleted from the second screen.

Specific explanation regarding this will be described separately below.

FIG. 18 illustrates display screens to explain adding new screen to the screens mapped with each other according to another exemplary embodiment of the present general inventive concept.

Referring to view (1) of FIG. 18, the first display 110*a* displays A document 110*a*-1 as first screen only, and the second display 110*b* displays B1 document 110*b*-1 on uppermost position and B2 document 110*b*-2 on lower position.

When a user performs a user manipulation to add a new multi document 110*b*-3 (B3) on the second display 110*b*, B3 document 110*b*-3 may be displayed on the uppermost position of the second display 110*b*, as illustrated in view (2) of FIG. 18.

Although FIG. 18 illustrates adding a new multi document to the second screen which is displayed on the second display 110*b*, a plurality of new multi documents may be added to the second screen in this manner. Furthermore, one or more new multi documents may instead be added to the first screen displayed on the first display 110*a*.

Although FIG. 18 does not specifically illustrate a user manipulation to add a new multi document, a user command may be inputted by using separate menu window (not illustrated) to add the new multi document. Further, when predefined user gestures are performed, the new multi document may be added to the corresponding screen. When a command to create new multi document is inputted, the new multi document is added and displayed on one or more the first display 110*a* and the second display 110*b*. The newly added multi document may be a prestored multi document or a multi document newly created by a user.

So far, the display controlling methods of the first display 110*a* and second display 110*b* in the multi display apparatus 100 illustrated in FIG. 3 are mainly described. The following will describe various exemplary embodiments of the present general inventive concept according to types of applications that are implemented when the multi display apparatus 100 operates in a frame mode as in FIG. 19 by referring to drawings.

Figure 19:
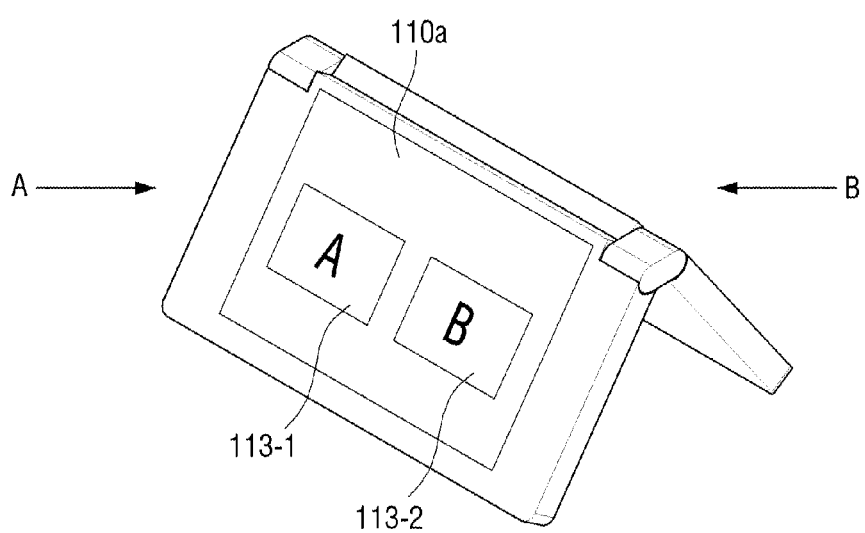
FIG. 19 is a perspective view illustrating a second operation mode in the multi display apparatus according to another exemplary embodiment of the present general inventive concept.

FIG. 19 is a perspective view illustrating a second operation mode of the multi display apparatus 100 according to another exemplary embodiment of the present general inventive concept.

Referring to FIG. 19, by curving the hinge 130 of the multi display apparatus 100 for proper angle, the multi display apparatus 100 may operate like a frame so as to have the first display 110*a* and the second display 110*b* facing in opposed directions, such that the first display 110*a* is viewed from an A direction and the second display 110*b* is viewed from a B direction. An operation mode in which the multi display apparatus 100 performs like a frame is referred to herein as the second operation mode.

In the second operation mode, because the A direction and the B direction face contrary directions, the first display 110*a* viewed from the A direction has different directivity from that of the second display 110*b* viewed from the B direction.

When the multi display apparatus 100 operates as illustrated in FIG. 19, the first screen displayed on the first display 110*a* of the multi display apparatus 100 may be viewed from the A direction. Since the second screen displayed on the second display 110*b* may be viewed from the B direction opposite to the A direction, the first and second screens may not be viewed at the same time by a user.

In FIG. 19, window to select A and B position options is displayed on the first display 110*a*. An "A" icon 113-1 and a "B" icon 113-2 may respectively select the first screen and the second screen to be displayed, or may alternatively respectively select user A who watches the first screen displayed on the first display 110*a* and user B who watches the second screen displayed on the second display 110*b*.

Figure 20:
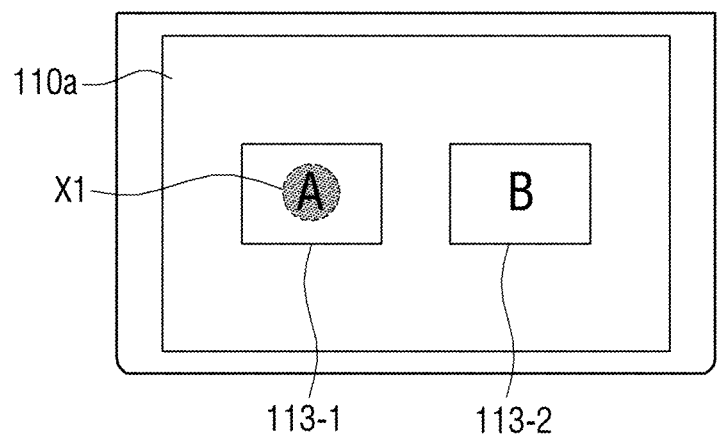
FIG. 20 is a diagram illustrating display screens of the multi display apparatus viewed from A direction in FIG. 19.

FIG. 20 is a diagram illustrating display screens of the multi display apparatus 100 viewed from A direction in FIG. 19. Referring to FIG. 20, when a user selects the A icon 113-1 in the screen displayed on the first display 110*a* via first user manipulation X1, an application implemented by the A icon 113-1 is displayed on the first display 110*a*.

Alternatively, when a user selects the A icon 113-1 via first user manipulation X1, the first display 110*a* displays the screen provided to user A. Displaying the screens suitable for a particular user will be described below.

Figure 21:
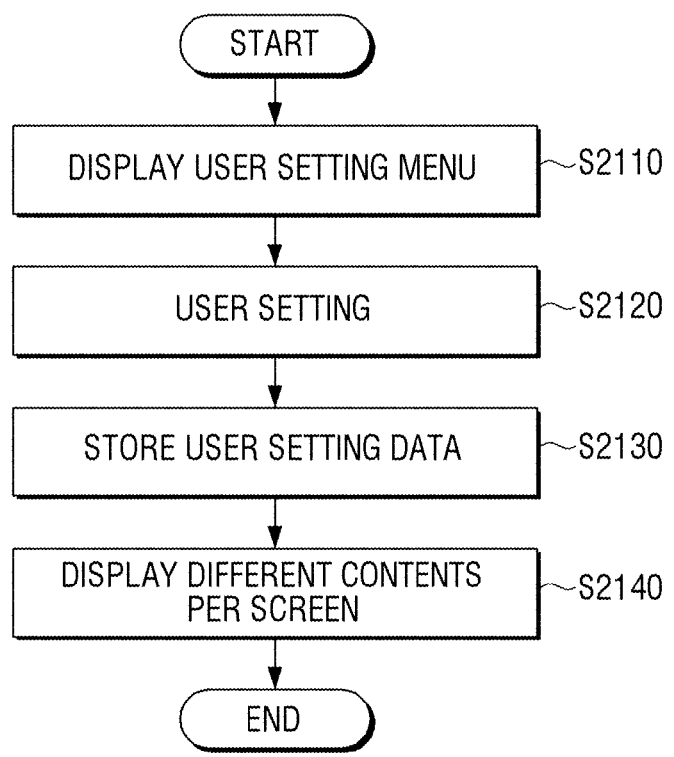
FIG. 21 is a flowchart illustrating establishing users per display screen according to an exemplary embodiment of the present general inventive concept.

FIG. 21 is a flowchart illustrating establishing a plurality of users in the methods illustrated in FIGS. 19 and 20.

Referring to FIG. 21, user setting menu is displayed on at least one of the first display 110*a* and the second display 110*b* of the multi display apparatus 100 at operation S2110. The user setting menu may be a user information inputting window which receives user information to discern users who watch the displays 110*a* and 110*b*. For example, the user setting menu displayed on the first display 110*a* may include menu to select user "A" and user "B." If a user of the multi display apparatus 100 is user "A," they selects user A in the user setting menu. Thereby, user setting of corresponding display is performed by a user at operation S2120. Another user setting may be performed regarding the second display 110*b*.

The storage unit 170 stores user setting data including information which a user of the first display 110a is established for example as user A and a user of the second display 110b is established for example as user B at operation S2130.

The multi display apparatus 100 displays the screen for user A on the first display 110a and the screen for user B on the second display 110b at operation S2140.

Figure 22:
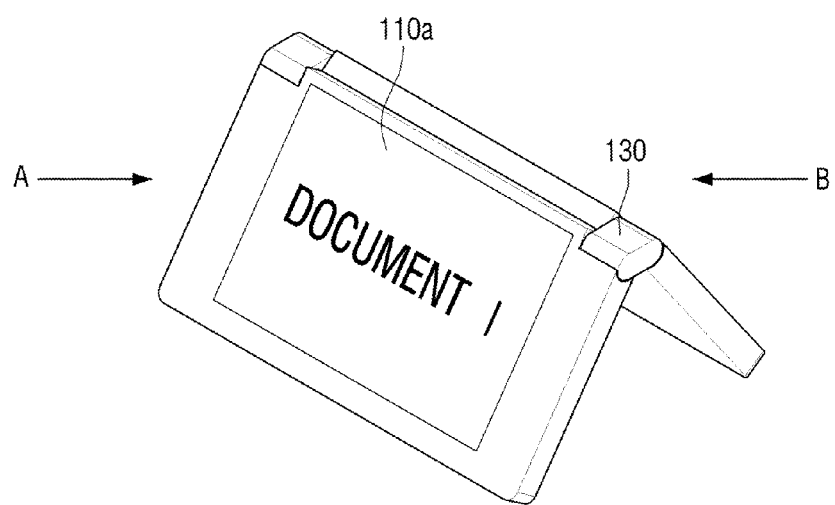
FIG. 22 is a diagram illustrating operation of the multi display apparatus which displays different screens according to user establishment according to an exemplary embodiment of the present general inventive concept.
Figure 23:
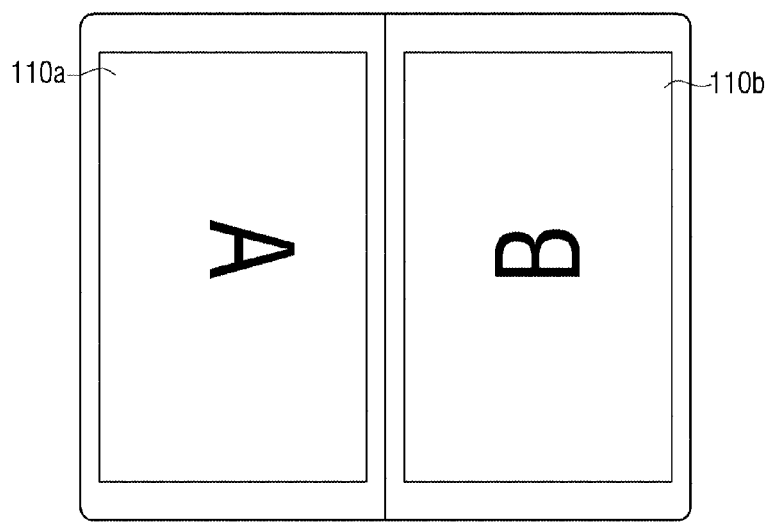
FIG. 23 is a diagram illustrating that the multi display apparatus which establishing a plurality of users completes according to the method illustrated in FIG. 21 operates in the first operation mode.

FIGS. 22 to 23 are diagrams illustratively explaining screens displayed on each of the displays 110a and 110b after completing user establishment on the multi display apparatus 100 operating in the second operation mode.

In FIG. 22, user A watches the first display 110a by looking toward the A direction while the first display 110a displays the first screen ("document 1"). Although not illustrated in FIG. 22, user B may watch the second display 110b by looking toward the B direction while the second display 110b displays the second screen.

FIG. 23 illustrates different screens in each of the displays 110a and 110b when users are established in each of the plural displays 110a and 110b and the multi display apparatus 100 operates like the multi display apparatus 100 illustrated in FIG. 3.

Referring to FIG. 23, the multi document specialized for user A is displayed on the first display 110a and the multi document specialized for user B is displayed on the second display 110b. At this process, the multi documents displayed on the first and second displays 110a, 110b may be displayed suitable for the position having good readability for users.

Figure 24:
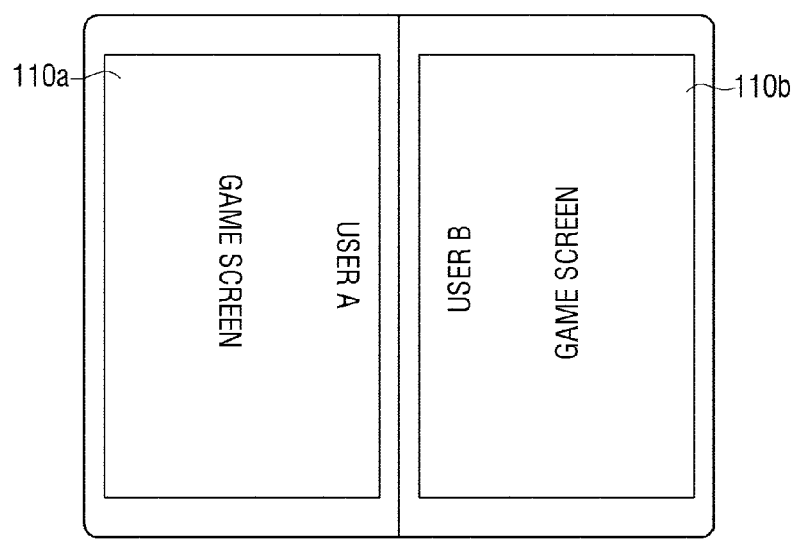
FIG. 24 is a diagram illustrating that screens per user are displayed in the exemplary embodiment of the multi display apparatus illustrated in FIG. 23.

FIG. 24 is a diagram illustrating that screens per user are displayed in the multi display apparatus 100 illustrated in FIG. 23. When a game application is implemented in the multi display apparatus 100, game screen for user A is displayed on the first display 110a and game screen for user B is displayed on the second display 110b.

As described above, when the multi display apparatus 100 operates in the first operation mode and the second operation mode, screens suitable for the users are displayed in each of the displays 110a and 110b.

Figure 25:
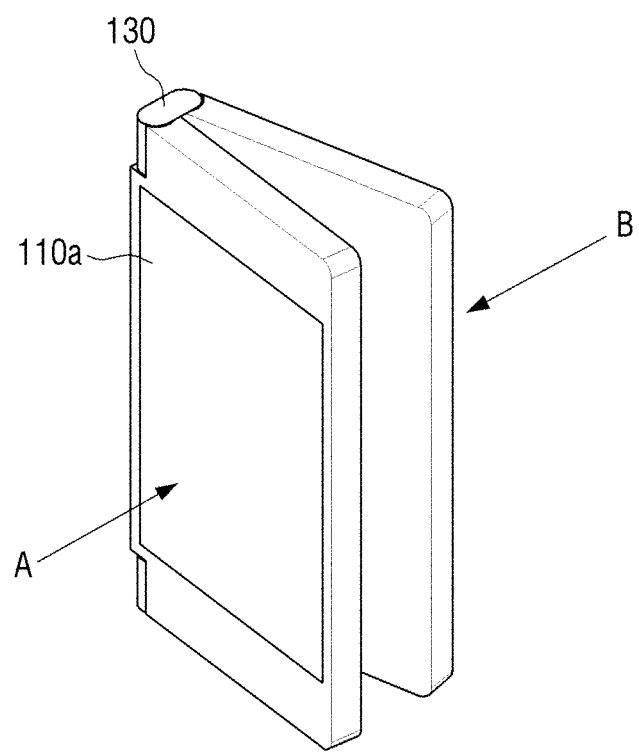
FIG. 25 is a perspective view illustrating that the multi display apparatus operates in a third operation mode according to another exemplary embodiment of the present general inventive concept.

FIG. 25 is a perspective view illustrating the multi display apparatus 100 operating in a third operation mode according to another exemplary embodiment of the present general inventive concept.

Referring to FIG. 25, the hinge 130 of the multi display apparatus 100 stands on a vertical direction from the ground, and the first display 110a and the second display 110b display vertical-directed screens, as opposed to the horizontal-directed screens illustrated for example in FIGS. 22-24. Users who watch toward an A direction or a B direction may only view the screen displayed on the corresponding one of the displays 110a and 110b.

As illustrated in FIG. 25, operation to put the multi display apparatus 100 so as to stand vertically is defined as a third operation mode of the multi display apparatus 100.

Figure 26:
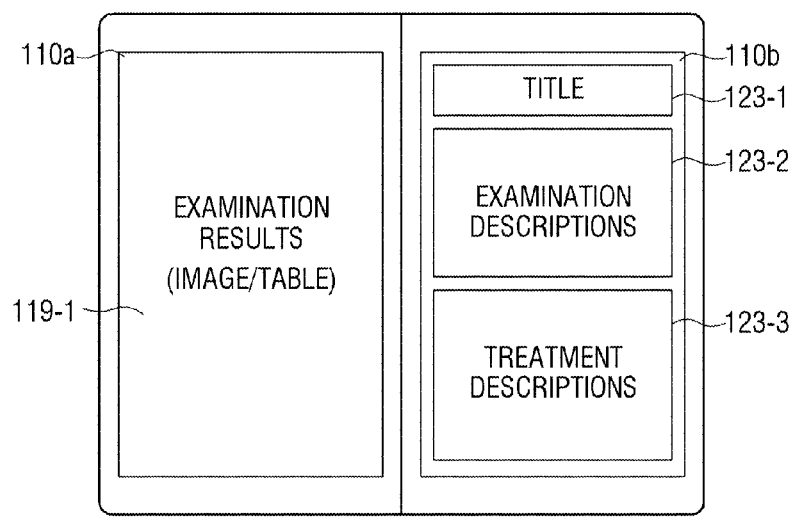
FIG. 26 is a diagram illustrating medical contents displayed on the exemplary embodiment of the multi display apparatus illustrated in FIG. 25.

FIG. 26 is a diagram provided to exemplarily illustrate the display of medical contents when the multi display apparatus 100 operates in the third operation mode. Although both the first display 110a and the second display 110b are illustrated in FIG. 26, this is only for convenience. It will be understood that the first display 110a and the second display 110b may be oriented as illustrated in FIG. 25, corresponding to the third operation mode of the multi display apparatus 100.

Referring to FIG. 26, the first display 110a may be viewed by a patient, and displays the first screen which may include medical examination results 119-1. The second display 110b may be viewed by a doctor, and displays the second screen which may include more detailed information, such as for example a medical examination title 123-1, an examination description 123-2, and a treatment description 123-3.

As illustrated in FIGS. 25 and 26, the first display 110a displays a first screen for a patient, and the second display 110b displays a second screen for a doctor. The multi display apparatus 100 according to an exemplary embodiment of the present general inventive concept may process proper screens per user by using uniform source data and display the user-built screens. Further, because the first screen and the second screen are interlocked with each other, when a doctor modifies contents on the second screen, the modified contents may be reflected on the first screen.

Figure 27:
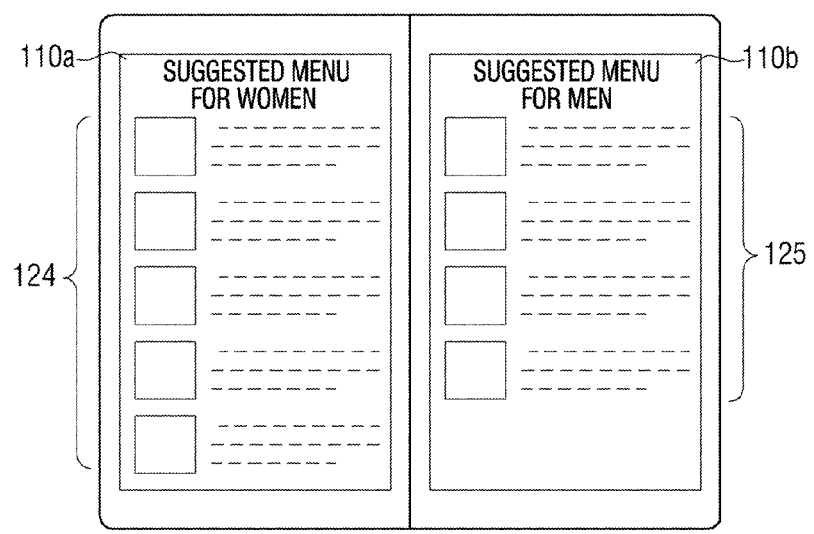
FIG. 27 is a diagram illustrating business contents displayed on the multi display apparatus illustrated in FIG. 25.

FIG. 27 is a diagram provided to exemplarily explain business contents descriptions which may be displayed on the multi display apparatus 100 illustrated in FIG. 25, specifically illustrating the display of a menu at a restaurant or similar establishment.

Referring to FIG. 27, the first display 110a displays the first screen which may include a suggested menu for women, and the second display 110b displays the second screen which may include a suggested menu for men. Because the first screen and the second screen are correspond to each other, when the first screen moves, the second screen may move together with the first screen. That is, if a first user advances through the menu items 124 displayed on the first screen, the second screen similarly advances through the menu items 125 displayed therein. Further, when a first user selects a specific menu item 124 displayed on the first screen, the second screen reflects the specific menu item 124 selected by the first user.

The various exemplary embodiments of the present general inventive concept may be implemented in the multi display apparatus 100. In this specification, the multi display apparatus 100 indicates electronic device mounted with dual displays such as smart phone, notebook, PDA, PMP, or net book. A specific constitution of the multi display apparatus 100 will be described below separately.

Figure 28:
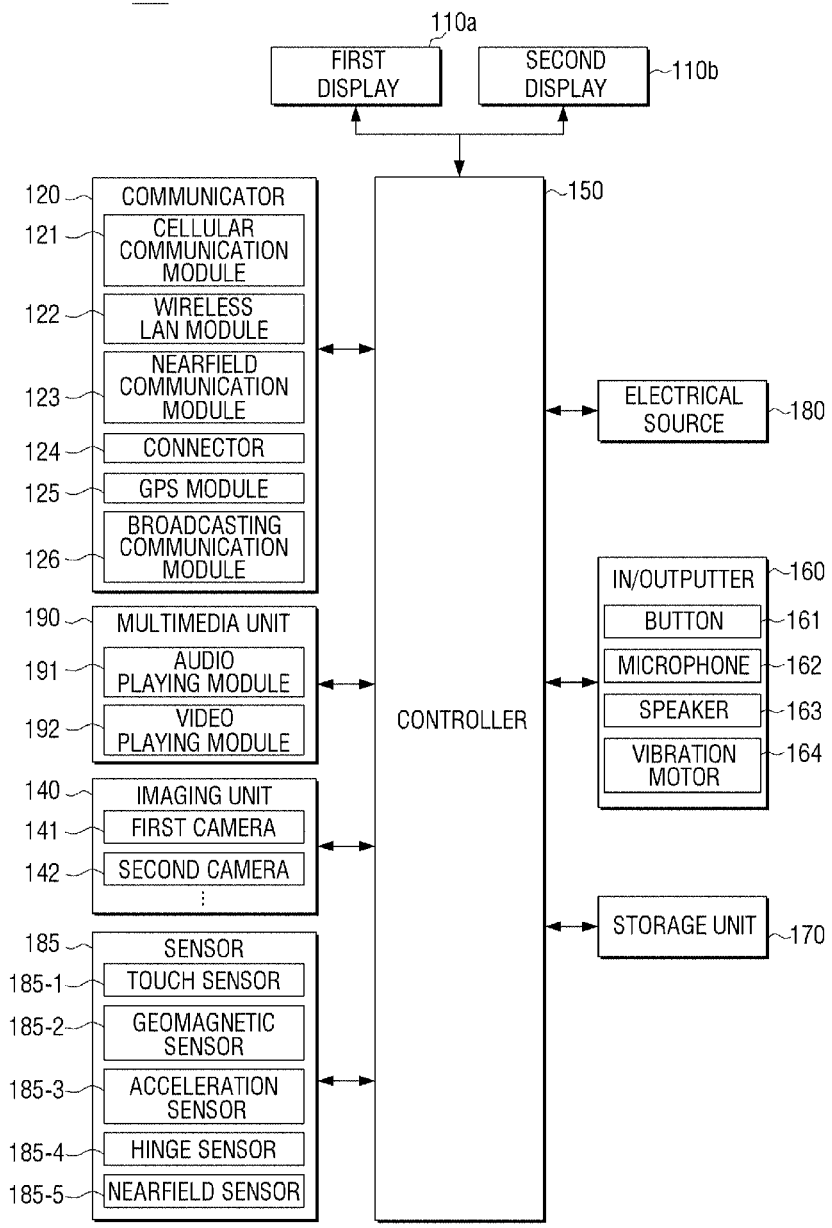
FIG. 28 is a block diagram illustrating a constitution of the multi display apparatus according to an exemplary embodiment of the present general inventive concept.

FIG. 28 is a detailed block diagram of the multi display apparatus 100 according to an exemplary embodiment of the present general inventive concept.

FIG. 28 is a block diagram comprehensively explaining a constitution of the multi display apparatus 100 according to various exemplary embodiments of the present general inventive concept. Referring to FIG. 28, the multi display apparatus 100 may connect to external devices (not illustrated) by using a communicator 120, including one or more of a cellular communication module 121, a wireless LAN module 122, a nearfield communication module 123, and a connector 124. External devices may include one or more other devices such as cellular phone, smart phone, tablet PC, computer server and digital TV.

Referring to FIG. 28, the multi display 110 of the multi display apparatus 100 may include the two displays 110a and 110b. Although the two displays 110a and 110b are illustrated in FIG. 28, they may be modified and implemented by expanding the multi display 110 with more than three displays.

The multi display apparatus 100 according to an exemplary embodiment of the present general inventive concept may include the communicator 120, a multimedia unit 190, the controller 150, an imaging unit 140, a sensor 185, an in/outputter 160, a storage unit 170, an electrical source 180, and the first and second displays 110a, 110b.

As noted above, the communicator 120 may include the cellular communication module 121, the wireless LAN module 122, the near field communication module 123, the connector 124, and further may include a global positioning system (GPS) module 125 and a broadcasting communication module 126.

The cellular communication module 121 connects the multi display apparatus 100 to external devices (for example, a station of a cellular system) through a plurality of antennas (not illustrated) by using wireless access technology according to a cellular communication protocol under the control of the controller 150.

Further, the cellular communication module 121 transmits and receives wireless signals which deliver for example voice calls, video calls, short message service (SMS) messages, or multimedia messaging service (MMS) messages with other devices that can communicate, such as cellular phones, smart phones, tablet PCs, or other devices which includes a telephone number inputted in the multi display apparatus 100.

Further, the communicator 120 may include one or more of the wireless LAN module 122 and the nearfield communication module 123. For example, the communicator 120 may include the wireless LAN module 122 only, the nearfield communication module 123 only, or both of the wireless LAN module 122 and the nearfield communication module 123.

The wireless LAN module 122 may connect to internet in a place where a wireless access point (AP, not illustrated) is installed according to controlling of the controller 150. The wireless LAN module 122 supports wireless LAN standard (IEEE802.11x) of IEEE (Institute of Electrical and Electronics for Engineers).

The nearfield communication module 123 may perform nearfield communication between the multi display apparatus 100 and external devices wirelessly according to the control of the controller 150. The nearfield communication method may include for example Bluetooth and Infrared data association (IrDA).

The connector 124 is connector which provides an interface with various devices such as USB 2.0, USB 3.0, HDMI and IEEE 1394.

The connector 124 may be utilized as interface to connect the multi display apparatus 100 with external devices or electrical sources. Through wire cables (not illustrated) connected to the connector 124, data stored in the storage unit 170 of the multi display apparatus 100 may be transmitted to external devices or data may be received from external devices according to controlling of the controller 150. Through the wire cables connected to the connector 124, the electrical power may be inputted or a battery (not illustrated) may be charged from the electrical source.

GPS module 125 receives electrical waves from a plurality of GPS satellites (not illustrated) working in orbit around the Earth, and calculates positions of the multi display apparatus 100 by using time of arrival from the plurality of GPS satellites to the multi display apparatus 100 and GPS parameters.

The broadcasting communication module 126 may receive broadcasting signals (e.g., TV broadcasting signals, radio broadcasting signals or data broadcasting signals) and broadcasting adding information (e.g., electric program guide (EPS) or electric service guide (ESG)), which are transmitted from a broadcasting station through broadcasting communication antennas, according to controlling of the controller 150.

The multimedia unit 190 may include audio playing module 191 and video playing module 192.

The audio playing module 191 may play digital audio files which are stored or received by controlling of the controller 150 (e.g., files having file extender of mp3, wma, ogg or way). The video playing module 192 may play digital video files which are stored and received by controlling of the controller 150 (e.g., files having file extender of mpeg, mpg, mp4, avi, mov, or mkv).

The video playing module 192 supports codecs in various formats so as to play digital video files. In other words, the video playing module 192 plays video files according to prestored codecs so as to follow the codec format of the video files. Further, the audio playing module 191 or the video playing module 192 of the multimedia module 190 may be included in the controller 150.

As illustrated in FIG. 2, the controller 150 may include the read-only memory (ROM) 157 which controlling programs are stored to control the mobile apparatus 100 and the random access memory (RAM) 155 which recalls signals or data inputted externally out of the multi display apparatus 100 or is used as a recalling area for jobs performed in the multi display apparatus 100. The CPU 151 may include one or more single core processor, multi core processor, triple core processor and quad core processor. The CPU 151, the ROM 157, and the RAM 155 may connect with each other through the internal system bus 159.

The controller 150 controls the communicator 120, the multimedia 190, the imaging unit 140, the sensor 150, the in/outputter 160, the storage unit 170, the electrical source 180 and the first and second displays 110*a* and 110*b*.

The imaging unit 140 may include one or more a first camera 141 and a second camera 142. Although FIG. 8 only illustrates the first camera 141 and the second camera 142, additional cameras may be included according to other embodiments of the present general inventive concept, depending on the specific configuration of the multi display apparatus 100.

The imaging unit 140 may include one or more the first and second cameras 141 and 142 which photograph still images or video according to controlling of the controller 150. The first camera 141 and the second camera 142 may be mounted in the housing of the multi display apparatus 100 or connected to the multi display apparatus 100 by using separate connecting means (not illustrated). One or more the first camera 141 and the second camera 142 may include a supportive light source (e.g., a flash, not illustrated) which provides a light amount necessary to perform photographing or other imaging.

In an exemplary embodiment of the present general inventive concept, the first camera 141 may be mounted on the front face of the multi display apparatus 100 and the second camera 142 may be mounted on the back face of the multi display apparatus 100. In another exemplary embodiment of the present general inventive concept, the first camera 141 and the second camera 142 may be arranged closely (e.g., a distance between the first camera 141 and the second camera 142 is more than 1 cm and less than 8 cm) and photograph a three-dimensional still image or a three-dimensional video. In another exemplary embodiment of the present general inventive concept, the first camera 141 may be mounted on the first body 2 and the second camera 142 may be mounted on the second body 4.

The imaging unit 140 may detect a motion or shape of a user through one or more the first camera 141 and the second camera 142, and deliver the detection results to the controller 150 as input to implement or control applications. For example, user motion indicates user hand movement detected by the first or second camera. User figure indicates for example a user's face shape detected by the first or second camera.

According to another exemplary embodiment of the present general inventive concept, the multi display apparatus 100 may detect user motion by using another means such as an infrared detector (not illustrated), and implement or control applications in response to the detected user motion.

The sensor 185 may include one or more of a touch sensor 185-1, a geomagnetic sensor 185-2, an acceleration sensor 185-3, a hinge sensor 185-4 and a near field sensor 185-5.

The touch sensor 185-1 is a sensor which can sense user touches on the multi display 110. The touch sensor 185-1 may be divided into resistive or capacitive method according to the method of sensing user touches. The touch sensor 185-1 according to an exemplary embodiment of the present general inventive concept may be implemented according to each of the two methods. The touch sensor 185-1 may be included and constituted in the display with the display panel. Specific explanation regarding this is described above.

The touch sensor 185-1 indicates a sensor which can input a command displayed on the display screen by pushing the first display 110a and the second display 110b with a user object (not illustrated) such as fingers or inputting means that can be sensed. The touch sensor 185-1 may utilize capacity changes, resistance changes, or light amount changes, for example.

The geomagnetic sensor 185-2 may examine geomagnetics and detect an azimuth. Therefore, the geomagnetic sensor 185-2 recognizes direction of the multi display apparatus 100. The acceleration sensor 185-3 measures dynamic power such as acceleration, vibration or pulse of objects by processing outputting signals, and detects changes in movement velocity or power intensity of the multi display apparatus 100. The hinge sensor 185-4 may examine angle or movement of the hinge. The near field sensor 185-5 may examine whether objects approach toward the multi display apparatus 100 of a user.

Although not illustrated in FIG. 28, the sensor 185 of the multi display apparatus 100 may additionally include one or more a gravity sensor (not illustrated) which can examine which direction gravity acts, a gyro sensor (not illustrated) which can recognize six axes in total by measuring rotation of the multi display apparatus 100 respectively with the acceleration sensor 185-3, an orientation sensor (not illustrated) which can automatically rotate and arrange contents by automatically detecting horizontal and vertical frames of contents such as images, an illumination sensor (not illustrated) which detects amounts of lights surrounded with the multi display apparatus 100, a multitude measuring sensor (not illustrated) which can measure air pressure, an RGB sensor (not illustrated) which can examine colors of objects, a distance measuring sensor (not illustrated) which can measure distance by using acoustic waves or infrared lights, and a hall sensor (not illustrated) which uses pressure changes according to an intensity of a magnetic field.

Each sensor of the sensor 185 may detect a situation, generate signals corresponding to the detected situation, and transmit the signals to the controller 150. Sensors of the sensor 185 may be added or deleted according to the specific configuration of the multi display apparatus 100.

The in/outputter 160 may include one or more of a button 161, a microphone 162, a speaker 163 and a vibration motor 164.

The button 161 may be formed on the front face, the side, or the back face of the housing in the multi display apparatus 100 in a push type or a touch type. Further, it may include a plurality of buttons, which may include for example one or more a power/lock-on button, a volume control button, a menu button, a home button, a back button and a search button.

The microphone 162 generates electrical signals according to the control of the controller 150 by receiving voices or sounds.

The speaker 163 may output sounds corresponding to various signals (e.g., wireless signals, broadcasting signals, digital audio files, digital video files, or photographing pictures) of the cellular communication module 121, the wireless LAN module 122, the nearfield communication module 123, the multimedia unit 190 or the imaging unit 140 to out of the multi display apparatus 100.

The speaker 163 may output sounds (e.g., button manipulation sounds corresponding to phone calls or phone connecting sounds) corresponding to functions performed by the multi display apparatus 100. The speaker 163 may be formed singularly or in plural in a proper position or positions of the housing in the multi display apparatus 100. For example, the speaker 163 may include an internal speaker module (not illustrated) which is arranged in a proper position that can approach a user's ears while performing a telephone call, and external speaker module which has a higher output, to be proper for use in playing audio/video files or watching broadcast programs and is mounted in a proper position of the housing in the multi display apparatus 100.

The vibration motor 164 may convert electrical signals to mechanical vibrations according to controlling of the controller 150. For example, when the multi display apparatus 100 in a vibration mode receives a voice call from another device (not illustrated), the vibration motor 164 may operate. The vibration motor 164 may be formed singularly or in plural within the housing of the multi display apparatus 100. The vibration motor 164 may also operate in response to touch gestures of a user sensed on the first display 110a and the second display 110b and on consecutive touching motion sensed on the both the first display 110a and the second display 110b.

The storage unit 170 stores multimedia data processed by the controller 150, contents data, and data received from external sources.

Specifically explained, the storage unit 170 may store signals, information, or data which are input and output in response to operations of the cellular communication module 121, the wireless LAN module 122, the nearfield communication module 123, the connector 124, GPS module 125, the multimedia unit 190, the imaging unit 140, the sensor 185, the in/outputter 160, and the first display 110a, and the second display 110b according to the control of the controller 150.

The storage unit 170 may store controlling programs and applications to control the multi display apparatus 100 or the controller 150. In the following, the term "storage," may include the storage unit 170, ROM, RAM, or a memory card that can be detached/attached to the multi display apparatus 100 (e.g., an SD card, a memory stick, etc.). Further, the storage unit 170 may include non-volatile memory, volatile memory, hard disk drive (HDD) or solid state drive (SSD).

The electrical source 180 provides electrical power used in the multi display apparatus 100. The electrical source 180 may be implemented as a rechargeable battery (not illustrated), and further include a voltage converter (not illustrated) which converts externally provided electrical power and provides it to the rechargeable battery.

The electrical source 180 may provide electrical power in various modes such as maximum performance mode, normal mode, saving mode and waiting mode to the multi display apparatus 100 according to electrical power management controlling of the controller 150.

The first display 110a and the second display 110b may be connected to each other by the hinge 130. The first display 110a and second display 110b display multimedia contents, images, video, and text according to the control of the controller 150.

The first display 110a and the second display 110b are separated physically. The display screens displayed on the first display 110a and the second display 110b may be controlled independently. For example, resolution of the first display 110a and resolution of the second display 110b may be separately established. Further, expanding, rotating, moving and dividing of the screens displayed on the first display 110a and the second display 110b may be performed independently.

Further, the first display 110a and the second display 110b may display a united display screen by using a virtual frame buffer.

The first display 110a and the second display 110b are display devices which can display various applications (e.g., phone calling, data transmitting, broadcasting, and photographing) that can be implemented by the controller 150 and provide a user interface that is adapted to the various applications. The first display 110a and the second display 110b may be implemented as touch screens, and receive one or more touch gestures through a user body (such as, for example, fingers including a thumb) or inputting means that can be sensed (e.g., a stylus pen).

Such a user interface may include certain touch area, soft key and soft menu. The first display 110a and the second display 110b may transmit electrical signals corresponding to one or more touch gestures inputted by the user interface through an LCD controller (not illustrated) to the first display 110a and the second display 110b. Further, the first display 110a and the second display 110b may sense consecutive touch motion and transmit electrical signals corresponding to consecutive or inconsecutive touch motions to the LCD controller.

The first display 110a and the second display 110b may be implemented for example with a resistive method, a capacitive method, an infrared method, or an acoustic wave method.

The first display 110a and the second display 110b convert signals regarding user movements which are sensed by the touch sensor 185-1 to digital signals (e.g., X and Y coordinates), and transmit the digital signals to the controller 150. The controller 150 may perform controlling operation corresponding to the user movements inputted through the first and second displays 110a, 110b by using the received digital signals. For example, the controller 150 may control the first display 110a and the second display 110b in response to the user movements so that soft keys displayed on the first display 110a and the second display 110b can be selected, or applications corresponding to the soft keys can be implemented.

The above described user gestures are not limited to direct contacting of the user body or the inputting means that can be touched with the first display 110a and the second display 110b. User gestures may also be sensed through a non-contact method. Sensing a degree of user movement that can be examined in the first display 110a and second display 110b may be modified by performance or constitution of the multi display apparatus 100.

—Touch Gesture Type—

Touch gestures according to the exemplary embodiment of the present general inventive concept may include every type of user gestures which directly contact or closely approach the multi display 110 so that the multi display apparatus 100 can sense the gestures. For example, touch gestures are user movements to select one position or consecutive plural positions on the touch screen by using user objects such as for example fingers of left and right hands (specifically, an index finger), a thumb, or an object that can be sensed by the touch screen (e.g., a stylus pen). The following will specifically explain touch gestures by referring to tables.

TABLE 1

|  | Type | Mark |
|---|---|---|
| Single Finger Gesture | Tap | ● |
|  | Touch & Hold | ● |
|  | Double Tap | ● |
|  | Drag | ↓ |
|  | Drag & Drop |  |
|  | Flick | ↓ |

Table 1 explains gesture types which use one user object.

Referring to Table 1, gesture types with one finger are tap, touch & hold, double tap, drag, drag & drop and flick. Tap indicates movement which a user slightly pushes a user object against the touch screen and then and takes the user object off the touch screen. Touch & hold indicates movement which a user touches the user object to the touch screen for a preset time. Double tap indicates movement which a user quickly taps the user object on the touch screen twice within a predetermined interval. Drag indicates movement which a user pulls the user object toward one direction. Drag & drop indicates movement which a user voluntarily pushes the user object on the touch screen, and pulls the user object across the touch screen from one position to another position. Flick indicates movement which a user quickly drags the user object across the touch screen.

TABLE 2

|  | Type | Mark |
|---|---|---|
| Two Finger Gesture | Two finger Tap | ● ● |
|  | Touch & Spread | ● ● |
|  | Pinch Out |  |
|  | Pinch In |  |
|  | Two finger Drag | ↓ ↓ |
|  | Cross Two Finger |  |
|  | Touch & Rotate | ● ) |

Table 2 explains gesture types which use two user objects.

Referring to Table 2, gestures types with two fingers are two finger tap, touch & spread, pinch out, pinch in, two finger drag, cross two finger, and touch & rotate. Two finger tap is movement which two user objects simultaneously tap the touch screen. Touch & spread is movement by which two user objects simultaneously push the touch screen, and one user object moves on a line while the other user object does not move. Pinch out is movement which two user objects simultaneously push the touch screen and drag directions away from each other, and pinch in is movement which two user objects simultaneously push the touch screen and drag in directions away from each other. Two finger drag is movement which two user objects drag in the same direction, and cross two finger is movement which two user objects simultaneously drag toward one another, cross with each other, and continue being dragged in directions away from each other. At last, touch & rotate is touch movement which one user object does not move and the other user object rotates based on the fixed user object.

TABLE 3

| | Type | Mark |
|---|---|---|
| Multi | Three finger touch | ●●● |
| Finger | Four finger touch | ●●●● |
| Gesture | Five finger touch | ●●●●● |
| Palm | Palm | |

Table 3 explains gestures which use more than two user objects, and a gesture type by using a palm.

Referring to Table 3, gesture types with more than two user objects are three finger touch, four finger touch and five finger touch. Further, by using more than two user objects, gesture movements such as tapping, dragging and rotating may be performed as in Tables 1 and 2 described above.

When the above various touch gestures are recognized, the controller 150 performs operation corresponding to the touch gesture. For example, the controller 150 implements applications, widgets and web browsers stored in the storage unit 170 and displays the implementing screen on one or more the first display 110a and the second display 110b.

Meanwhile, although the above exemplary embodiments of the present general inventive concept describe that the bodies of the multi display apparatus 100 are connected by the hinge 130, they may be connected by a connector made of a flexible material instead of the hinge 130.

Figure 29:
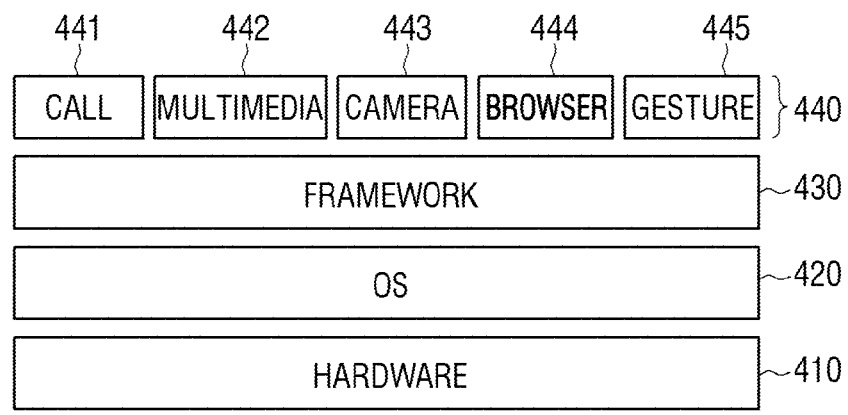
FIG. 29 is a diagram illustrating a system stratified structure of the multi display apparatus according to an exemplary embodiment of the present general inventive concept.

FIG. 29 is a diagram illustrating a system stratified structure of the classes of the multi display apparatus 100 according to an exemplary embodiment of the present general inventive concept.

Referring to FIG. 29, hardware 410 may include the multi display 110, the communicator 120, the imaging unit 140, the controller 150, the in/outputter 160, the storage unit 170, the electrical source 180, the sensor 185 and multimedia unit 190 in the multi display apparatus 100.

OS 420 controls the general operation of the hardware 410 and manages the hardware 410. OS 420 performs basic roles of hardware management, memory and security. OS 420 may include a module such as a display driver 134-2 (illustrated for example in FIG. 31) to drive the multi display 110, a communication driver (not illustrated) to transmit and receive data, a camera driver (not illustrated) to drive the one or more cameras 141, 142 of the imaging unit 140, an audio driver to drive the audio input/output of the in/outputter 160, and an electrical source manager to manage the electrical source 180. Further, library and runtime records that developers can access may be included.

Other than OS 420, a framework 430 is generated. The framework 430 connects the applications 440 and OS 420. The framework 430 may include a location manager (not illustrated), notification manager (not illustrated), and a frame buffer 134-1 (illustrated for example in FIG. 31) to display images on the touch screen.

Other than the framework 430, the applications 440 which perform various functions of the multi display apparatus 100 are generated. For example, various applied programs such as a call application 441, a multimedia application 442, a camera application 443, a browser application 444, and a gesture application 445 may be included in the applications 440.

The following will explain various perspective views regarding the multi display apparatus 100 according to an exemplary embodiment of the present general inventive concept with drawings.

Figure 30:
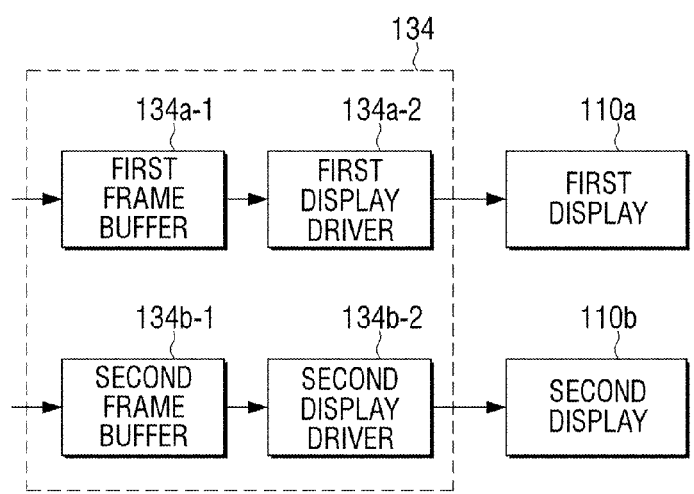
FIG. 30 is a block diagram of the multi display apparatus which controls operation of each display by using a plurality of frame buffers according to an exemplary embodiment of the present general inventive concept.

FIG. 30 is a block diagram of the multi display apparatus 100 which controls operation of each of the displays 110a and 110b by using a plurality of frame buffers 134a-1 and 134b-1.

Referring to FIG. 30, the multi display apparatus 100 may include the first display 110a, the second display 110b, and a display controller 134. The display controller 134 may be mounted as a separate unit from the controller 150 illustrated in FIG. 1, or may be included in the controller 150.

Referring to FIG. 30, the display controller 134 may include a first frame buffer 134a-1, a first display driver 134a-2, a second frame buffer 134b-1 and a second display driver 134b-2.

The first frame buffer 134a-1 is unit which buffers image frames to be displayed on the first display 110a, and the second frame buffer 134b-1 is unit which buffers image frames to be displayed on the second display 110b.

For example, the image frames for which digital signals are processed by GPU 153 are stored in a bitmap format at the first frame buffer 134a-1 and the second frame buffer 134b-1. In this case, buffering areas in each of the first frame buffer 134a-1 and the second frame buffer 134b-1 are allocated according to maximum pixel size that each of the displays 110a and 110b can support. For example, when a maximum resolution that the first display can display is 1024×1200, the first frame buffer 134a-1 allocates buffer storing area so that images in a bitmap format of 1024×1200 can be stored. The first display driver 134a-2 analyzes the image frame in the bitmap format stored at the first frame buffer 134a-1, and converts the image frame to the source signals of the first image. The first display driver 134a-2 provides it the first image source signals to the first display 110a and drives the first display 110a to display the image frame.

Likewise, the second display driver 134b-2 analyzes the image frame in a bitmap format stored in the second frame buffer 134b-1, converts the image frame to the second image source signals, and provides it to the second display 110b to display the image.

Figure 31:
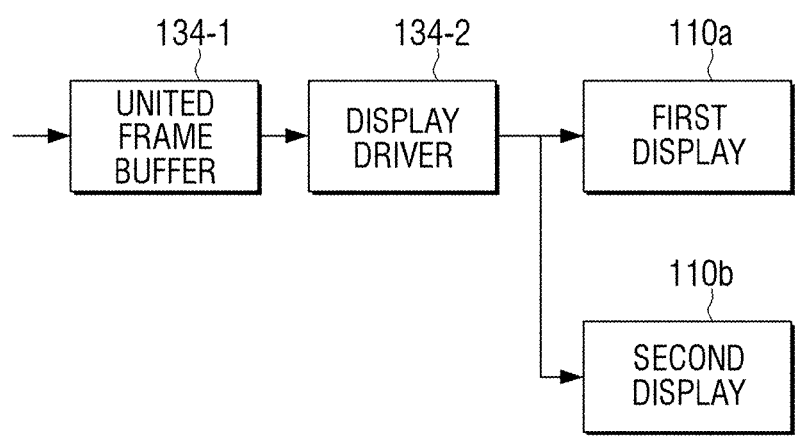
FIG. 31 is a block diagram of the multi display apparatus which controls operation of each display by using united frame buffers according to an exemplary embodiment of the present general inventive concept.

Although FIG. 30 illustrates that the first frame buffer 134a-1 and the second frame buffer 134b-1 corresponding to the displays 110a and 110b are separately mounted, FIG. 31 illustrates an exemplary embodiment of the present general inventive concept in which one united frame buffer 134-1 is used according to another exemplary embodiment of the present general inventive concept.

FIG. 31 is a block diagram of the multi display apparatus 100 which controls operation of each display by using a united frame buffer 134-1. When the frame buffer is implemented as united frame buffer 134-1, it may be implemented by allocating a size of the united frame buffer 134-1 larger than the maximum resolution of the first display 110a and the second display 110b.

For example, when the first display 110a and the second display 110b can respectively display a resolution of 1024×800 in maximum, the united frame buffer 134-1 may allocate a storing area of frame buffer size that a resolution of 1024×1600 can be displayed. A first image frame displayed on the first display 110a is stored in a first area of the united frame buffer 134-1, and a second image frame displayed on the second display 110b is stored in a second area of the united frame buffer 134-1.

The display driver 134-2 drives each of the first display 110a and the second display 110b by providing the first and second image frames respectively to the first display 110a and the second display 110b with addresses of the first and second image frames stored in the united frame buffer 134-1.

Figure 32:
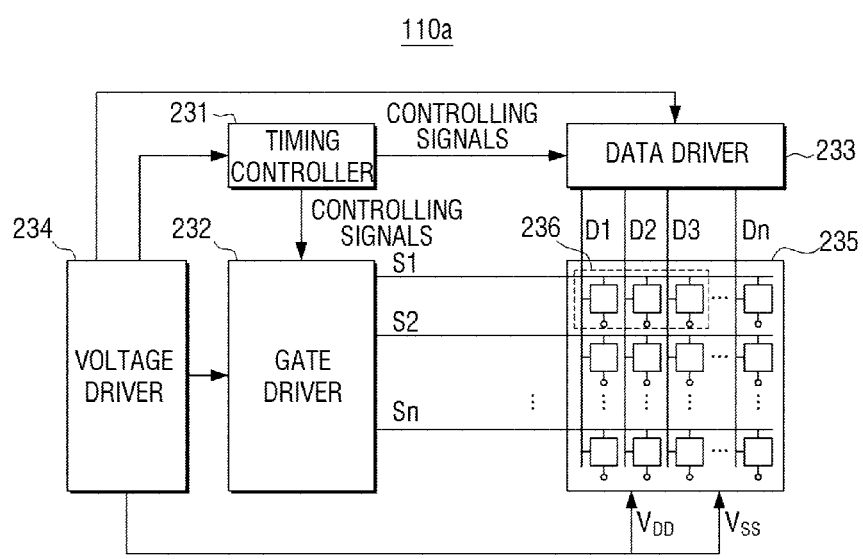
FIG. 32 is a diagram illustrating a specific constitution of a first display among two displays illustrated in FIG. 30.

FIG. 32 is a diagram illustrating an exemplary embodiment of display constitution according to the present general inventive concept. For convenient explanation, FIG. 32 only illustrates the first display only 110a; however, the second display 110b may be implemented as the same constitution.

Referring to FIG. 32, the first display 110a may include a timing controller 231, a gate driver 232, a data driver 233, a voltage driver 234 and a display panel 235.

The timing controller 231 externally receives clock signals (DCLK), horizontal synchronization signals (Hsync), and vertical synchronization signals (Vsync) that are proper for a resolution of the touch screen, generates gate controlling signals (passing controlling signals) and data controlling signals (data signals), rearranges inputted R, G, B data, provides the gate controlling signals to the gate driver 232, and provides the data controlling signals to the data driver 233.

The timing controller 231 may generate gate controlling signals including gate shift clock (GSC), gate output enable (GOE), and gate start pulse (GSP). Herein, GSC are signals which determines time when a thin film transistor (TFT) connected with light emitting diodes (such as R, G, B organic light emitting diodes (OLEDs)) turns on/off, GOE are signals which control the output of the gate driver 232, and GSP are signals which inform a first driving line of the display 110a among one vertical synchronization signal.

Further, the timing controller 231 may generate data controlling signals including source sampling clock (SSC), source output enable (SOE) and source start pulse (SSP). Herein, SSC are used as a sampling clock to latch data in the data driver 233, and determine a driving frequency of data driver IC. SOE may deliver the data latched by SSC to the display panel 235. SSP are signals which inform starts of latching or sampling data among one vertical synchronization period.

The gate driver 232 is a unit which generates passing signals and connects to the display panel 235 through passing lines (S1, S2, S3, . . . , Sn). The gate driver 232 approves gate on/off voltage (Vgh/Vgl) provided from the voltage driver 234 to the display panel 235 according to the gate controlling signals generated by the timing controller 231. The gate on voltage (Vgh) is consecutively provided from gate line 1 (GL1) to gate line N (GLn) to implement frame-based image on the display panel 235.

The data driver 233 is a unit which generates data signals and connects to the display panel 235 through data lines (D1, D2, D3, . . . , Dm). The data driver 233 completes scaling according to the data controlling signals generated by the timing controller 231 and inputs RGB data of the image frames to the display panel 235. The data driver 233 converts RGB image data that is provided serially from the timing controller 231 to be parallel, converts digital data to analog voltage, and provides the image data corresponding to one horizontal line to the display panel 235. These processes are performed consecutively per each horizontal line.

The voltage driver 234 generates and transmits driving voltage to each of the gate driver 232, the data driver 233 and the display panel 235. The voltage driver 234 may receive commonly used voltage provided externally, i.e., alternated voltage of 110V or 220V, generate and provide electrical source voltage (VDD) necessary for the display panel 235, or provide grounded voltage (VSS). Further, the voltage driver 234 may generate gate on voltage (Vgh) and provide to the gate driver 232. The voltage driver 234 may include a plurality of voltage driving modules (not illustrated) which operate separately.

Herein, the plurality of voltage driving modules may operate so as to provide different voltage according to controlling of the controller 150. The controller 150 may control the voltage driver 234 so that the plurality of voltage driving modules can provide different driving voltages according to preset information. For example, each of the plurality of voltage driving modules may provide a first voltage which are different to each other and a second voltage which are established as default according to preset information by the control of the controller 150.

According to an exemplary embodiment of the present general inventive concept, the voltage driver 234 may include a plurality of voltage driving modules corresponding to each area on the display panel 235 which are divided into a plurality of areas. In this case, the controller 150 may control the plurality of voltage driving modules so as to provide the first voltages which are different to each other, i.e., ELVDD voltage according to screen information (or inputted image information) in each of the plural areas. Thus, by using image signals inputted to the data driver 233, the capacity of ELVDD voltage may be controlled. Screen information may be one or more brightness and gray scale information regarding the inputted image.

In the display panel 235, the plurality of gate lines (GL1~GLn) and data lines (DL1~DLn) to define pixel areas by being crossed with each other are formed. On crossed pixel areas 236 (illustrated in FIG. 33), R, G, B light emitting diodes such as OLEDs may be formed. On one of the pixel areas 236, more correctly, on the edge, a switching diode (i.e., TFT) is formed. When the TFT operates turning-on, gray scale voltage is provided respectively to R, G, B emitting diodes from the data driver 233. R, G, B light emitting diodes may provide light corresponding to the electrical current amount provided based on the gray scale voltage. R, G, B light emitting diodes provide more light by being provided with a greater electrical current amount.

Figure 33:
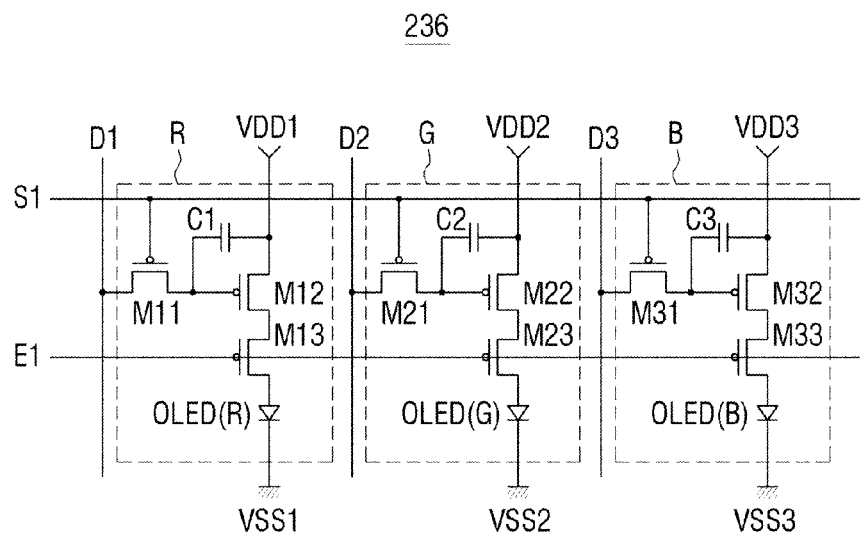
FIG. 33 is a diagram illustrating a circuit diode constituting R, G, and B pixels which are elements of LCD panels illustrated in FIG. 32.

FIG. 33 is a diagram illustrating a circuit structure which constitutes one of the R, G, B pixel areas 236 forming the LCD display panel 235 illustrated in FIG. 32.

Referring to FIG. 33, the display panel 235 may include three R, G, B pixel areas 236, each corresponding to one of red (R), green (G), and blue (B) light. The R, G, B pixel areas 236 may include scanning signals (S1), switching diodes (M11, M21, M31) which operate by gate on voltage (Vgh), switching diodes (M12, M22, M32) which output electrical currents based on pixel values including the modified high gray scale values provided through the data lines (DL1 DLn), and switching diodes (M13, M23, M33) which adjust electrical current amount provided from the switching diodes (M12, M22, M32) to the R, G, B emitting diodes according to controlling signals provided by the timing controller 231.

Such switching diodes (M13, M23, M33) provide electrical currents to the OLEDs by being connected with the OLEDs. The OLEDs indicate a display which emits light in itself by using the principle of electromagnetic field emission when electrical currents flow to fluorescent or phosphorescent organic thin films. Anode electrodes of OLEDs contact to pixel circuits, and cathode electrodes contact to ELVSS.

OLEDs generate a certain brightness of light in response to electrical currents provided form the pixel circuits. Herein, the gate electrodes of the switching diodes (M11, M21, M31) are connected to the passing line (S1), and one or more source electrodes and drain electrodes are connected to the data line (D1). The display panel 235 may be implemented as an active matrix organic light-emitting diode (AM-OLED) panel.

However, the above exemplary embodiment is merely one of the exemplary embodiments of the present general inventive concept; other embodiments of the present general inventive concept may not exclude a passive matrix organic light-emitting diode (PM-OLED) driving by the method that one line simultaneously emits.

Although the exemplary embodiment illustrated in FIG. 33 describes the OLEDs, the display may be implemented with various display technologies such as liquid crystal display panel (LCD panel), plasma display panel (PDP), vacuum fluorescent display (VFD), field emission display (FED), and electro luminescence display (ELD).

Figure 34:
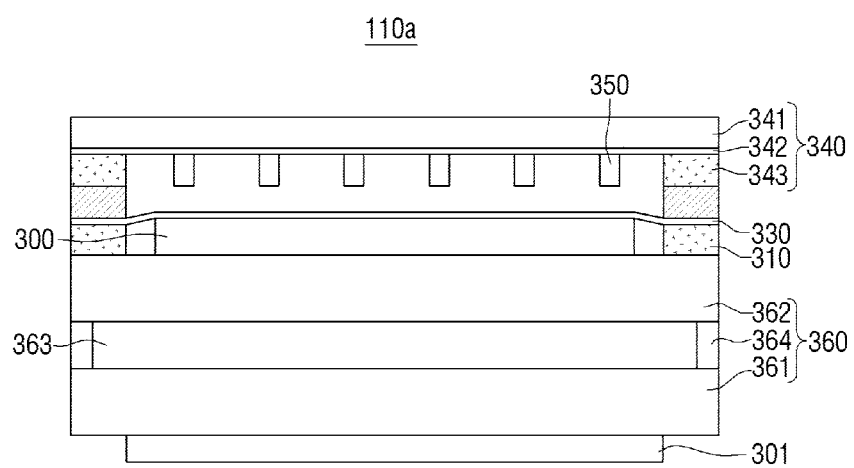
FIG. 34 is a sectioned view illustrating a section of the display according to an exemplary embodiment of the present general inventive concept.

FIG. 34 is a sectioned view explaining sectioned side of the first display 110a according to an exemplary embodiment of the present general inventive concept. The constitution illustrated in FIG. 34 may be applied to either or both the first display 110a and the second display 110b. For convenience of explanation, the first display 110a is referenced in relation to FIG. 34, Referring to FIG. 34, the first display 110a may include a display panel 360 which an upper substrate 362 and a lower substrate 361 are contacted closely, an upper polarizer 300 mounted on the upper substrate 362 of the display panel 360, a lower electrode 310 mounted on the side area of the upper polarizer 300, a lower transparent electrode 330 contacted to the lower electrode 310 and mounted on the upper polarizer 300, a touch pad 340 attached to the upper substrate 362 to which an upper transparent electrode 342 is mounted, and a projection 350 mounted between the upper transparent electrode 342 and the lower transparent electrode 330. Further, the display may include a lower polarizer 301 mounted on the lower substrate 361.

The touch pad 340 may include a base film 341, the upper transparent electrode 342 mounted on the base film 341, and an upper electrode 343 mounted on the upper transparent electrode.

Liquid substrate 363 may be formed in area between the upper substrate 362 and the lower substrate 361. The upper substrate 362 and the lower substrate 361 include marking area which displays image and surrounded area which is arranged around the marking area.

Although not illustrated in the marking area of the lower substrate 361, the plurality of gate lines, the plurality of data lines, the thin film transistor mounted on the crossed area of the plurality of gate lines and data lines, and pixel electrodes contacted to the thin film transistor. Further, maintenance electrodes of which parts are overlapped with the pixel electrodes are mounted.

On surrounded area of the lower substrate 361, a plurality of pads which contact to the gate lines and data lines may be mounted.

The upper substrate 362 and the lower substrate 361 are sealed by using sealing materials 364 such as sealant, desirably. It is effective that the sealing materials 364 are formed on surrounded areas of the upper substrate 362 and the lower substrate 361.

Regarding the display of FIG. 34, when the touch pad 340 is pushed with certain power externally, the projection 350 on the area where the power is approved is closely contacted with the lower transparent electrode 330, and thereby, the lower transparent electrode 330 and the upper transparent electrode 342 are contacted with each other electrically. Through electrical contacting, electrical currents which flow through the upper transparent electrode 342 and/or the lower transparent electrode 330 change, such change is sensed by another sensing means (not illustrated). The sensing means delivers the sensed signals to the controller 150 which is separately mounted. The controller 150 generates coordinates of areas to which electrical current flows change by using the sensed signals, and delivers the generated coordinates to the driver (not illustrated). In response to the inputted coordinates, the driver may perform the same operation as images displayed on the display panel 360 are manipulated by using the inputting means such as mouse.

Figure 35:
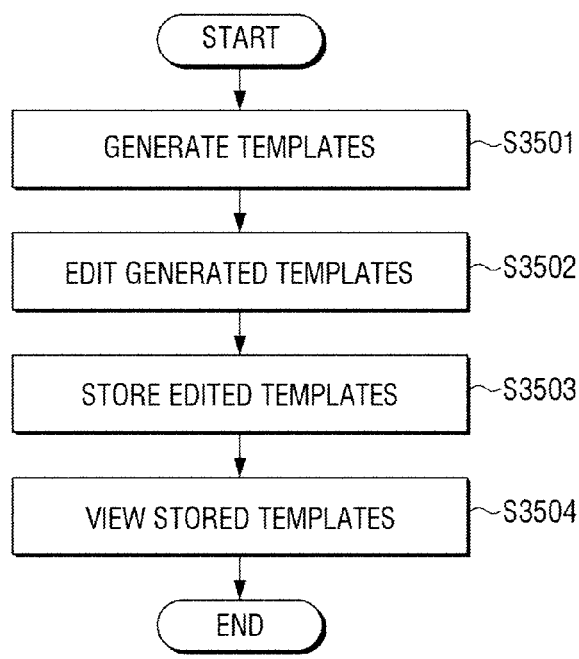
FIG. 35 is a block diagram illustrating creating and editing templates among the display controlling methods of the multi display apparatus according to an exemplary embodiment of the present general inventive concept.

FIG. 35 is a block diagram illustrating generating and editing templates among the display controlling methods of the multi display apparatus 100 according to an exemplary embodiment of the present general inventive concept.

Referring to FIG. 35, explained will be that the multi display apparatus 100 according to an exemplary embodiment of generating multi documents by using templates according to the present general inventive concept.

First, the multi display apparatus 100 generates templates to create multi documents by implementing applications at operation S3501. The multi display apparatus 100 edits the multi documents by adding, changing, and deleting contents according to the preset layouts in the generated templates at operation S3502. The templates which one or more contents is edited are stored in preset format at operation S3503. The multi display apparatus 100 displays the stored templates according to a request of a user at operation S3504.

Figure 36:
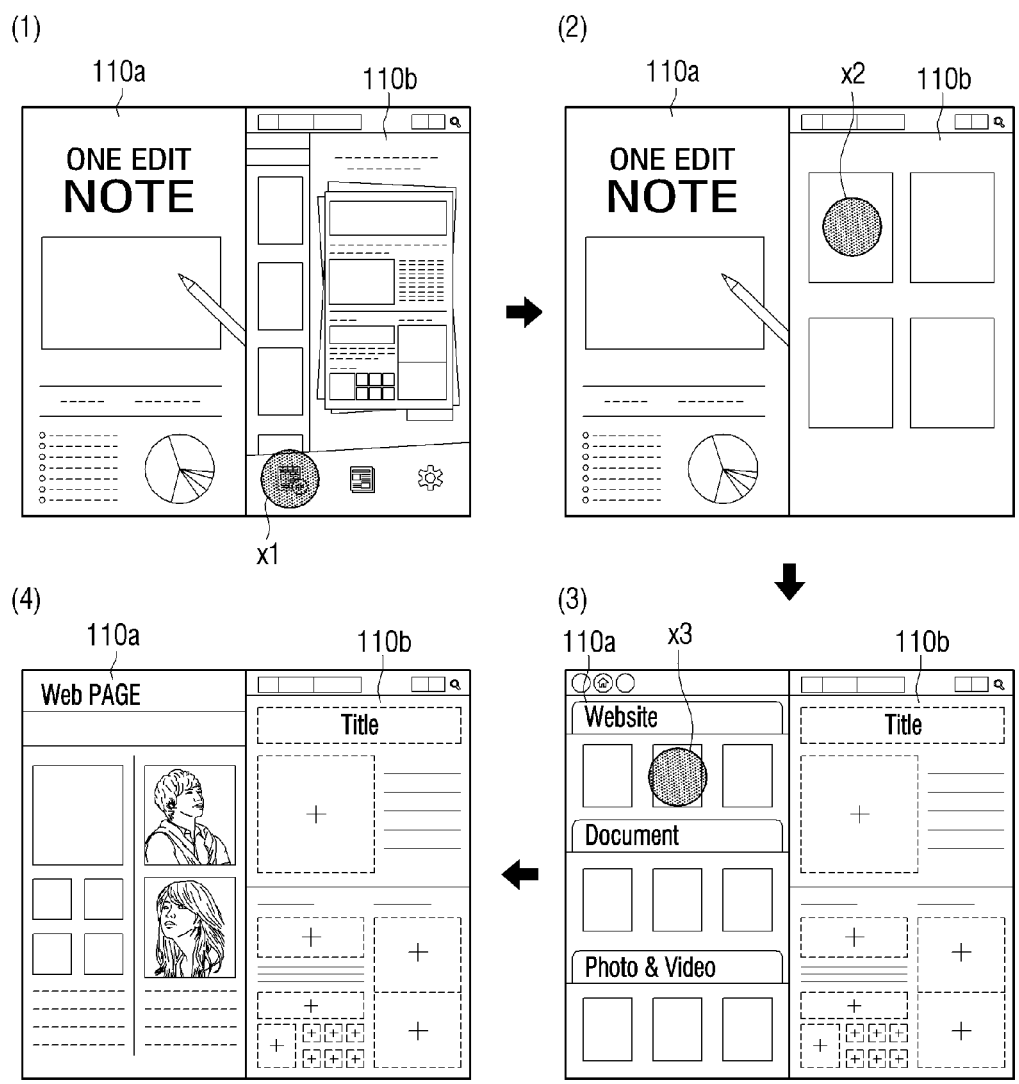
FIG. 36 is a diagram illustrating creating templates among the display controlling methods illustrated in FIG. 35.

FIG. 36 illustrates display screens to briefly explain generating templates among the display controlling methods in FIG. 35.

The 'template' as used herein refers to an editing screen in which layouts are predefined according to subjects of multi documents which a user writes. For example, when a user tries to write a multi document related to cooking, he may write a cooking-related multi document by manipulating the multi display apparatus 100 to include cooking-related contents on the editing screen while implementing a recipe template and displaying a cooking-related editing screen. When a user tries to write a multi document related to cars, he may write a car-related multi document by manipulating the multi display apparatus to include car-related contents while implementing a car template and displaying a car-related editing screen.

A user may implement an application to write multi documents, and call prestored templates according to the subject that he wants to write. He may write the multi document of the subject by including various contents in the called templates. Such templates are provided by the multi document writing application, and a user may modify layouts of the previously provided templates.

As illustrated in FIG. 36, the first display 110a displays an example of a first screen corresponding to a home screen regarding the multi document editing application, and the second display 110b displays a second screen which may include editing screens of various layouts (see view (1) of FIG. 36).

When a user selects (first user manipulation X1) an editing item to write multi documents by using one of the editing screens among the various templates, a plurality of editing screens having different layouts with each other are displayed in the second display 110b in thumbnail format (see view (2) of FIG. 36).

When at least one is selected (second user manipulation X2) from the plurality of editing screens having different layouts from each other which are displayed in thumbnail format, a detailed editing screen of the selected editing screen is displayed on the second display 110b (see view (3) of FIG. 36). The editing screens include predefined layouts according to which contents such as images, video, text, lists, and icons can be arranged.

For example, when a user selects a music-related editing screen to write a music-related multi document, the second display 110b displays the music-related editing screen. The first display 110a displays a web site including various contents related with music, music-related documents, music-related pictures or video as a third screen (see view (3) of FIG. 36).

When a specific web site is selected on the third screen (third user manipulation X3), a web browsing screen of the selected web site is displayed on the first display 110a as a third screen (see FIG. 36 view 4).

As illustrated in FIG. 36, to write a multi document according to specific subject, the editing screen which may include a plurality of editing documents having different layouts from each other is generated and displayed on the second display 110b, and the contents screen which may include various contents to fill the edited document is displayed on the first display 110a. The following will specifically describe an editing process which fills the editing screen displayed on the second display 110b by using contents included in the contents screen displayed on the first display 110a.

Figure 37:
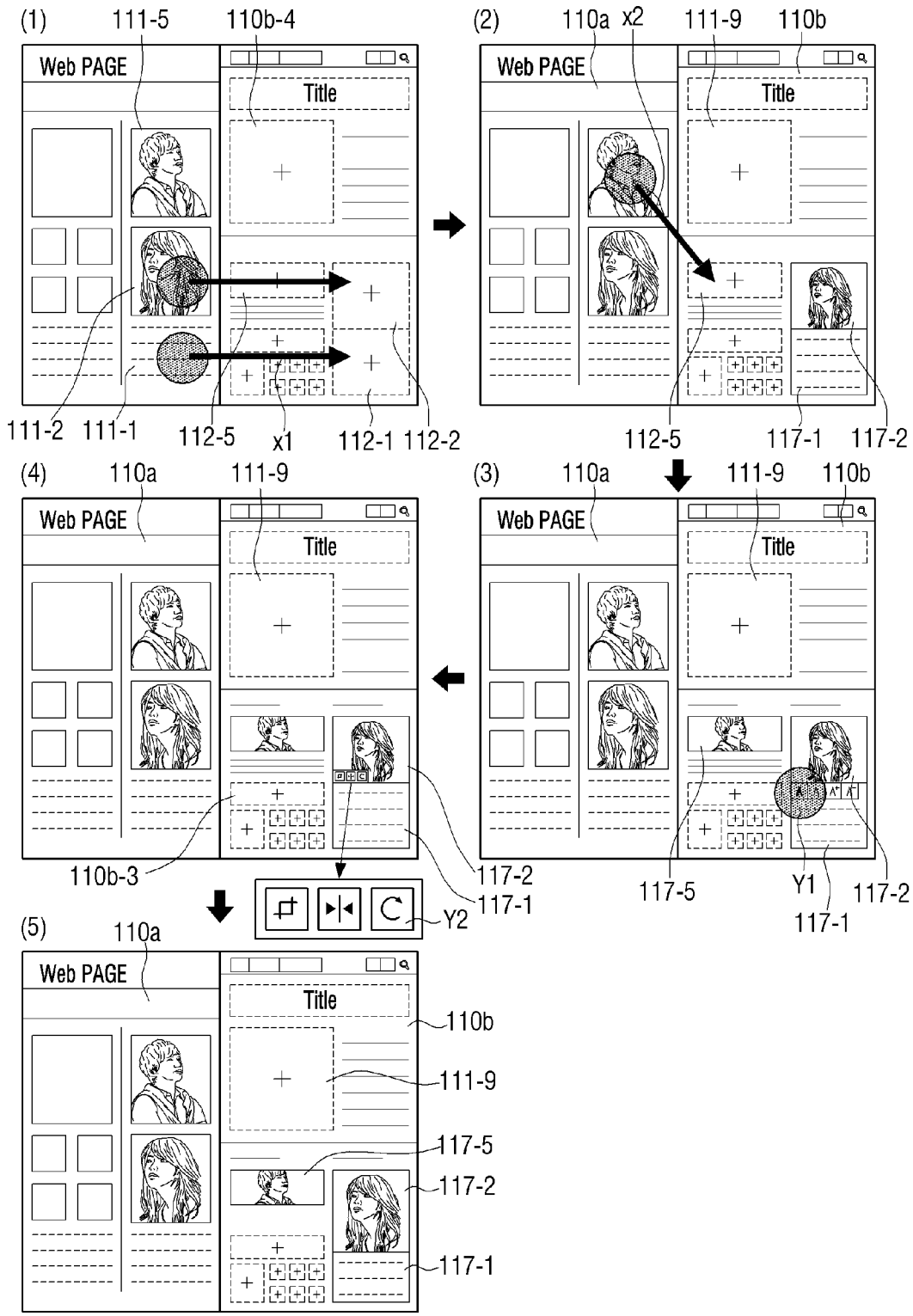
FIG. 37 is a diagram illustrating editing templates among the display controlling methods illustrated in FIG. 35.

FIG. 37 illustrates display screens to briefly explain editing documents among the display controlling methods illustrated in FIG. 35.

The editing documents illustrated in FIG. 37 starts from the final resulted screen illustrated in FIG. 36.

First, when at least one of the plurality of contents displayed on the first display 110a is selected, the selected contents is moved and displayed to the editing screen displayed on the second display 110b.

If a first text 111-1 and first image 111-2 included in the first display 110a are selected and dragged toward the second display 110b (a drag operation, first user manipulation X1), the dragged image 111-2 and text 111-1 are automatically pasted on each of the first image area 112-2 and the first text area 112-1 of the edited document displayed on the second display 110b, respectively (see view (1) of FIG. 37).

A second image 111-5 included in the first screen displayed on the first display 110a may be selected and dragged toward the second display 110b (second user manipulation X2, view (2) of FIG. 37). The second image 111-5 is automatically adjusted in its size and pasted to the second image area 112-5 on the templates displayed on the second display 110b (see view (3) of FIG. 37), resulting in second image 117-5 being displayed on the second display 110b.

When a text adjusting window is implemented in order to adjust a size of the first text 117-1 included in the second screen displayed on the second display 110b, a menu window (Y1) is displayed. Font size of the text may be adjusted by using buttons on the menu window Y1 (see view (3) of FIG. 37). Further, when an image adjusting window is implemented in order to adjust a size of the first image 117-2 included in the second screen, another menu window (Y2) is displayed (see view (4) of FIG. 37). A size of the first image 117-2 may be adjusted and expanded by using buttons on the menu window (Y2) (see view (5) of FIG. 37).

Figure 38:
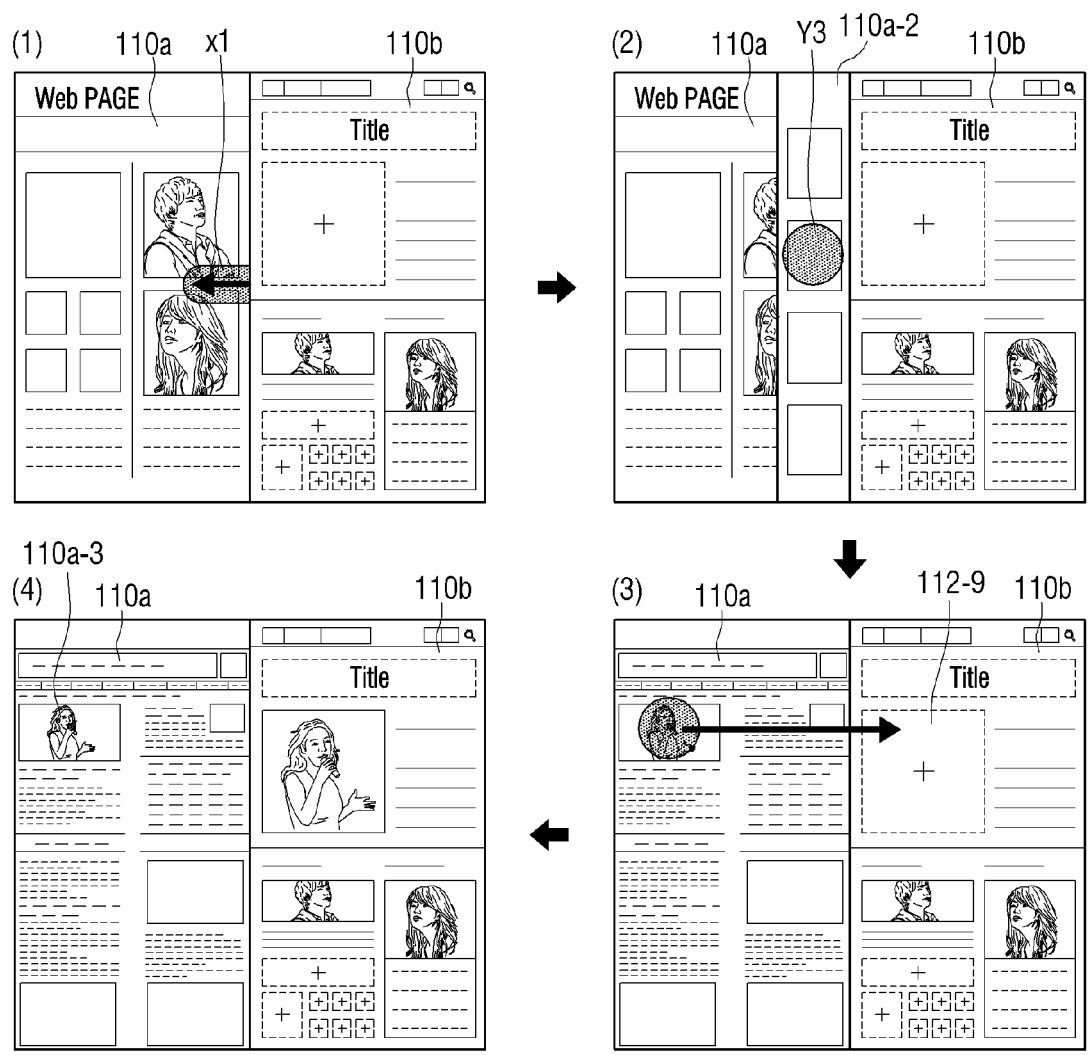
FIG. 38 is a diagram illustrating calling a resulted screen illustrated in FIG. 37 and editing templates additionally.

FIG. 38 illustrates display screens to briefly explain editing templates additionally by calling the resulted screen of FIG. 37.

Editing templates additionally illustrated in FIG. 38 starts from the final resulted screen illustrated in FIG. 37. On an area between the first display 110a and the second display 110b, dragging (first user manipulation X1) may be performed toward the first display 110a direction (see view (1) of FIG. 38). By dragging (X1), new menu window Y3 is generated and displayed. A user selects (second user manipulation X2) a specific web site on the new menu window Y3 (see view (2) of FIG. 38). When X2 is performed, a corresponding new web site is implemented on the first display 110a. When the new web site is displayed as a first screen on the first display 110a, the third image 111-9 included in the first screen may be selected and dragged toward the second display 110b (second user manipulation X2) (see view (3) of FIG. 38).

The third image 111-9 dragged toward the second display 110b direction is adjusted in its size, and arranged on the third image area 112-9 of the second screen displayed on the second display 110b (see view (4) of FIG. 38).

Referring to view (3) of FIG. 38, the second display 110b displays templates including preset layouts as a second screen. The second screen may include the first image, the second image and the first text. The multi document is completed by copying and pasting the three contents on the templates displayed as the second screen. Storing the multi documents generated with the templates for which contents editing is partly completed will be described below separately.

Figure 39:
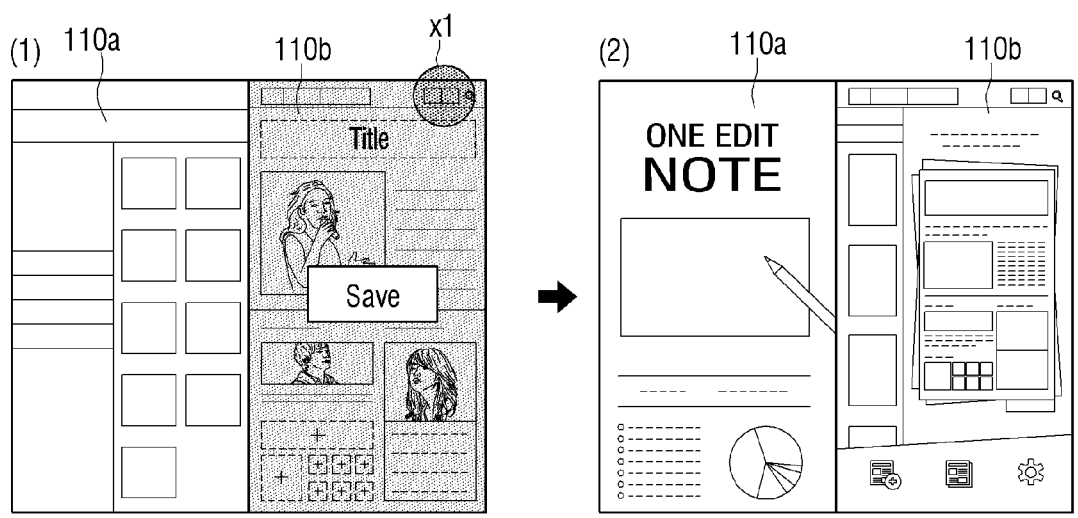
FIG. 39 is a diagram illustrating storing the resulted screen illustrated in FIG. 38.

FIG. 39 illustrates display screens to explain storing the resulted screen of FIG. 38.

Referring to view (1) of FIG. 39, the second display 110b displays templates which editing is partly completed. Storing icon (W1) is implemented so as to store the templates displayed on the second display 110b as multi documents. The word, "SAVE," may be displayed on the second screen displayed on the second display 110b so as to visually confirm that corresponding templates are converted to specific formats and stored in the storage unit 170. When storing of the previously created templates is completed, corresponding templates belong to the template group which various templates are assembled. Further, corresponding templates may be stored in a specific folder. Referring to view (2) of FIG. 39, confirmed is that a plurality of templates may be layered and displayed in thumbnail format.

The multi documents generated as described above are stored in the storage unit 170.

Figure 40:
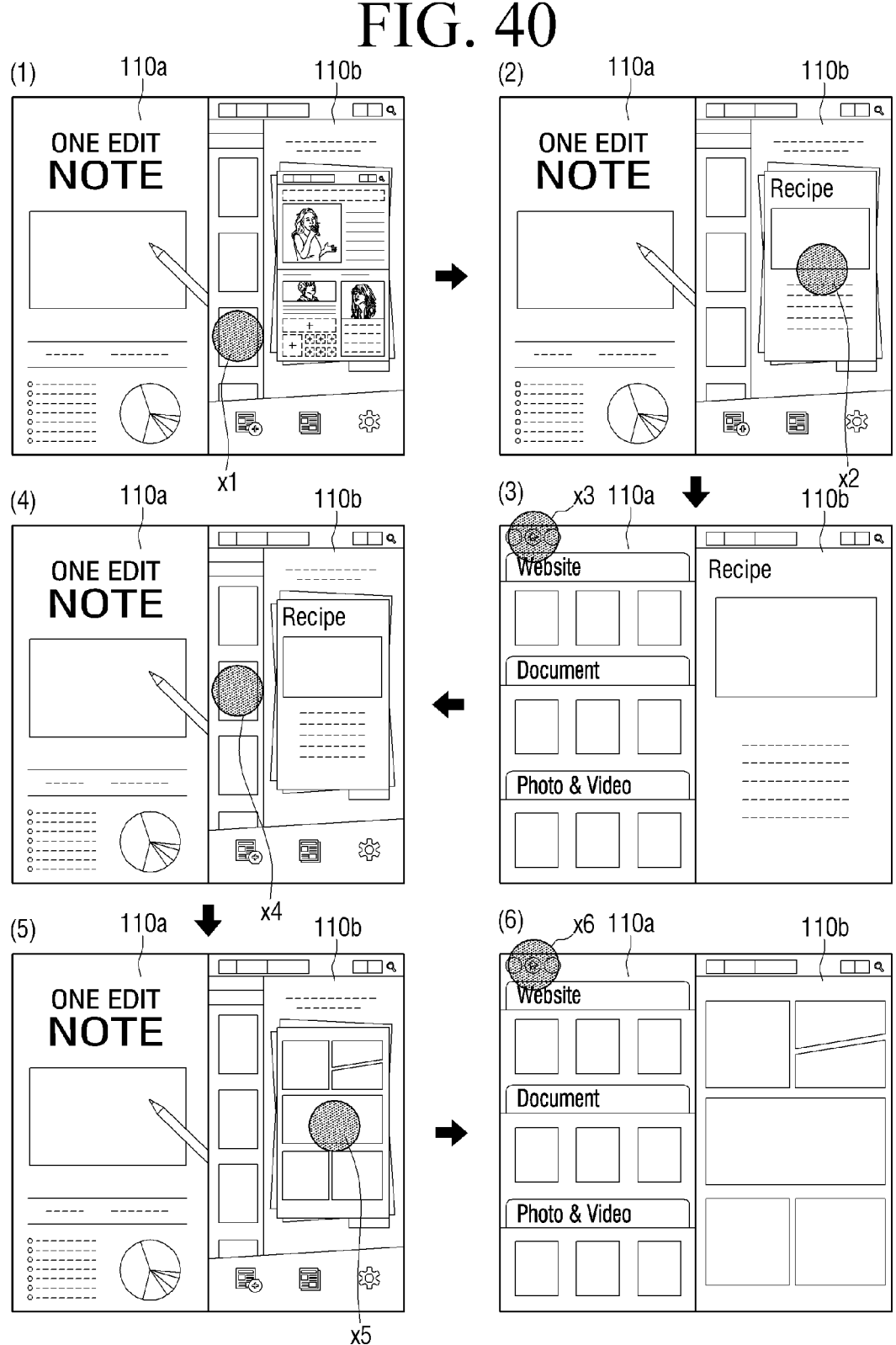
FIG. 40 is a diagram illustrating calling various templates in the multi display apparatus according to an exemplary embodiment of the present general inventive concept.

FIG. 40 illustrates display screens to explain calling various templates according to an exemplary embodiment of the present general inventive concept.

Referring to FIG. 40, when the applications are implemented according to an exemplary embodiment of the present general inventive concept, the first display 110a displays a home screen of the document editing application, and the second display 110b displays various multi documents which are previously written.

Calling the various templates illustrated in FIG. 40 starts from the final resulted screen of FIG. 39 (see view (1) of FIG. 40). As illustrated in the upper left drawing of FIG. 40, when one or more the templates displayed as thumbnail is selected (first user manipulation X1) on the second display 110b, a corresponding template is displayed on uppermost position of the second display 110b.

For example, when a template regarding a recipe is selected by first user manipulation X1 on the thumbnail screen displayed on the second display 110b, the template regarding the recipe is called from the storage unit 170, and displayed on an uppermost position among the plurality of templates displayed on the second display 110b (view (2) of FIG. 40).

When the recipe template displayed on the uppermost position is selected (second user manipulation X2) among the plurality of templates, detailed descriptions of the recipe template are displayed as a second screen on the second display 110b. At this moment, the first display 110a displays the contents menu regarding web sites, documents, pictures and video (see view (3) of FIG. 40).

When an icon moving to a home page displayed on the upper of the screen displayed on the first display 110a is selected (third user manipulation X3), the first display 110a displays the home page of the document editing application, and the second display 110b displays a plurality of templates in thumbnail format. The expanded recipe template is reduced and displayed on uppermost position among the plurality of templates (see view (4) of FIG. 40).

When a template regarding carton is selected (fourth user manipulation X4) among the thumbnails of the plural templates displayed on the second display 110b, the carton template is called from the storage unit 170, and displayed on uppermost position among the plurality of templates displayed on the second display 110b (see view (5) of FIG. 40).

When the carton template displayed on uppermost position is selected (fifth user manipulation X5) among the plurality of templates, detailed descriptions of the carton template is displayed on the second display 110b as second screen. The first display 110a displays the contents menu regarding web sites, documents, pictures and video (see view (6) of FIG. 40).

In view (6) of FIG. 40, when the icon moving to home page displayed on the upper of the screen on the first display 110a is selected (sixth user manipulation X6), the first display 110a displays the home page of the document editing application, the second display 110b displays the plurality of templates in thumbnail format, and the expanded carton template is reduced and displayed in the uppermost position among the plurality of templates.

According to one of the various exemplary embodiments of the present general inventive concept, the previously created templates may be displayed in various methods and selected by a user. An exemplary method of displaying the previously created templates will be described below.

Figure 41:
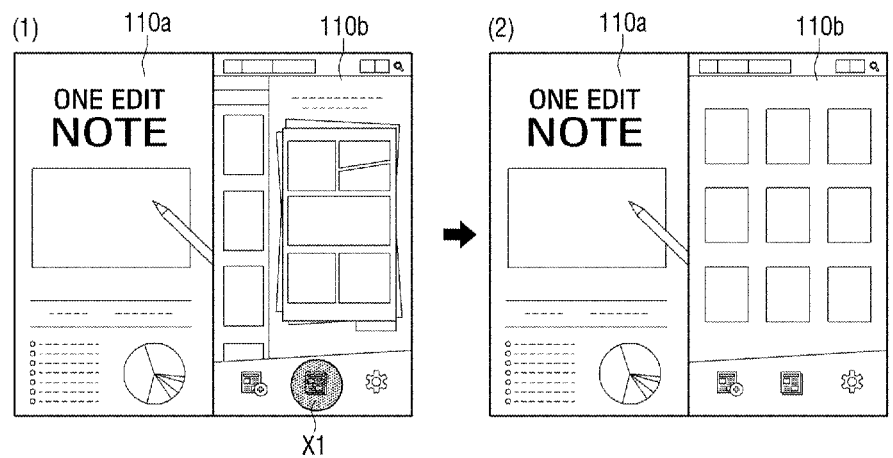
FIG. 41 is a diagram illustrating that various templates are displayed by the display controlling method according to an exemplary embodiment of the present general inventive concept.

FIG. 41 illustrates display screens to explain displaying various templates controlled by the display controlling method according to an exemplary embodiment of the present general inventive concept.

Referring to view (1) of FIG. 41, the first display 110a displays the home page of the document editing application and the second display 110b displays various templates in thumbnail format. The plurality of templates are layered to be overlapped and displayed. When one icon is selected (first user manipulation X1) among the icons displayed on the lower portion of the second display 110b, the second display 110b displays the plurality of templates in thumbnail format (see view (2) of FIG. 41).

When a user selects one or more the thumbnails regarding the plurality of templates displayed on the second display 110b, more detailed descriptions of corresponding template can be confirmed, and editing of the corresponding template can be performed. The operation is explained in detail above, and will be further described below.

The display apparatus 100 according to an exemplary embodiment of the present general inventive concept displays the first screen on the first display 110a and the second screen on the second display 110b. Herein, because the first screen and the second screen are synchronized or linked with each other, when one screen is searched, the other is synchronized according to the results of the search.

The following will specifically describe various exemplary embodiments of the present general inventive concept in which the first screen displayed on the first display 110a and the second screen displayed on the second display 110b are synchronized with each other.

The first multi document displayed on the first display 110a and the second multi document displayed on the second display 110b may be displayed independently of each other.

Figure 42:
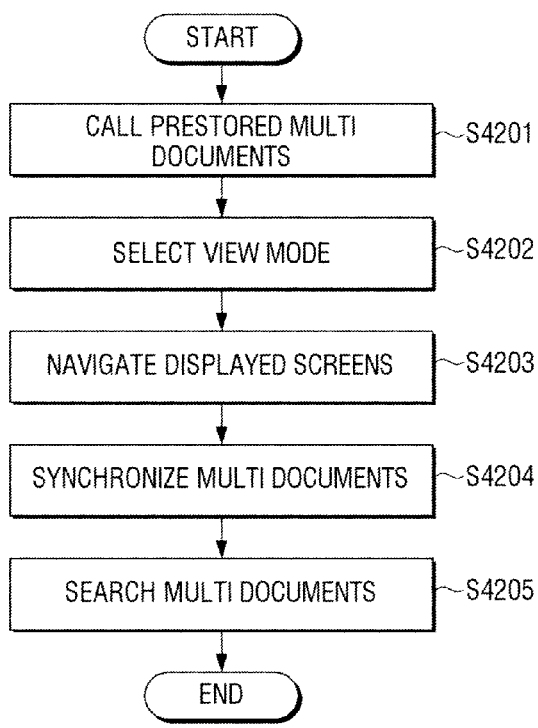
FIG. 42 is a block diagram illustrating searching multi documents among the display controlling methods of the multi display apparatus according to an exemplary embodiment of the present general inventive concept.

FIG. 42 is a flowchart illustrating searching multi documents among the display controlling methods of the multi display apparatus 100 according to an exemplary embodiment of the present general inventive concept.

Referring to FIG. 42, the multi display apparatus 100 according to an exemplary embodiment of the present general inventive concept calls the prestored multi documents in the storage unit 170 at operation S4201. Herein, "multi document" indicates various types of electronic document which may include various contents, as described in detail above. Such multi document may be one kind of web pages. Further, the first multi document displayed on the first display 110a and the second multi document displayed on the second display 110b may include various types of contents.

For example, if the multi document is a kind of educational contents, the first multi document may be contents of a biology textbook, and the second multi document may be contents of biology textbook notes. Further, both the first multi document and the second multi document may be the contents of the biology textbook. Further, both the first multi document and the second multi document may be contents of biology notes. Herein, the first multi document and the second multi document may be linked with each other.

The multi display apparatus 100 may select and change view modes of the first and second multi documents at operation S4202. Further specific explanation will follow by referring to FIG. 43.

Figure 43:
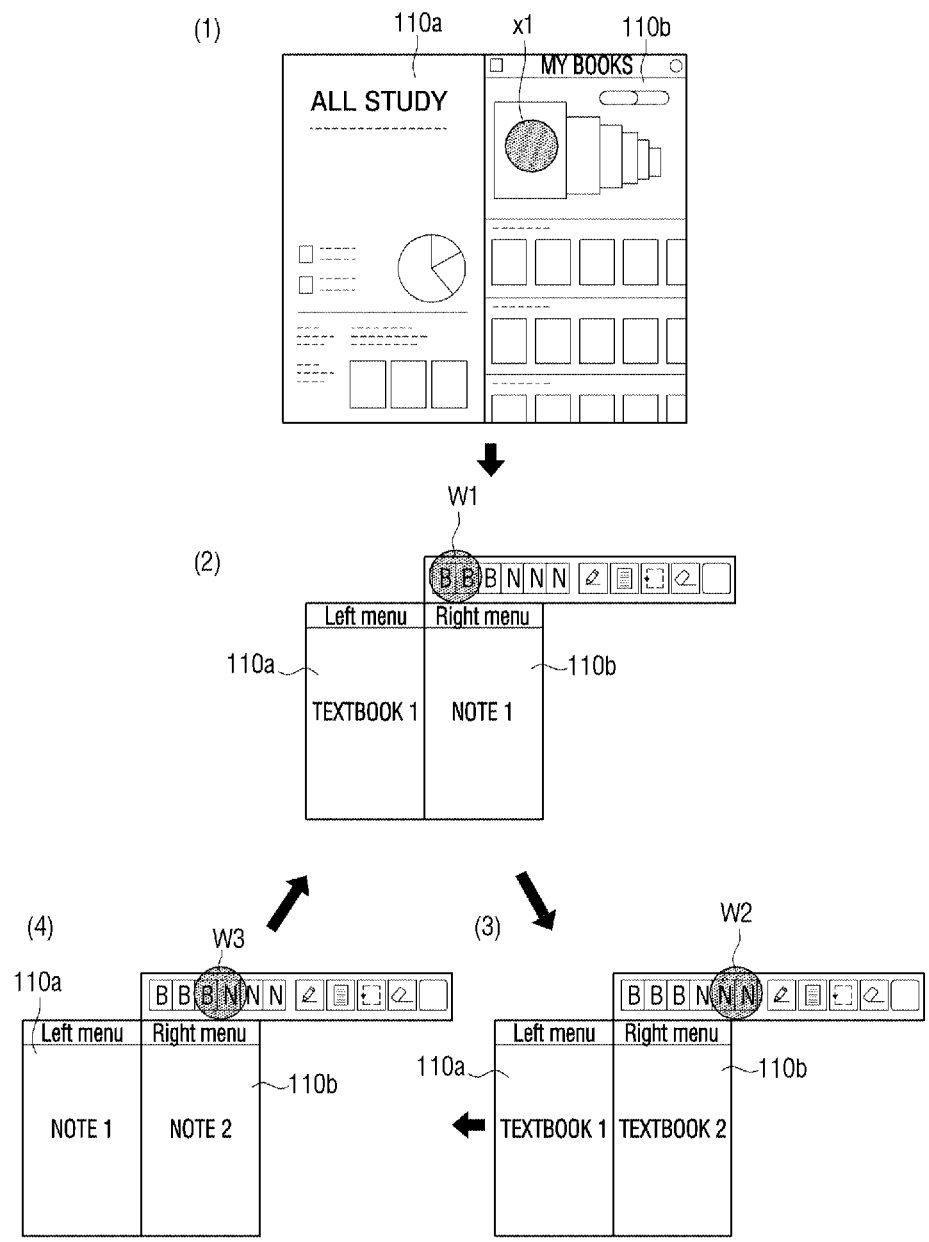
FIG. 43 is a diagram illustrating calling multi documents according to the exemplary embodiment illustrated in FIG. 42.

FIG. 43 illustrates display screens to explain calling multi documents according to FIG. 42.

Referring to view (1) of FIG. 43, the first display 110a displays the first multi document reading textbook 1. The second display 110b displays the second multi document regarding note 1.

By a first user manipulation X1, a menu window that view modes of the multi documents which can be selected is displayed on the upper of the second display 110b (see view (2) of FIG. 43). According to another exemplary embodiment of the present general inventive concept, the menu window may be adjusted to be displayed on another area.

When a user selects on the displayed menu window, view modes of the screens displayed currently on the first display 110a and the second display 110b are changed and displayed.

When area W1 is selected by user manipulation (see view (1) of FIG. 43), B/B is selected as view mode that displays multi documents. The first display 110a displays page N of the original contents, and the second display 110b displays page N+1 of the original contents. For example, the first display 110a displays textbook 1, corresponding to page 1, and the second display 110b displays textbook 2, corresponding to page 2 (see view (3) of FIG. 43).

While the first display 110a displays textbook 1 and the second display 110b displays textbook 2, when a user selects area W2 on the menu window (see view (3) of FIG. 43), view modes of the screens displayed currently on the first display 110a and the second display 110b are changed and displayed.

When W2 is selected, N/N is selected as view mode that displays multi documents. Thus, the first display 110a displays M page of copied contents, and the second display 110b displays M+1 page of the copied contents. For example, the first display 110a displays note 1, and the second display 110b displays note 2 (see view (4) of FIG. 43).

While the first display 110a displays note 1 and the second display 110b displays note 2, when a user selects area W3 on the menu window (see view (4) of FIG. 43), view modes of the screens displayed currently on the first display 110a and the second display 110b are changed and displayed.

When W3 is selected, B/N is selected as view mode that displays multi documents. Thus, the first display 110a displays N page of the original contents and the second display 110b displays M page of the copied contents. For example, the first display 110a displays textbook 1 and the second display 110b displays note 1 (see view (2) of FIG. 43).

Returning to FIG. 42, the multi display apparatus 100 navigates corresponding display screens at operation S4203 when user manipulation is performed on the screens displayed on the first display 110a and the second display 110b.

Figure 44:
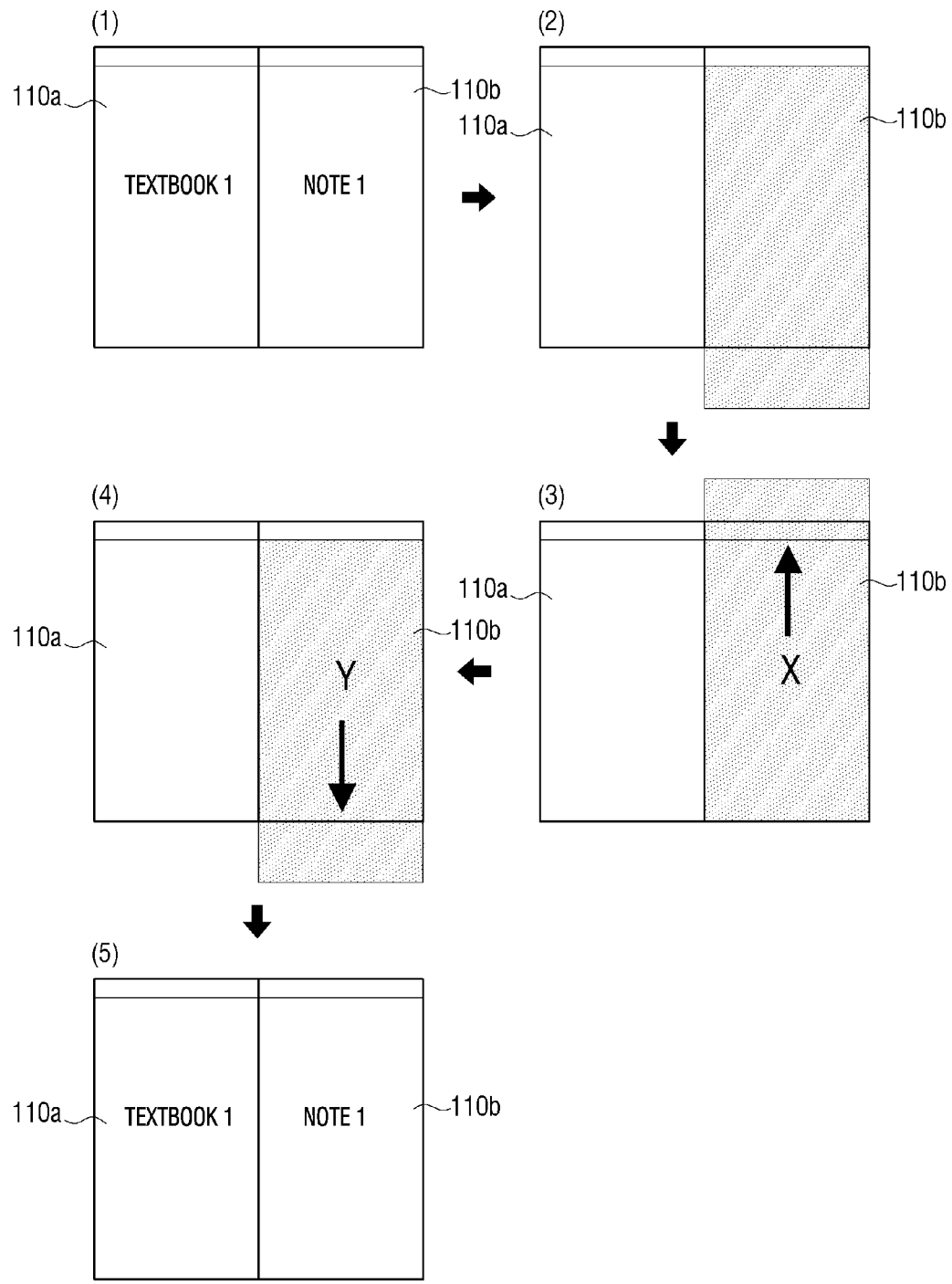
FIG. 44 is a diagram illustrating navigating parts of multi documents according to an exemplary embodiment of the present general inventive concept.

The relevant features will be further described by referring to FIG. 44.

FIG. 44 illustrates display screens to explain navigating parts of the multi documents according to an exemplary embodiment of the present general inventive concept.

Referring to view (1) of FIG. 44, the first display 110a displays textbook 1. The second display 110b displays note 1.

When user manipulation is inputted on the second display 110b, other parts of note 1 that are not displayed can be navigated among note 1 may be displayed on the second display 110b. Referring to view (2) of FIG. 44, note 1 displayed on the second display 110b may be expanded on a vertical direction.

When a user performs a sliding touch (touch & drag operation) in an X direction on the second display 110b, note 1 displayed on the second display 110b is scrolled up in the X direction (see view (3) of FIG. 44).

When a user performs sliding touch (touch & drag operation) in a Y direction on the second display 110b, note 1 displayed on the second display 110b is scrolled up in the Y direction (see view (4) of FIG. 44).

When navigation completes because a user stops performing a sliding touch on the second display 110b, textbook 1 is displayed on the first display 110a and note 1 is displayed on the second display 110b (see view (5) of FIG. 44), note 1 being displayed in the position left according to the sliding touch.

Returning to FIG. 42, the multi display apparatus 100 synchronizes the multi documents with each other on the first display 110a and the second display 110b at operation S4204 when a user manipulation to modify any one of the multi documents displayed on the first display 110a and the second display 110b is input.

Figure 45:
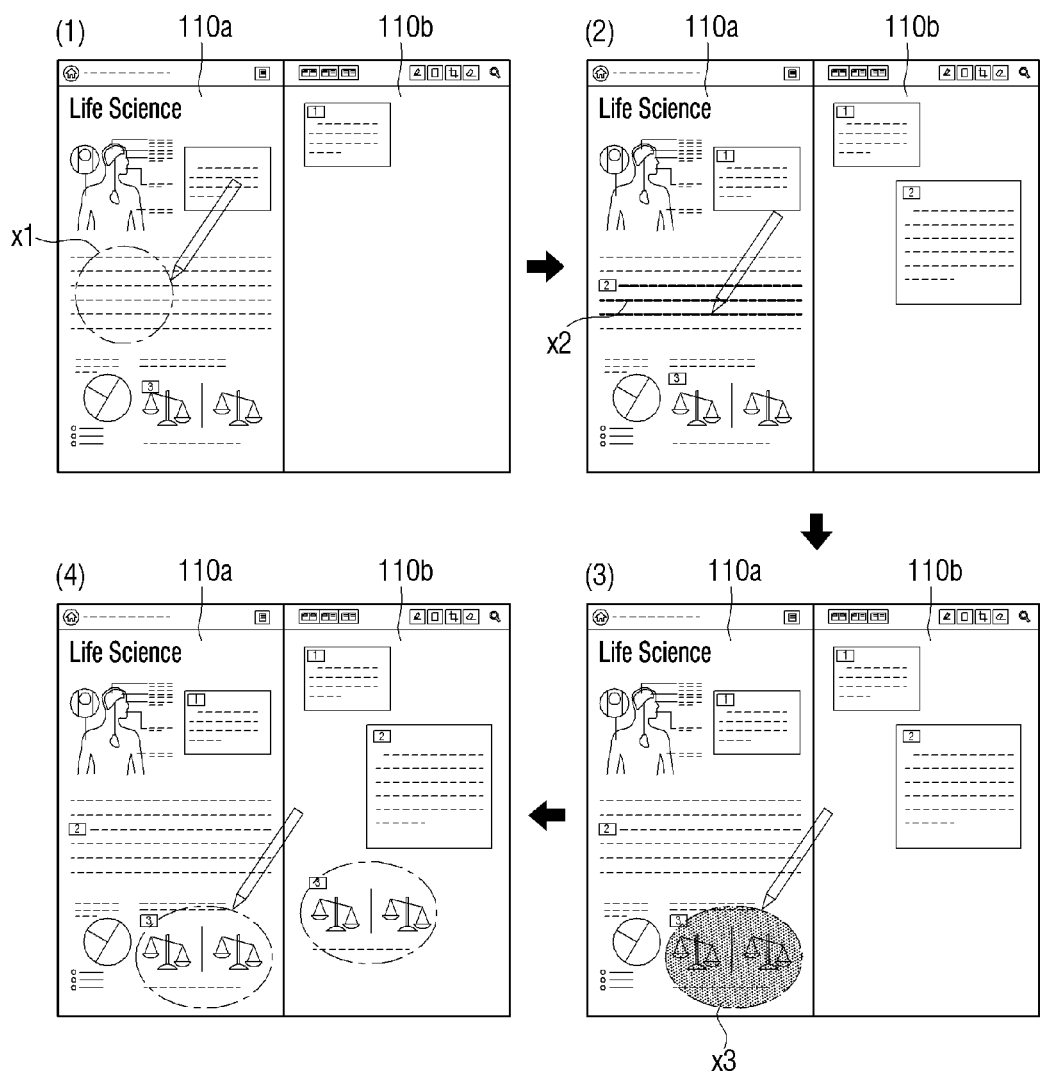
FIG. 45 is a diagram illustrating synchronizing multi documents by marking according to an exemplary embodiment of the present general inventive concept.

Specific explanation will follow by referring to FIG. 45.

FIG. 45 illustrates display screens to explain synchronizing multi documents with each other according to an exemplary embodiment of the present general inventive concept.

As illustrated in view (1) of FIG. 45, when a user selects (first user manipulation X1) some text among the multi documents displayed on the first display 110a, the selected text is extracted according to the user manipulation. The extracted text is added to the second display 110b as new contents.

The multi display apparatus 100 according to an exemplary embodiment of the present general inventive concept senses user manipulation on the first display 110a. User manipulation is analyzed and reflected on the second display 110b. Therefore, the multi display apparatus 100 synchronizes the first multi document displayed on the first display 110a and the second multi document displayed on the second display 110b with each other.

Further, when a user marks and selects (second user manipulation X2) some text among the multi documents displayed on the first display 110a, the marked and selected text may be added to the second display 110b as new contents (see view (2) of FIG. 45).

The multi display apparatus 100 according to an exemplary embodiment of the present general inventive concept senses user manipulation on the first display 110a. When the sensed user manipulation is to extract text included in the multi documents, the text is extracted from the multi documents, the extracted text is added to the second display 110b as new contents, and the first multi document and the second multi document are synchronized with each other.

As illustrated in view (3) of FIG. 45, a user selects (third user manipulation X3) image contents among the multi documents displayed on the first display 110a.

The selected images may be added to the second display 110b as new contents according to the user manipulation (see view (4) of FIG. 45). At this moment, the selected images may be converted to the image file having a proper size for the second display 110b and displayed.

As described above, in the multi display apparatus 100 according to an exemplary embodiment of the present general inventive concept, the first multi document displayed on the first display 110a and the second multi document displayed on the second display 110b are synchronized with each other. By user manipulation on one of the multi documents, another multi document can be modified. Thereby, the multi documents are synchronized with each other and the synchronized multi documents are stored in the storage unit 170.

The previously stored multi documents may be read by a user command, and the read multi documents may be additionally changed or modified. Returning to FIG. 42, after synchronization, the stored multi documents may be searched (operation S4205). The following will specifically explain an exemplary method of searching the previously stored multi documents.

Figure 46:
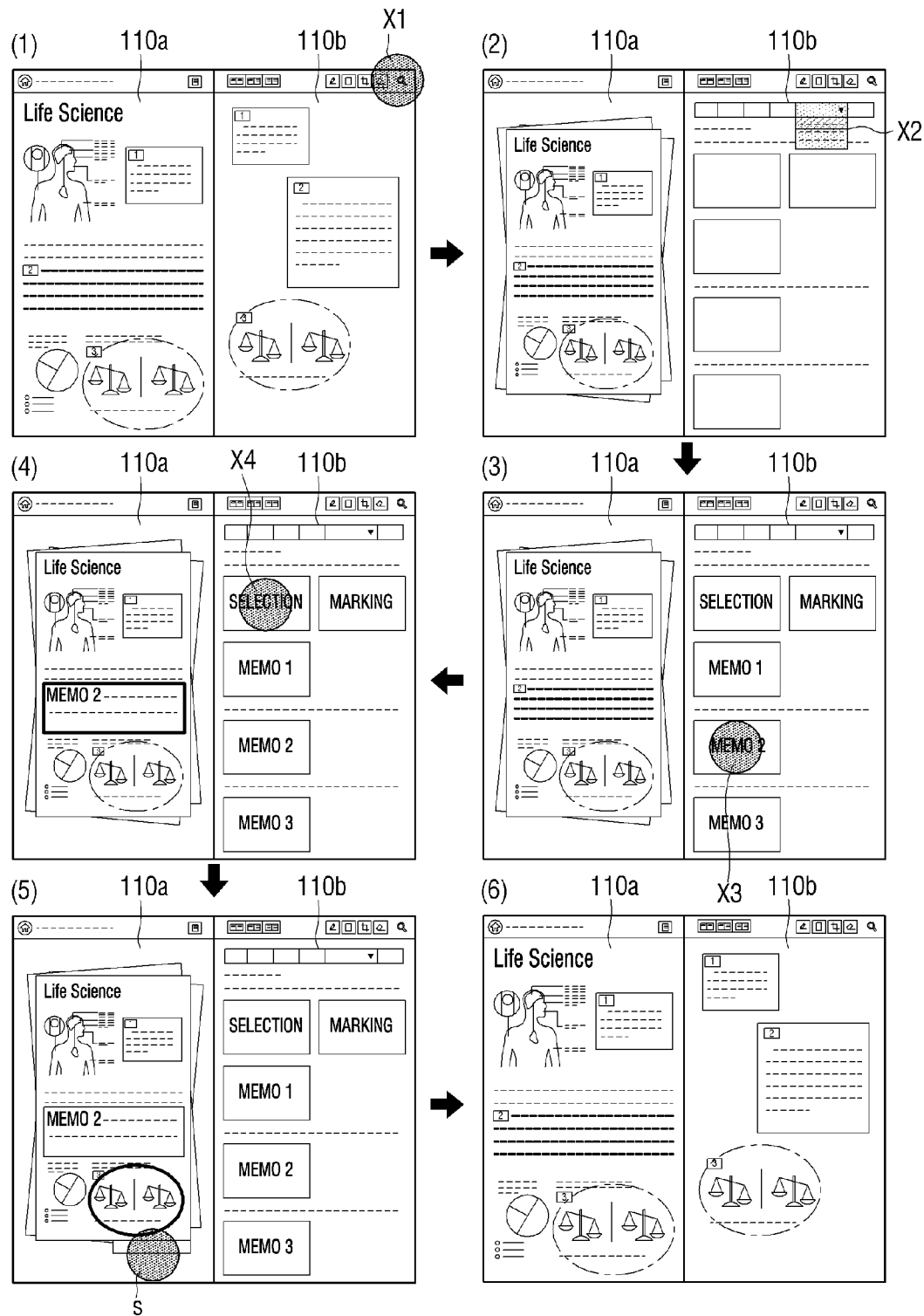
FIG. 46 is a diagram illustrating searching multi documents according to an exemplary embodiment of the present general inventive concept.

FIG. 46 illustrates display screens to explain searching multi documents according to an exemplary embodiment of the present general inventive concept.

As illustrated in FIG. 46, searching multi documents on the final resulted screen of FIG. 45 will be explained.

Referring to an upper left drawing of FIG. 46, the first display 110a displays the final modified multi document and the second display 110b displays added and modified various memos, scraps, and marked contents. A user may searching other multi documents by selecting (first user manipulation X1) searching icon marked on the upper of the second display 110b.

When a user implements searching of other multi documents, the screen on the first display 110a may be converted to a screen on which a plurality of multi documents are overlapped and displayed. The uppermost of the overlapped multi documents may correspond to the most recently modified multi document. On the second display 110b, the thumbnail screen regarding selections, memos and marked contents regarding the multi document displayed on uppermost position of the first display 110a is displayed (see view (2) of FIG. 46).

As illustrated in the upper right drawing of FIG. 46, when a user selects (second user manipulation X2) specific search criteria, various contents displayed on the second display 110b may be arranged according to the selected searching conditions (see view (3) of FIG. 46).

In view (4) of FIG. 46, selections, marking, memo 1, memo 2, and memo 3 are displayed in thumbnail format. The selections, the marking, memo 1, memo 2, and memo 3 are related with the multi document which is displayed on uppermost position of the first display 110a. For the purposes of the example illustrated in FIG. 46, the user may select (third user manipulation X3) memo 2.

When a user selects memo 2, a multi document including the source contents of memo 2 is searched and displayed on the first display 110a (see view (4) of FIG. 46). In the example illustrated in FIG. 46, the user subsequently selects (fourth user manipulation X4) the selection displayed on the second display 110b.

When a user selects the selection, a multi document including source contents of the scrap is searched and displayed on the first display 110a (see view (5) of FIG. 46). If memo 2 and the source contents of the scrap are on the same page of the same multi document, the multi document displayed on uppermost position of the first display 110a need not change, as illustrated in views (4) and (5) of FIG. 46.

Further, a bookmark tag may be displayed on parts of the multi document displayed on the uppermost position on the first display 110a. When a user selects (fifth user manipulation X5) the bookmark tag, it may move to the linked page corresponding to the bookmark tag. (See view (6) of FIG. 46). Because in the exemplary embodiment illustrated in FIG. 46 memo 2 and the selection are linked with same page of the same multi document, the page that a user selects with the bookmark and moves to in view (6) of FIG. 46 is the same as multi document displayed on the first display 110a in view (1) of FIG. 46.

According to various exemplary embodiments of the present general inventive concept, because the first multi document displayed on the first display 110a and the second multi document displayed on the second display 110b are synchronized with each other, when parts of the multi document are changed, modified and added, such editing may be automatically reflected on the other multi document. Further, contents added to specific multi document may be arranged and searched per type. Because the original multi document can be easily searched by using the searched and added contents, there is an advantage that searching between the linked multi documents is easy.

Although exemplary embodiments of the present general inventive concept have been described above and illustrated in the drawings, the present general inventive concept is not limited to these exemplary embodiments. The displays of the multi display 110 are not necessarily physically connected by a hinge 130 or other device. The displays may instead communicate with each other through wireless communication, facilitated by the communicator 120 under control of the controller 150. This would allow greater user convenience when two or more users use the multi display apparatus 100 at a time. If the sensor 185 can sense the location of a wirelessly connected second display, user manipulations can still be made with regard to the location of the displays. For example, a drag operation on the first display 110a toward the second display 110b could move objects from the first display to the second display, regardless of the actual location and orientation of the second display.

Furthermore, the individual displays of the multi display 100 need not be the same size or resolution. For example, the first display 110a may be a user terminal, such as a tablet PC, while the second display 110b may be a projection display, such as that in a conference room, communicating with the first display 110a on a wired or wireless basis. This would allow a user to display the second screen displayed on the second display 110b for one or more viewers. Furthermore, if there are more than two displays, a plurality of user terminals could be used to modify the second screen on the second display 110b, similarly to the manner above. The plurality of user terminals could be synchronized with each other to display the same set of contents, thereby allowing multiple users to collaborate on the final appearance of the second screen. Alternatively the plurality of user terminals could display different contents, thereby allowing different users to make different contributions to the second screen.

Meanwhile, the display controlling methods of the multi display apparatus 100 according to the various exemplary embodiments of the present general inventive concept may be implemented as programs and provided to the multi display apparatus 100.

For example, when one contents is implemented among the contents, provided may be a non-transitory computer readable recording medium storing the programs which implement the displaying the first screen on the first display 110a, displaying the second screen corresponding to the implemented contents on the second display 110b, and modifying displayed descriptions of the second screen according to the user manipulation when user manipulation is performed on the first screen.

Non-transitory computer readable recording medium indicate medium which store data semi-permanently and can be read by devices, not medium storing data temporarily such as register, cache, or memory. Specifically, the computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi display apparatus, comprising:
a first body comprising a first display;
a second body comprising a second display;
a hinge configured to connect the first body and the second body;
a storage unit configured to store one or more contents; and
a controller configured to display a first screen on the first display and display a second screen corresponding to implemented contents on the second display when one of the stored one or more contents is implemented, and to modify the displayed contents on the second screen according to a user manipulation when the user manipulation is performed on the first screen,
wherein a result of the manipulation on the first screen is fit to a layout of the second screen.

2. A multi display apparatus, comprising:
a first body comprising a first display;
a second body comprising a second display;
a hinge configured to connect the first body and the second body;
a storage unit configured to store one or more contents; and
a controller configured to display a first screen on the first display and display a second screen corresponding to implemented contents on the second display when one of the stored one or more contents is implemented, and to modify the displayed contents on the second screen according to a user manipulation when the user manipulation is performed on the first screen, wherein:

when a plurality of the stored contents is implemented, the controller consecutively overlaps and displays a plurality of first screens respectively corresponding to the plurality of implemented contents on the first display, and consecutively overlaps and displays a plurality of second screens respectively corresponding to the plurality of first screens on the second display; and when one first screen is selected from among the plurality of first screens, the controller displays the selected first screen on the first display on an uppermost position among the plurality of first screens, and displays a second screen corresponding to the selected first screen on the second display on an uppermost position among the plurality of second screens.

3. A multi display apparatus, comprising:
a first body comprising a first display;
a second body comprising a second display;
a hinge configured to connect the first body and the second body;
a storage unit configured to store one or more contents; and
a controller configured to display a first screen on the first display and display a second screen corresponding to implemented contents on the second display when one of the stored one or more contents is implemented, and to modify the displayed contents on the second screen according to a user manipulation when the user manipulation is performed on the first screen, wherein:
when a plurality of the stored contents is implemented, the controller consecutively overlaps and displays a plurality of first screens respectively corresponding to the plurality of implemented contents on the first display, and consecutively overlaps and displays a plurality of second screens respectively corresponding to the plurality of first screens on the second display; and
when objects displayed on one first screen among the plurality of first screens are selected, the selected objects are displayed on a second screen corresponding to the first screen.

4. The multi display apparatus of claim 1, wherein the controller displays on the second screen one or more objects corresponding to objects displayed on the first screen, the one or more objects being displayed on the second screen within a specific area marked by a user manipulation on the second screen.

5. The multi display apparatus of claim 1, wherein, when contents that are used by a plurality of users are implemented, the controller displays on the first display a first screen which is created with contents corresponding to a first user among the plurality of users, and displays on the second display a second screen which is created with contents corresponding to a second user among the plurality of users.

6. The multi display apparatus of claim 5, wherein the contents that are used by the plurality of users comprise one or more of medical contents, educational contents, class material contents, and meeting contents.

7. A multi display apparatus, comprising:
a first body comprising a first display;
a second body comprising a second display;
a hinge configured to connect the first body and the second body;
a storage unit configured to store one or more contents; and
a controller configured to display a first screen on the first display and display a second screen corresponding to implemented contents on the second display when one of the stored one or more contents is implemented, and to determine and display objects on the second screen based on preset layout information regarding the second screen when the objects are selected within the first screen and moved to the second screen, the preset layout information comprising one or more display positions on the second screen corresponding to each of one or more types of the objects
wherein a result of a selection on the first screen is fit to a layout of the second screen using the preset layout information.

8. The multi display apparatus of claim 7, wherein the preset layout information further comprises information about one or more of position, shape, color, special effect, and size of marking areas matched with the one or more types of the objects.

9. The multi display apparatus of claim 8, wherein, when a plurality of objects are selected within the first screen and simultaneously moved to the second screen, the controller displays each of the plurality of objects on the second screen according to the layout information corresponding to each of the plurality of objects.

10. A display controlling method of a multi display apparatus which comprises a first body comprising a first display, a second body comprising a second display, a hinge configured to connect the first body and the second body, a storage unit configured to store one or more contents, and a controller, the display controlling method comprising:
displaying on the first display a first screen when one of the stored contents is implemented;
displaying on the second display a second screen corresponding to the implemented contents; and
modifying the displayed contents on the second screen according to a user manipulation when the user manipulation is performed on the first screen,
wherein a content result of the manipulation on the first screen is fit to a layout of the second screen.

11. A display controlling method of a multi display apparatus which comprises a first body comprising a first display, a second body comprising a second display, a hinge configured to connect the first body and the second body, a storage unit configured to store one or more contents, and a controller, the display controlling method comprising:
displaying on the first display a first screen when one of the stored contents is implemented;
displaying on the second display a second screen corresponding to the implemented contents; and
modifying the displayed contents on the second screen according to a user manipulation when the user manipulation is performed on the first screen, wherein:
when a plurality of the stored contents is implemented, the displaying on the first display comprises consecutively overlapping and displaying a plurality of first screens corresponding to the plurality of implemented contents respectively;
the displaying on the second display comprises consecutively overlapping and displaying a plurality of second screens corresponding to the plurality of first screens respectively; and
when one first screen is selected from among the plurality of first screens, the selected first screen is displayed on the first display on an uppermost position among the plurality of first screens, and a second screen corresponding to the selected first screen is displayed on the second display on an uppermost position among the plurality of the second screens.

12. A display controlling method of a multi display apparatus which comprises a first body comprising a first display, a second body comprising a second display, a hinge configured to connect the first body and the second body, a storage unit configured to store one or more contents, and a controller, the display controlling method comprising:
  displaying on the first display a first screen when one of the stored contents is implemented;
  displaying on the second display a second screen corresponding to the implemented contents; and
  modifying the displayed contents on the second screen according to a user manipulation when the user manipulation is performed on the first screen claim 10, wherein:
  when a plurality of the stored contents is implemented, the displaying on the first display comprises consecutively overlapping and displaying a plurality of first screens respectively corresponding to the plurality of implemented contents on the first display;
  the displaying on the second display consecutively overlaps and displays a plurality of second screens respectively corresponding to the plurality of first screens on the second display; and
  when one or more objects are selected within one first screen among the plurality of first screens, the selected one or more objects are displayed on a second screen corresponding to the one first screen.

13. The display controlling method of claim 10, wherein the user manipulation performed on the first screen selects one or more objects displayed on the first screen, and moves the selected one or more objects to the second display.

14. The display controlling method of claim 10, wherein:
  when contents that are used by a plurality of users are implemented, the displaying on the first display comprises displaying a first screen which is created with contents corresponding to a first user among the plurality of users; and
  the displaying on the second display comprises displaying a second screen which is created with contents corresponding to a second user among the plurality of users.

15. The display controlling method of claim 14, wherein the contents that are used by the plurality of users comprise one or more of medical contents, educational contents, class material contents, and meeting contents.

16. A display controlling method of a multi display apparatus which comprises a first body comprising a first display, a second body comprising a second display, a hinge configured to connect the first body and the second body, a storage unit configured to store one or more contents, and a controller, the display controlling method comprising:
  displaying on the first display a first screen when one of the contents is implemented;
  displaying on the second display a second screen corresponding to the implemented contents;
  selecting one or more objects included in the first screen;
  moving the selected one or more objects to the second screen; and
  determining and displaying the moved one or more objects on the second screen based on preset layout information, the preset layout information comprising one or more display positions on the second screen corresponding to each of one or more types of the objects.

17. The display controlling method of claim 16, wherein the layout information further comprises information regarding one or more of position, shape, color, special effect, and size of marking areas matched with the one or more types of the objects.

18. A multi display apparatus, comprising:
  a first body comprising a first display;
  a second body comprising a second display;
  a hinge configured to connect the first body and the second body; and
  a controller configured to display on the first display a first screen which comprises a plurality of editing screens having different layouts from each other, and display on the second display a second screen comprising a plurality of contents insertable into a selected editing screen, when one editing screen is selected from among the plurality of displayed editing screens.

19. The multi display apparatus of claim 18, wherein, while the selected editing screen is displayed on the first display and the second screen is displayed on the second screen, when one or more contents is selected within the second screen, the controller moves and displays the selected one or more contents to the editing screen displayed on the first display.

20. The multi display apparatus of claim 18, wherein the plurality of editing screens comprises editing screens comprising layouts according to which one or more displaying features of contents displayed thereon are determined according to each of one or more types of the contents, the one or more displaying features including at least one of display position, shape, color, special effect, and size.

21. The multi display apparatus of claim 19, wherein, when a user manipulation to move the contents selected on the second screen to the editing screen displayed on the first display is input, the controller displays the selected contents according to the one or more displaying features corresponding to the types of the selected contents, among the layouts included in the editing screen.

22. A display controlling method of a multi display apparatus which comprises a first body comprising a first display, a second body comprising a second display, and a hinge configured to connect the first body and the second body, the display controlling method comprising:
  displaying on the first display a first screen which comprises a plurality of editing screens having different layouts from each other;
  displaying a selected editing screen on the first display when one editing screen is selected from among the plurality of editing screens;
  displaying on the second display a second screen which comprises a plurality of contents insertable into the selected editing screen; and
  moving selected contents to the selected editing screen and displaying the selected contents on the selected editing screen when one or more contents is selected on the second screen.

23. The display controlling method of claim 22, wherein the plurality of editing screens comprises editing screens comprising layouts according to which one or more displaying features of contents displayed thereon are determined according to each of one or more types of the contents, the one or more displaying features including at least one of display position, shape, color, special effect and size.

24. The display controlling method of claim 22, wherein the contents selected on the second screen are displayed on a position corresponding to the type of the selected contents within the layouts included in the selected editing screen.

* * * * *